(12) United States Patent
Abe et al.

(10) Patent No.: US 10,529,134 B2
(45) Date of Patent: Jan. 7, 2020

(54) INFORMATION PROCESSING DEVICE, CLIENT DEVICE, INFORMATION PROCESSING METHOD, AND PROGRAM

(71) Applicant: SONY CORPORATION, Tokyo (JP)

(72) Inventors: Shinichiro Abe, Tokyo (JP); Masaki Fukuchi, Tokyo (JP); Shunichi Homma, Tokyo (JP); Jianing Wu, Tokyo (JP); Tatsuki Kashitani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/762,112

(22) PCT Filed: Nov. 21, 2013

(86) PCT No.: PCT/JP2013/081408
§ 371 (c)(1),
(2) Date: Jul. 20, 2015

(87) PCT Pub. No.: WO2014/119098
PCT Pub. Date: Aug. 7, 2014

(65) Prior Publication Data
US 2015/0356788 A1 Dec. 10, 2015

(30) Foreign Application Priority Data
Feb. 1, 2013 (JP) .................................. 2013-018436

(51) Int. Cl.
*G06T 19/00* (2011.01)
*G06T 15/08* (2011.01)
*G06F 3/0484* (2013.01)

(52) U.S. Cl.
CPC ........ *G06T 19/006* (2013.01); *G06F 3/04842* (2013.01); *G06T 15/08* (2013.01)

(58) Field of Classification Search
CPC ....... G06T 15/08; G06T 19/006; G06T 19/00; G06F 3/04842; G06F 3/0484
(Continued)

(56) References Cited

U.S. PATENT DOCUMENTS

| | | | | |
|---|---|---|---|---|
| 5,736,982 A | * | 4/1998 | Suzuki | ............ G06T 15/30 348/E7.083 |
| 2002/0007314 A1 | * | 1/2002 | Maruyama | ............ G06Q 30/02 705/14.68 |

(Continued)

FOREIGN PATENT DOCUMENTS

| JP | 11250278 A | * | 9/1999 |
| JP | 2003-150978 | | 5/2003 |

(Continued)

OTHER PUBLICATIONS

JP 2012-178069A (Machine Translation on Sep. 28, 2015).*
(Continued)

*Primary Examiner* — Michael Le
(74) *Attorney, Agent, or Firm* — Paratus Law Group, PLLC

(57) ABSTRACT

There is provided an information processing device including an image acquisition unit that acquires a captured image of a real space from an image capture device, a setting unit that sets, in association with the real space, an augmented reality space that virtually augments the real space depicted in the captured image, and a control unit that determines a target position for an action executed within the augmented reality space, on a basis of a positional relationship between an object within the augmented reality space and an optical axis of the image capture device.

20 Claims, 56 Drawing Sheets

(58) Field of Classification Search
USPC ........................................ 345/633, 467, 469
See application file for complete search history.

(56) References Cited

U.S. PATENT DOCUMENTS

| | | | | |
|---|---|---|---|---|
| 2005/0231532 | A1* | 10/2005 | Suzuki | G06F 3/012 345/633 |
| 2007/0035562 | A1* | 2/2007 | Azuma | G03B 13/28 345/633 |
| 2008/0136916 | A1* | 6/2008 | Wolff | G06F 3/012 348/169 |
| 2011/0018903 | A1* | 1/2011 | Lapstun | G02B 26/06 345/633 |
| 2012/0096352 | A1* | 4/2012 | Maor | H04L 51/32 715/706 |
| 2012/0105474 | A1* | 5/2012 | Cudalbu | G01C 21/20 345/633 |
| 2012/0105475 | A1* | 5/2012 | Tseng | G01C 21/3611 345/633 |
| 2013/0014032 | A1* | 1/2013 | Chou | H04L 12/1822 715/757 |
| 2013/0155058 | A1* | 6/2013 | Golparvar-Fard | G06T 19/006 345/419 |
| 2013/0215109 | A1* | 8/2013 | Miesnieks | G06T 13/20 345/419 |

FOREIGN PATENT DOCUMENTS

| | | | |
|---|---|---|---|
| JP | 2003150978 | A * | 5/2003 |
| JP | 2012-178069 | | 9/2012 |
| JP | 2012178069 | A * | 9/2012 |
| JP | 2012-212343 | | 11/2012 |
| JP | 2012-216073 | A | 11/2012 |
| JP | 2012-216074 | | 11/2012 |
| JP | 2012-221249 | | 11/2012 |

OTHER PUBLICATIONS

JP 2003-150978A (Machine Translation on Sep. 28, 2015).*
JP 2012-178069A (Machine Translation on Sep. 28, 2015) (Year: 2015).*
JP 2003-150978A (Machine Translation on Sep. 28, 2015) (Year: 2015).*
JP 11250278A (Machine Translation on Aug. 23, 2019) (Year: 1999).*
Aug. 19, 2016, EP communication issued for related EP application No. 13873288.8.
Mareike Picklum, et al., Player Control in a Real-Time Mobile Augmented Reality Game, IFIP International Federation for Information Processing 2012, pp. 1-4.
Michael Rohs, et al., Target Acquisition with Camera Phones when used as Magic Lenses, CHI 2008, Apr. 5-10, 2008, pp. 1-10, Florence, IT.
Steven Feiner, et al., A Touring Machine: Prototyping 3D Mobile Augmented Reality Systems for Exploring the Urban Environment, IEEE 1997, pp. 74-81.
Wolfgang Hürst, et al., Multimodal Interaction Concepts for Mobile Augmented Reality Applications, Utrecht University, NL, 2011, pp. 157-167.
Nov. 24, 2016, EP communication issued for EP application No. 13873288.8.
Oct. 31, 2017, Japanese Office Action Issued for related JP application No. 2014-559503.

* cited by examiner

FIG.5
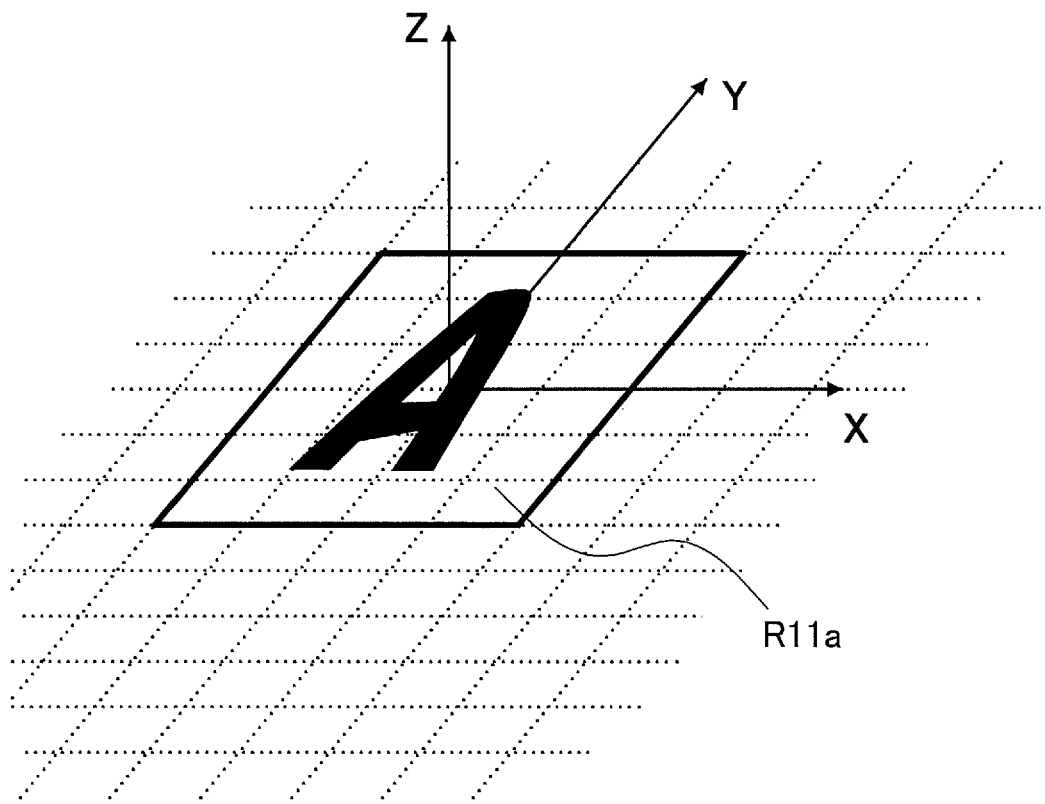
 : REFERENCE OBJECT

FIG.6
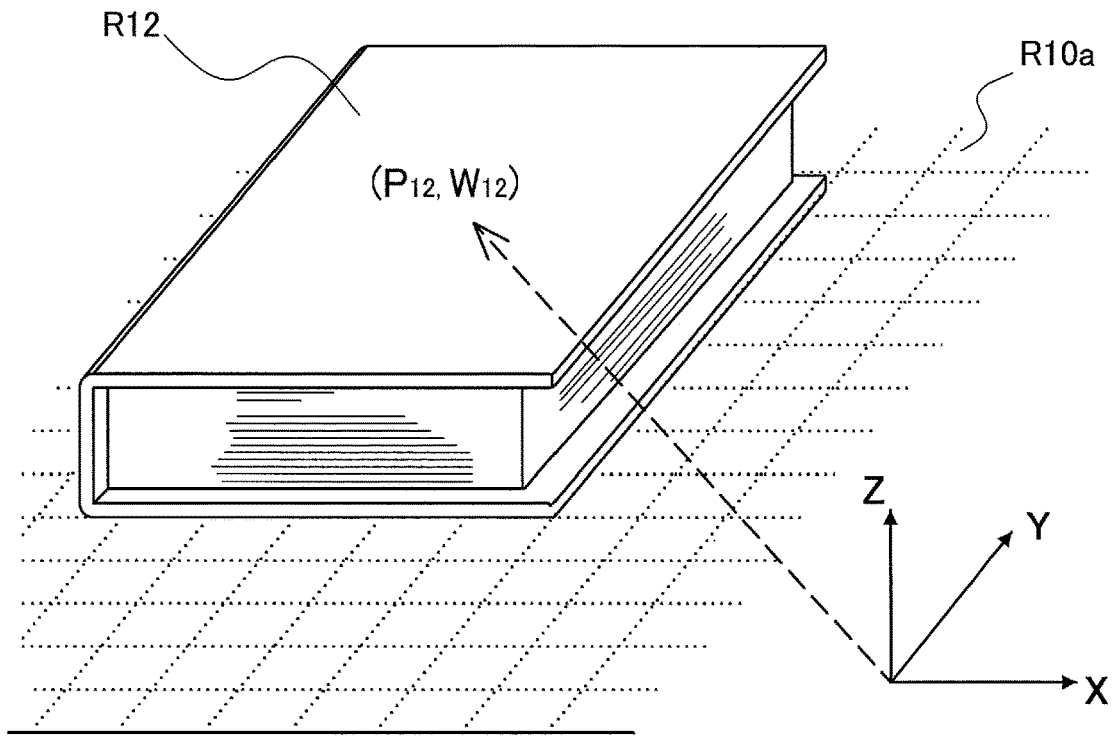
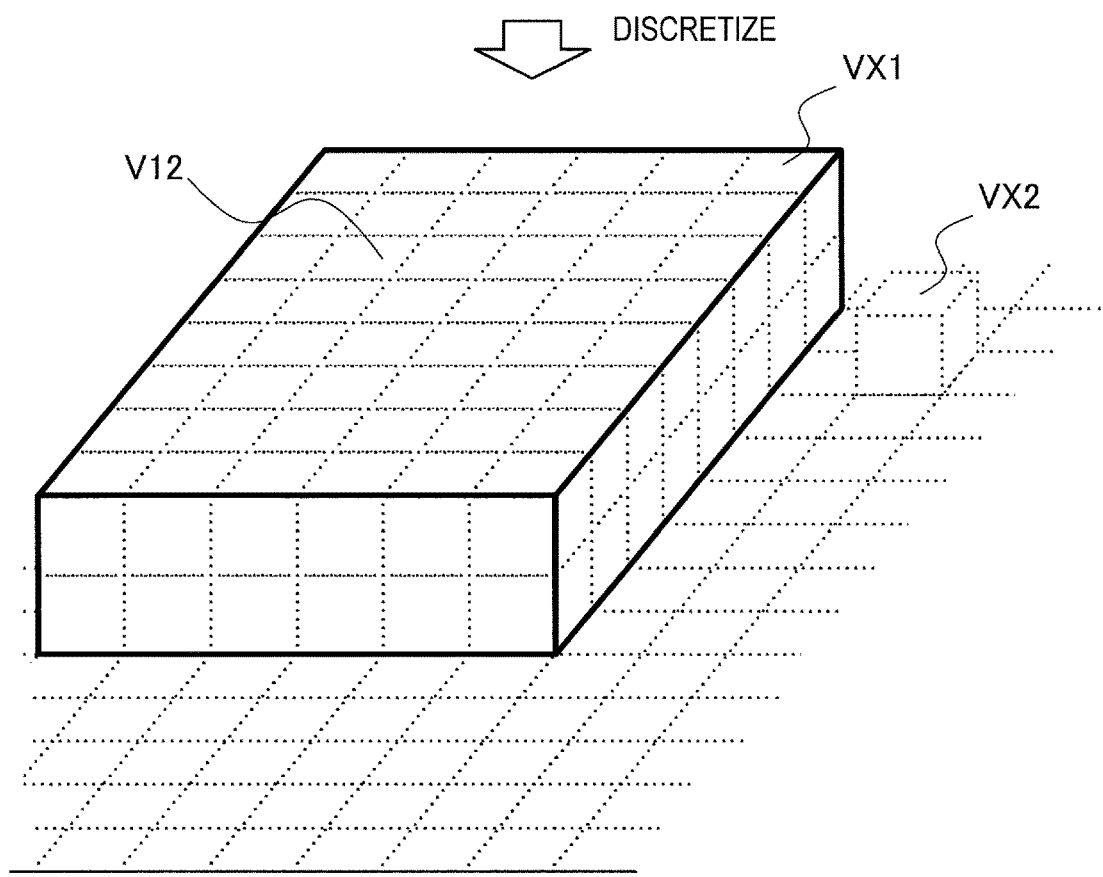

FIG.20
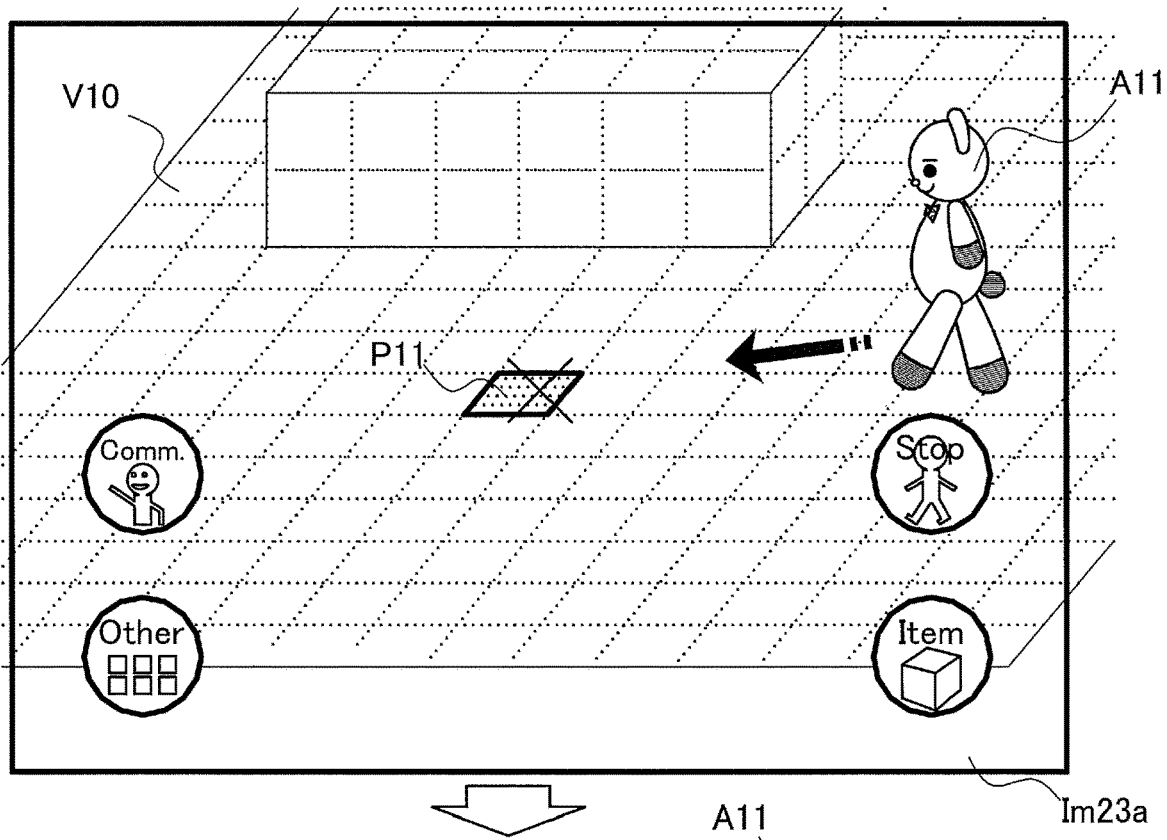
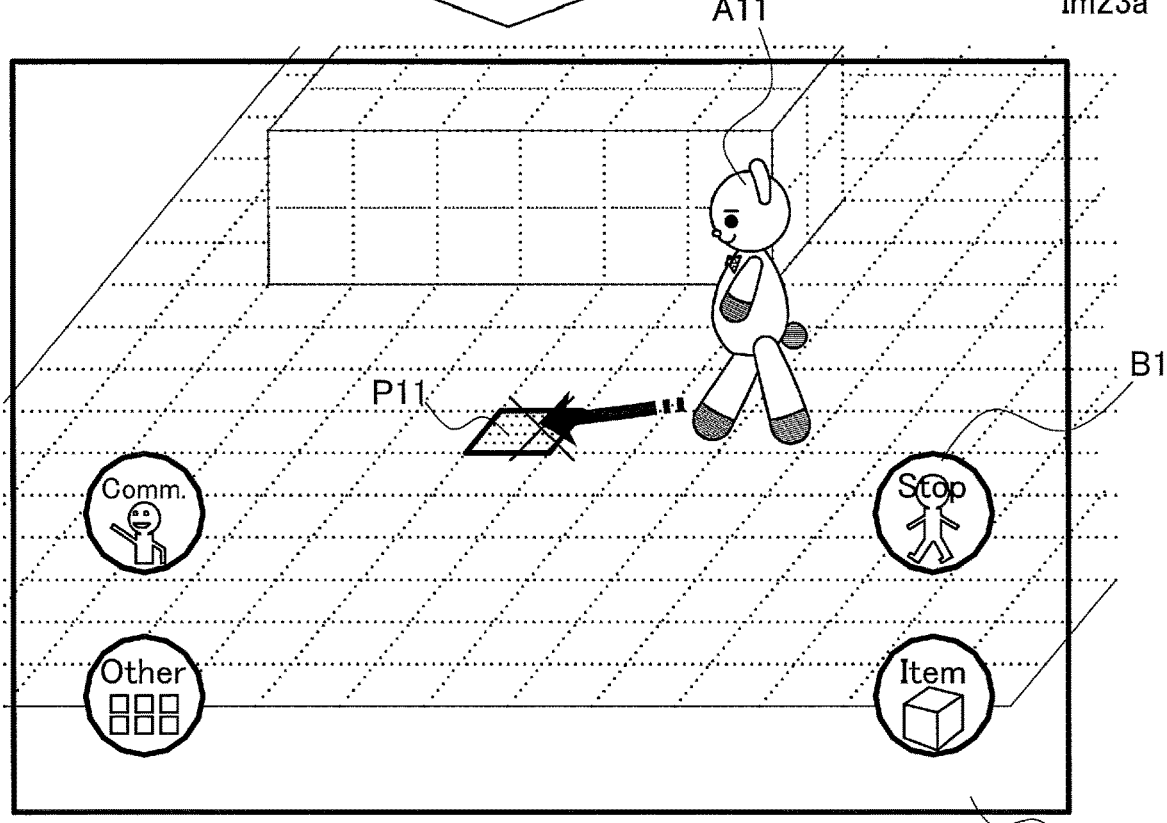
× INTERSECTION OF OPTICAL AXIS AND OBJECT
 ACTION TARGET POSITION

✕ : INTERSECTION OF OPTICAL AXIS AND OBJECT

▱ : ACTION TARGET POSITION

FIG.22
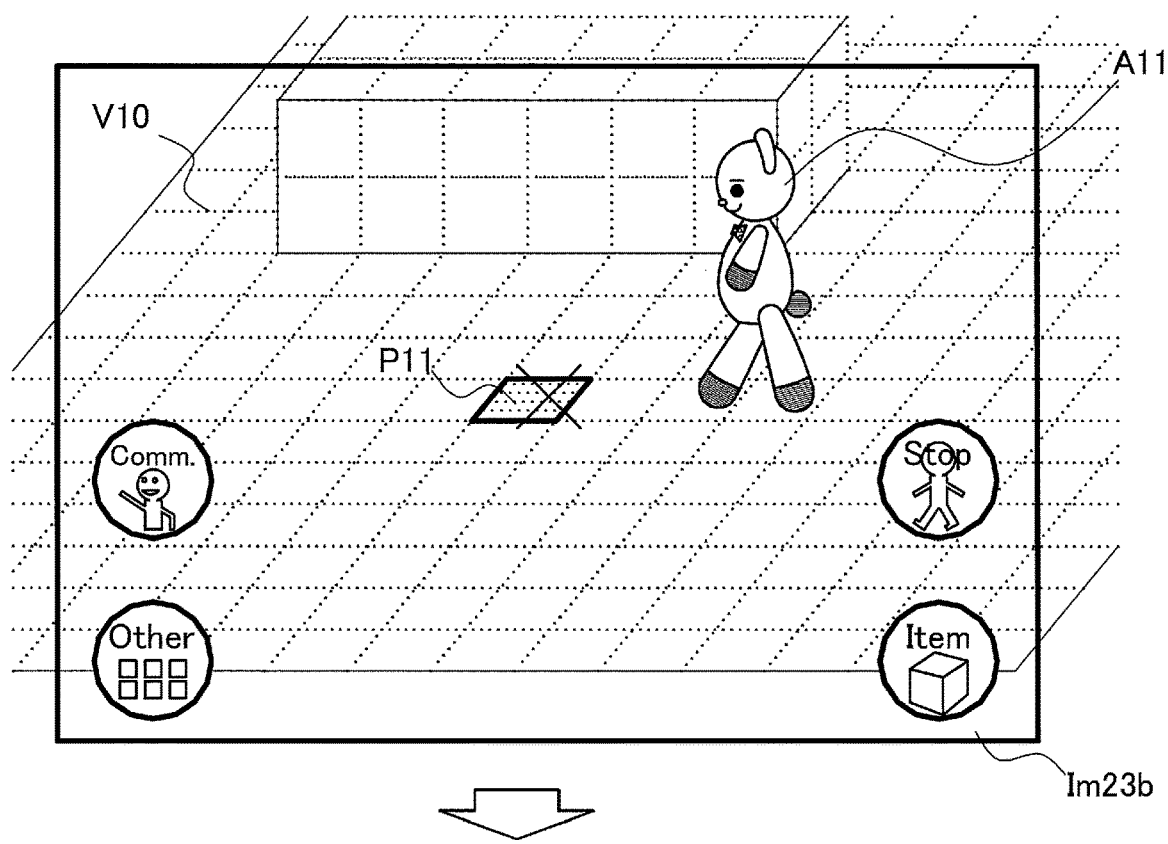
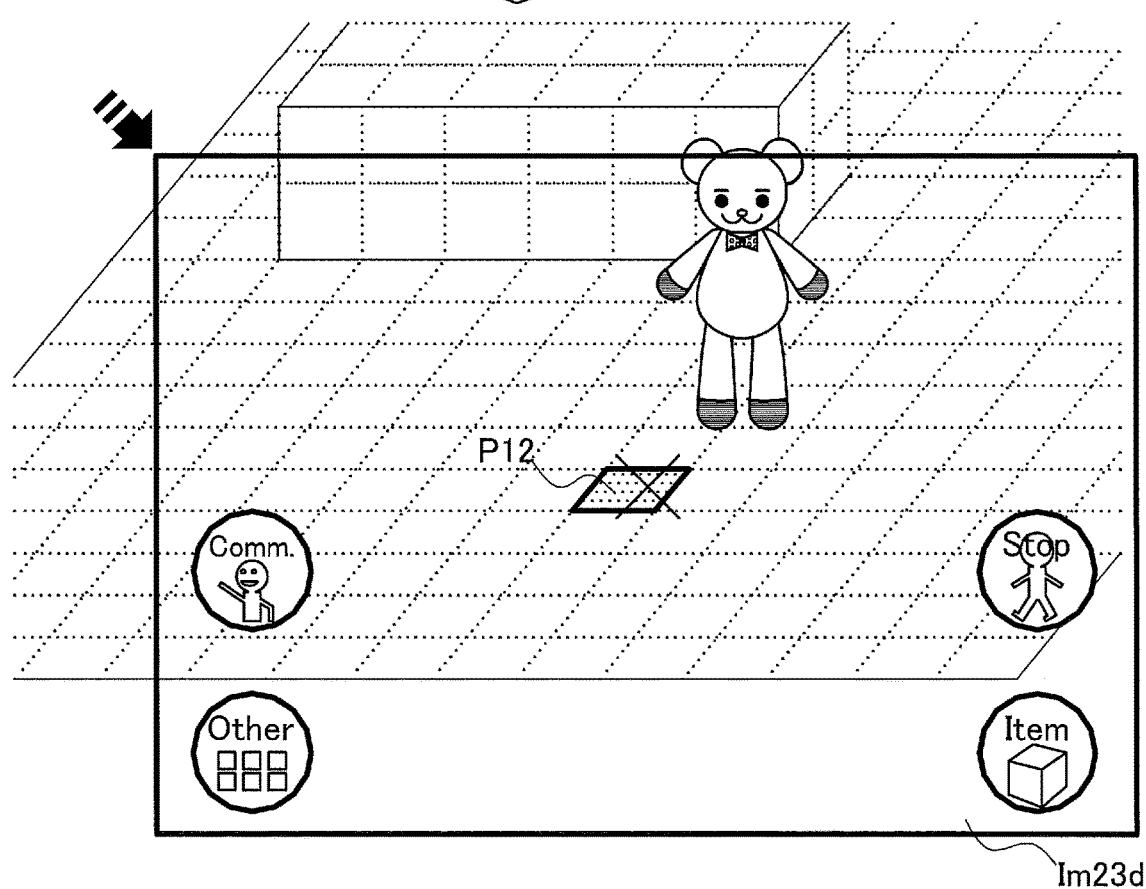

FIG.24A
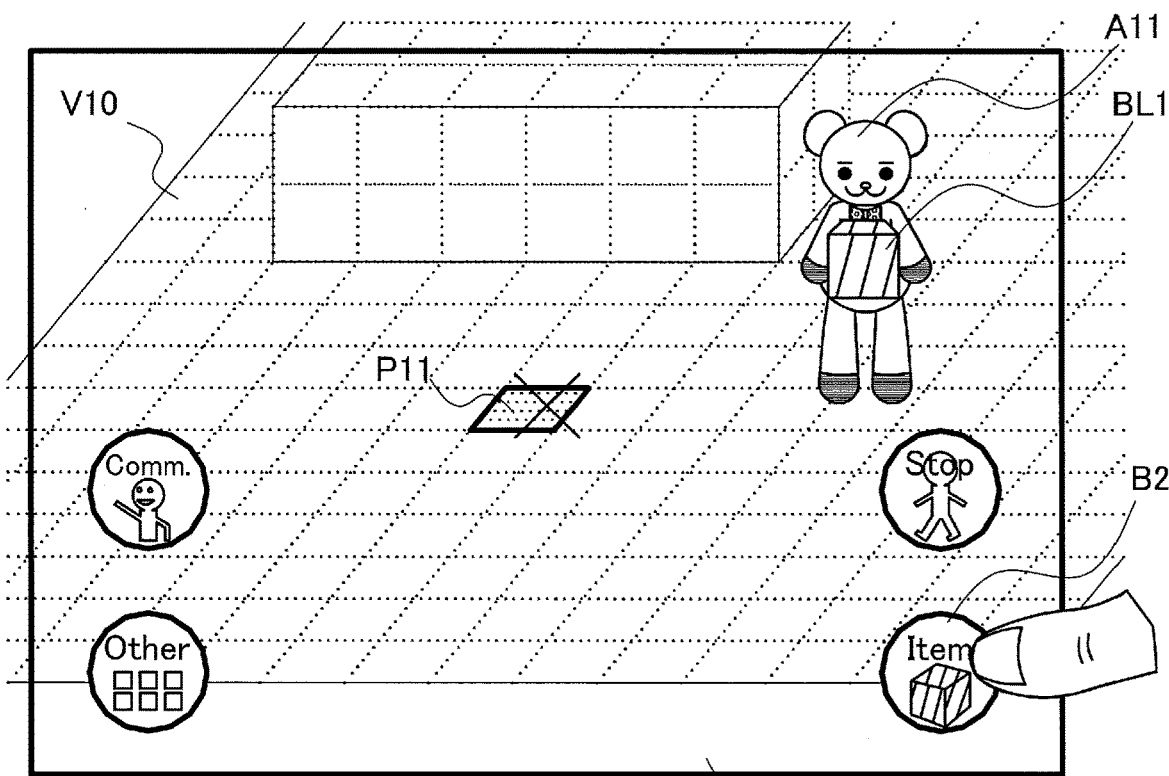
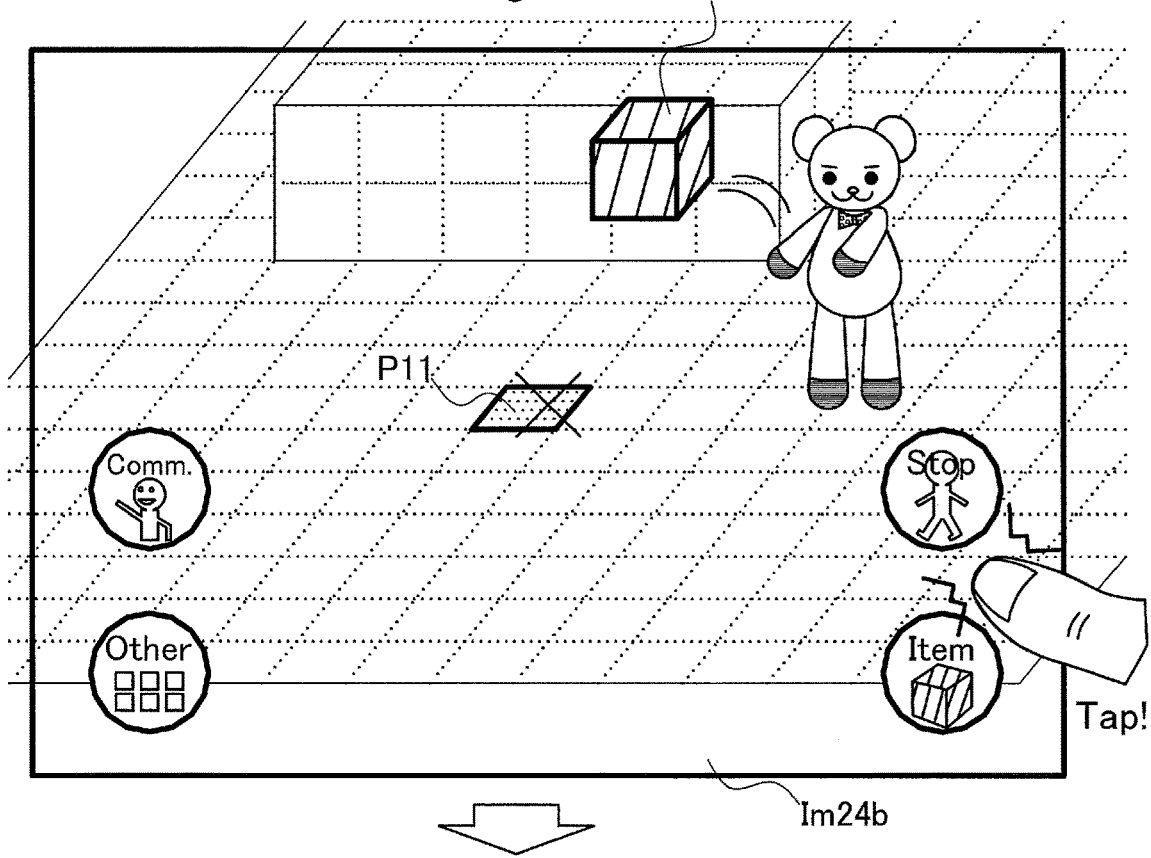

FIG.24B
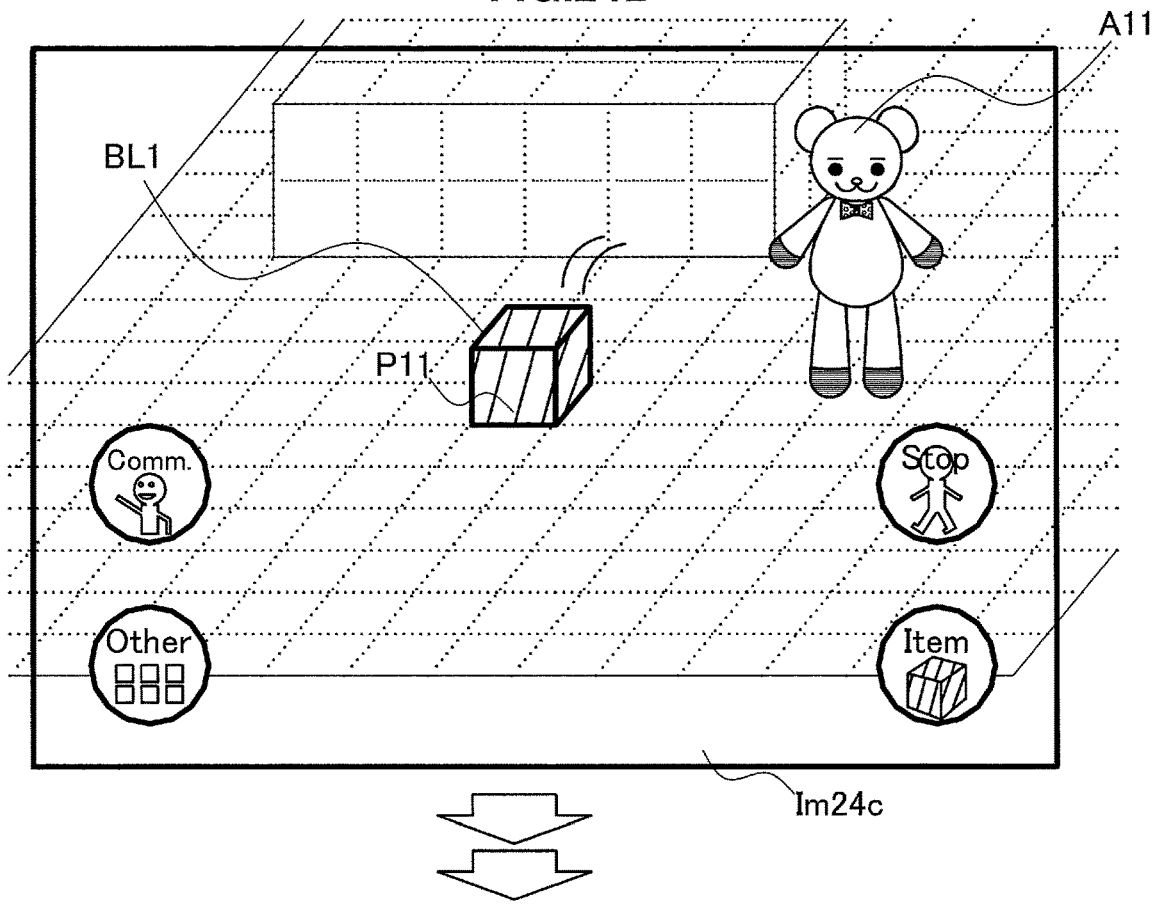
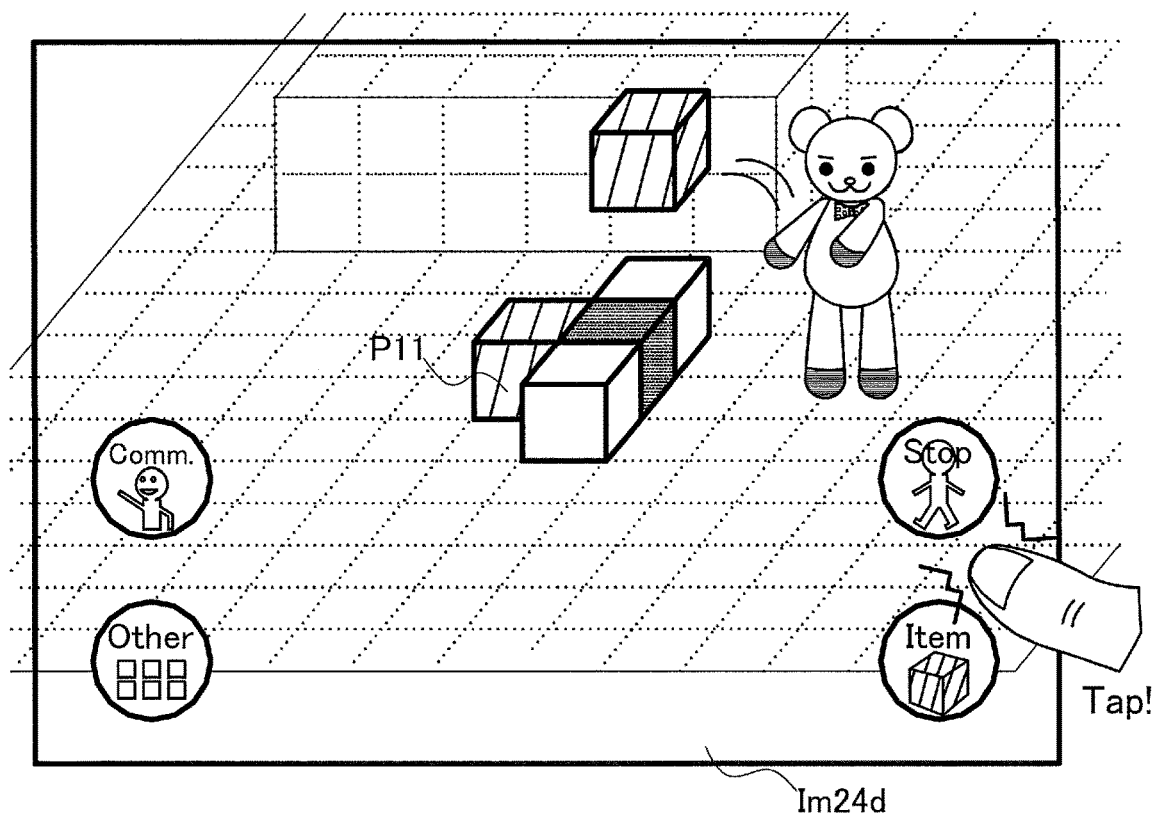

FIG.26
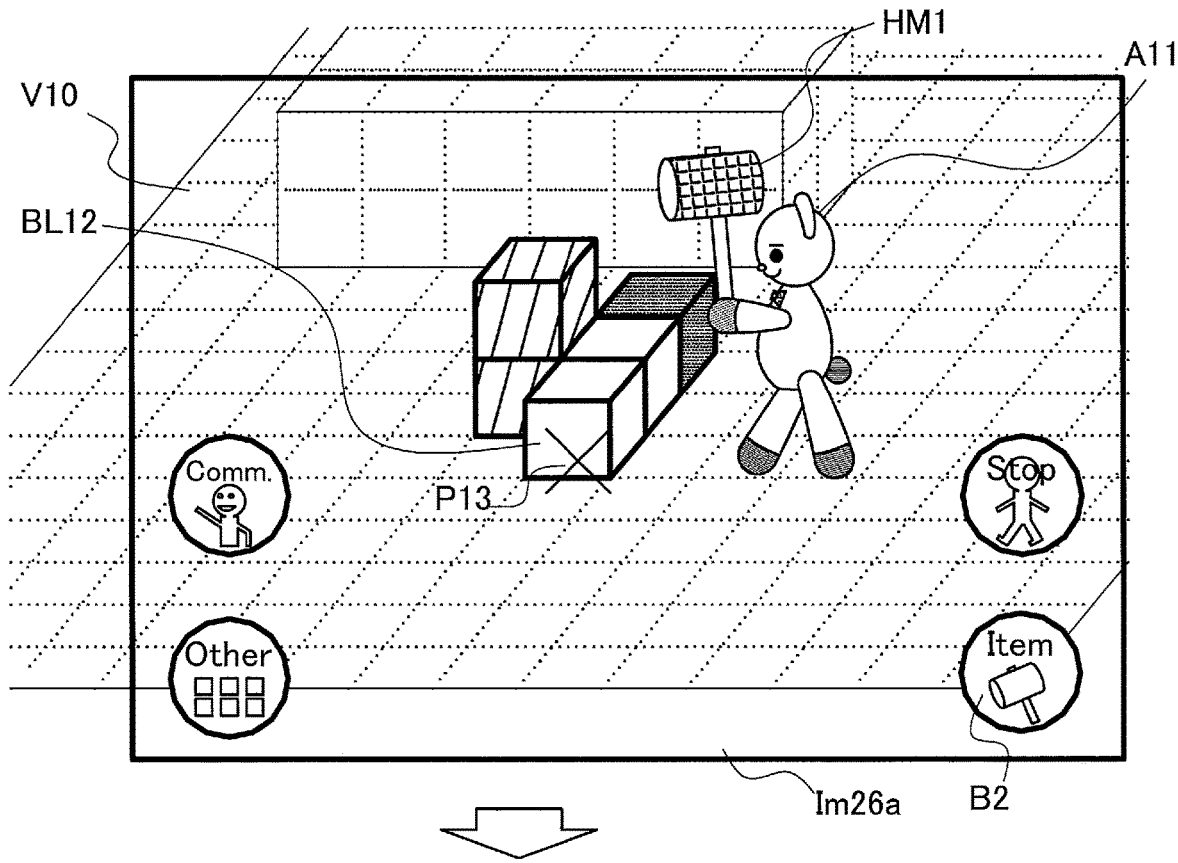
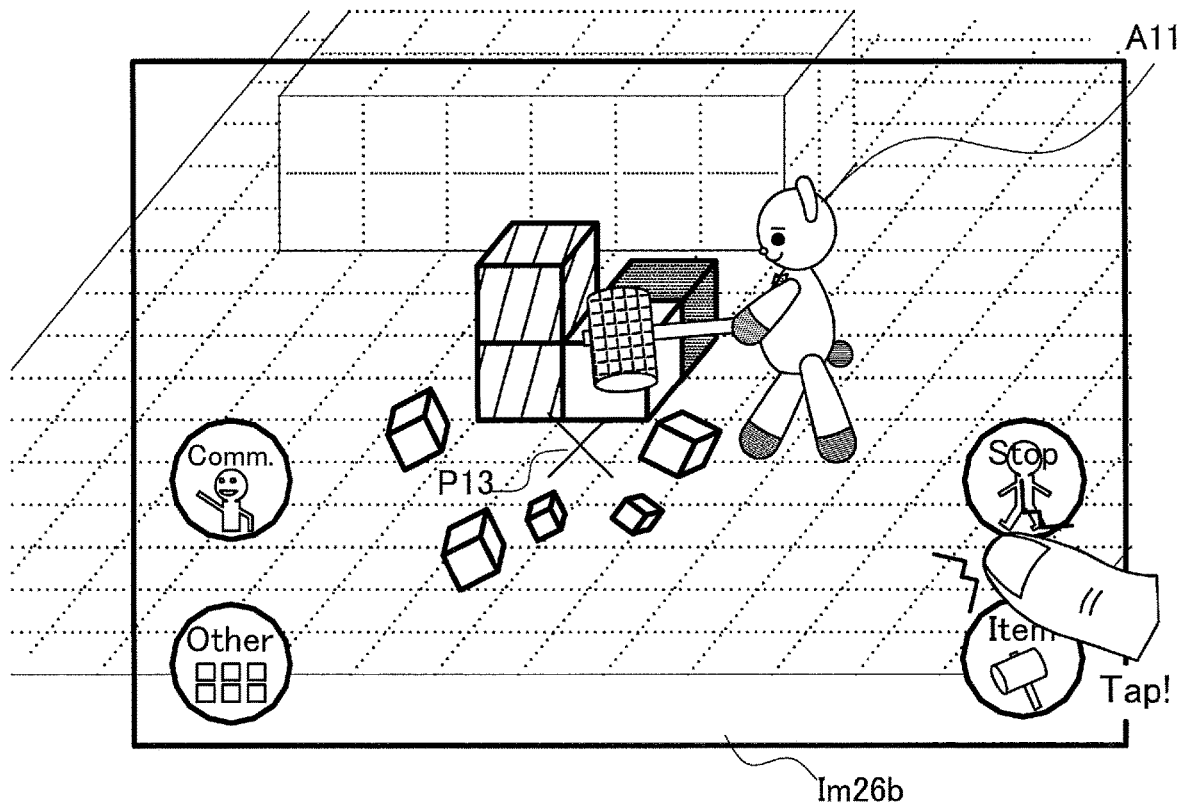

FIG.27
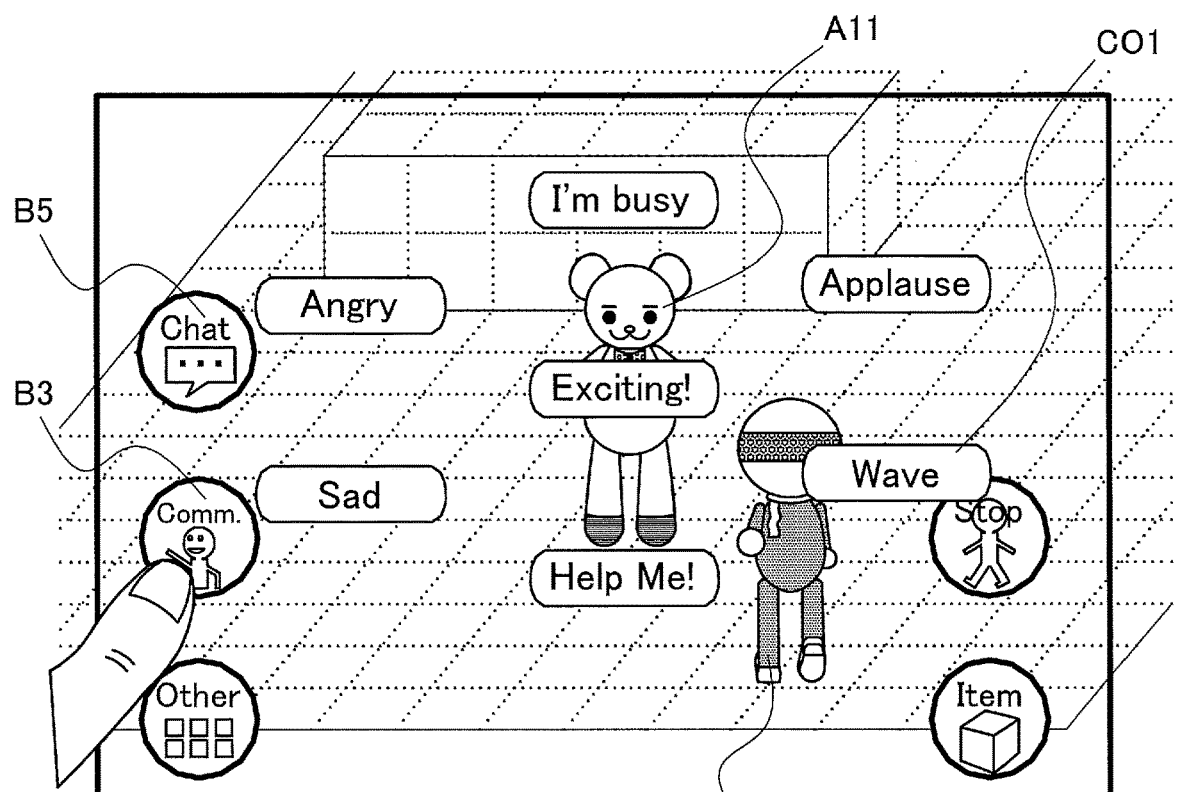
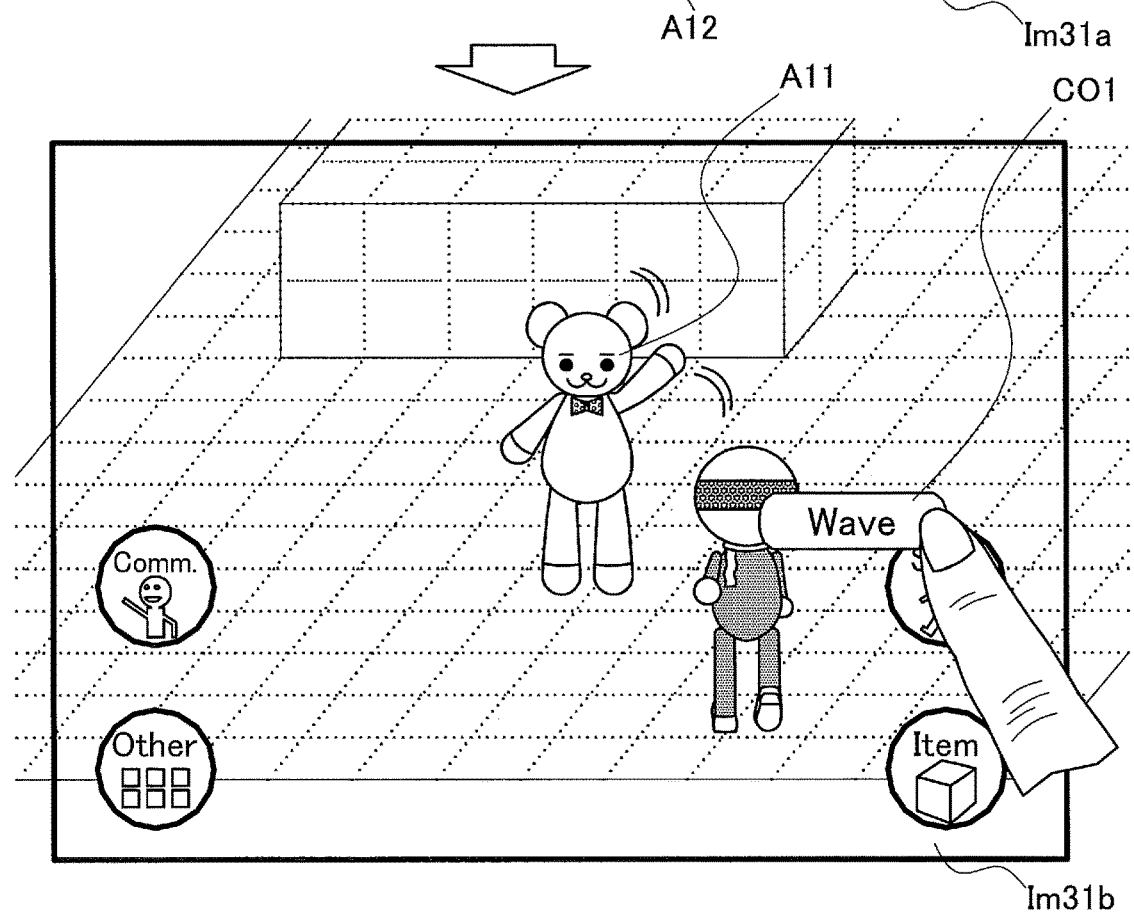

FIG.28
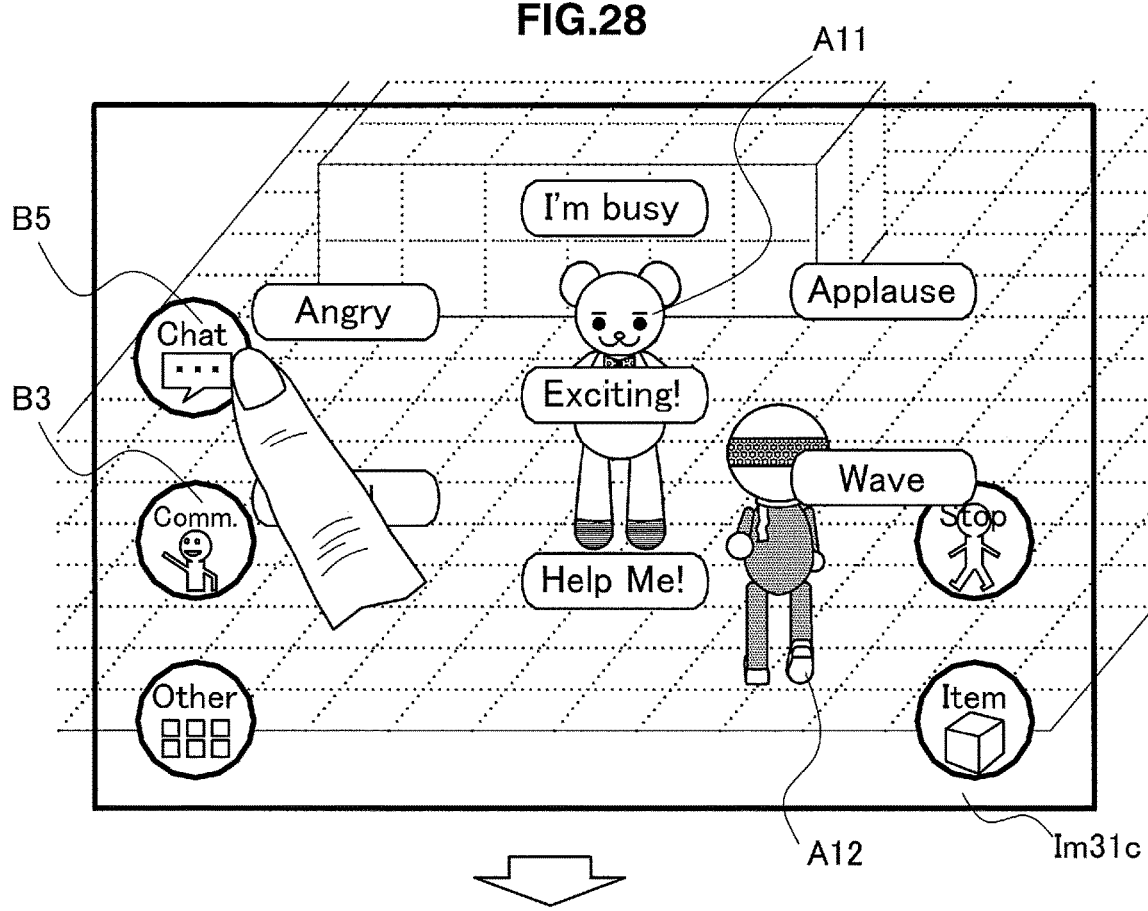
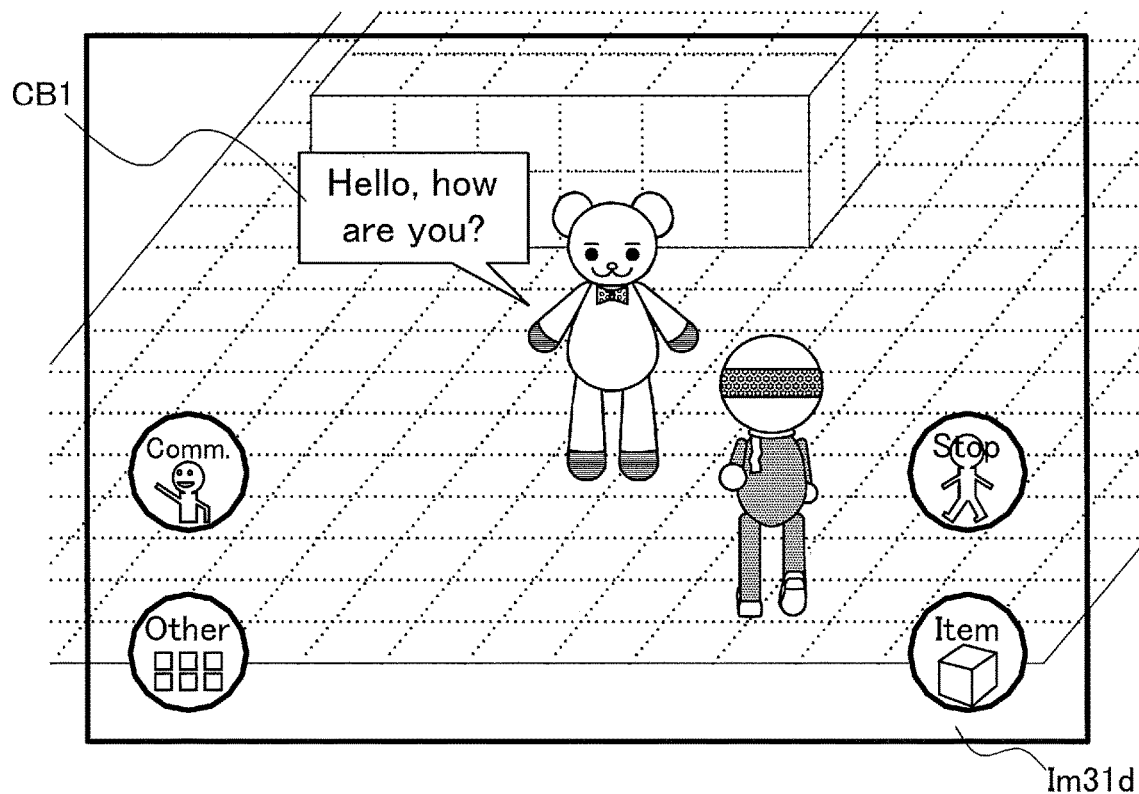

FIG.30
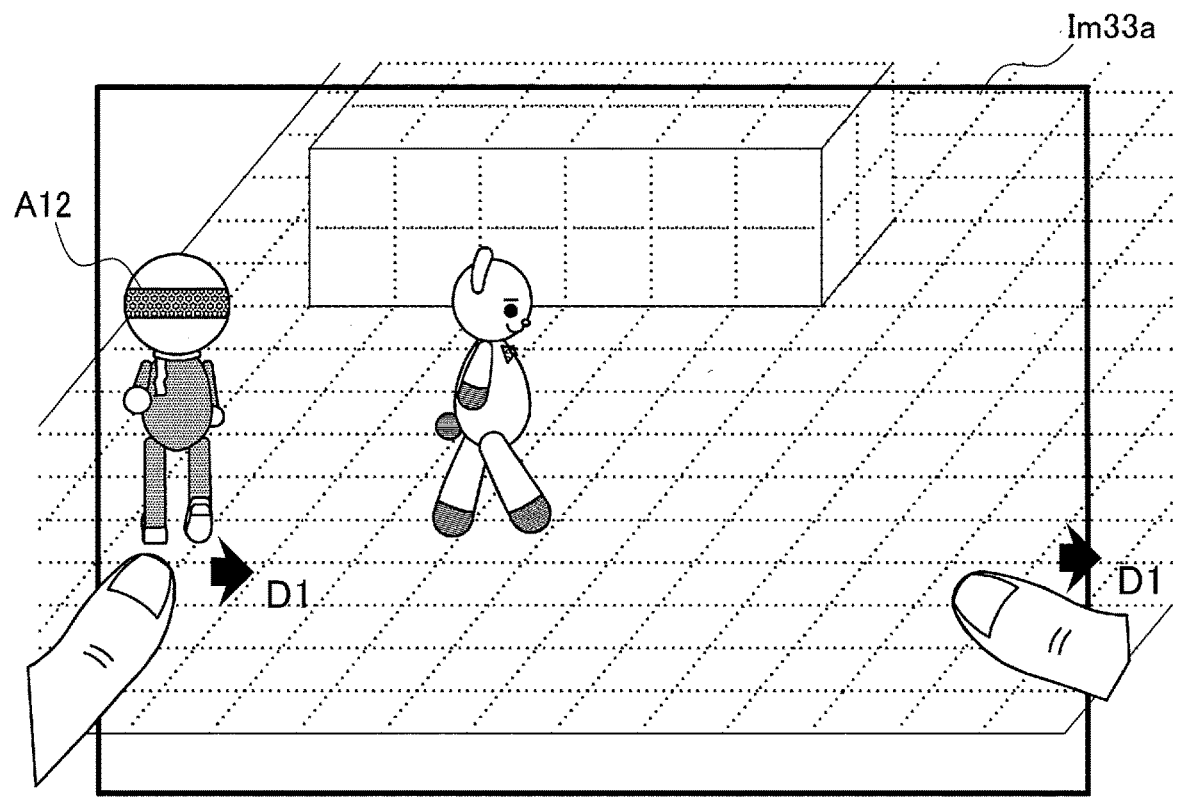
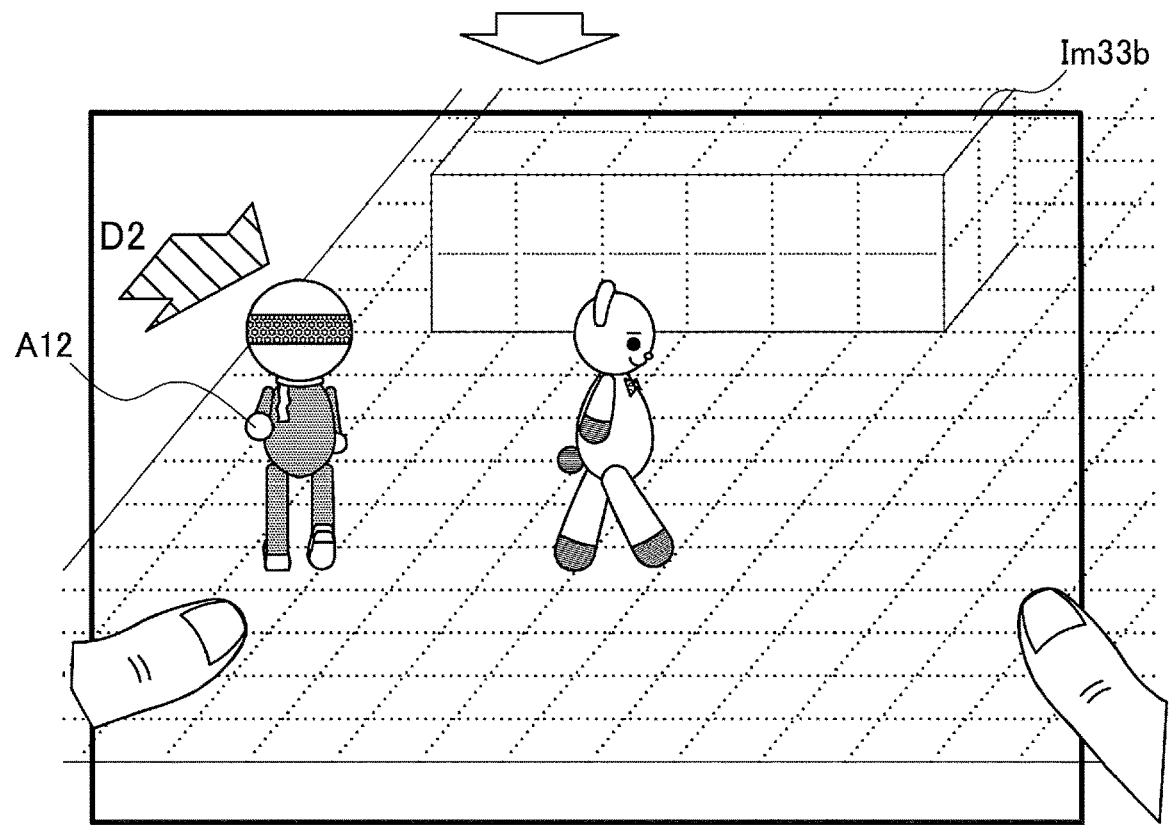

FIG.31
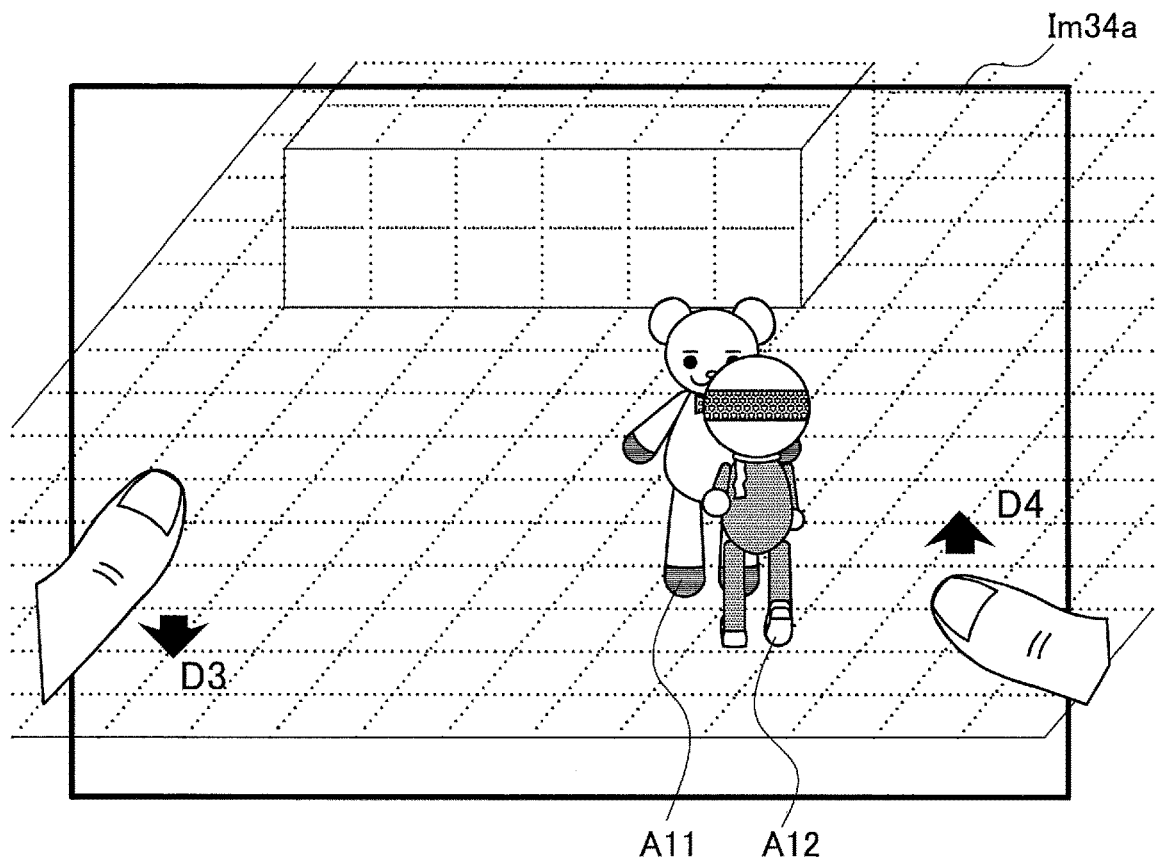
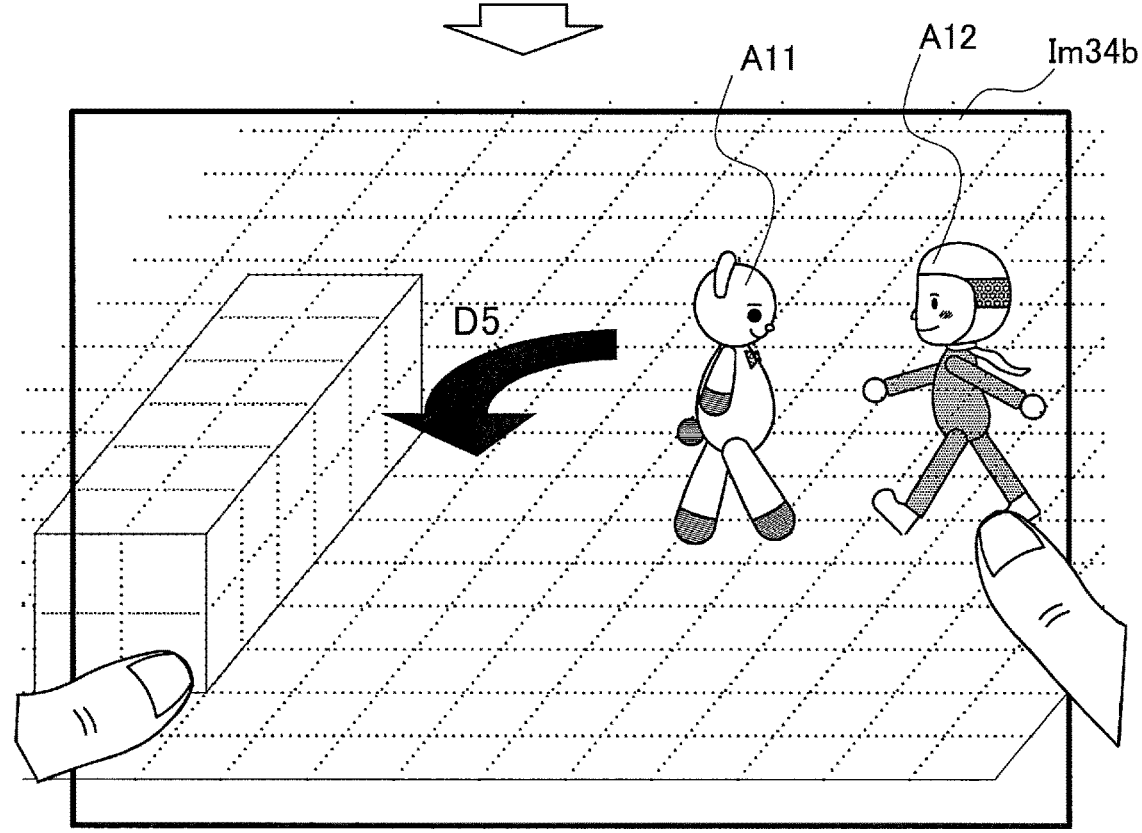

FIG.33
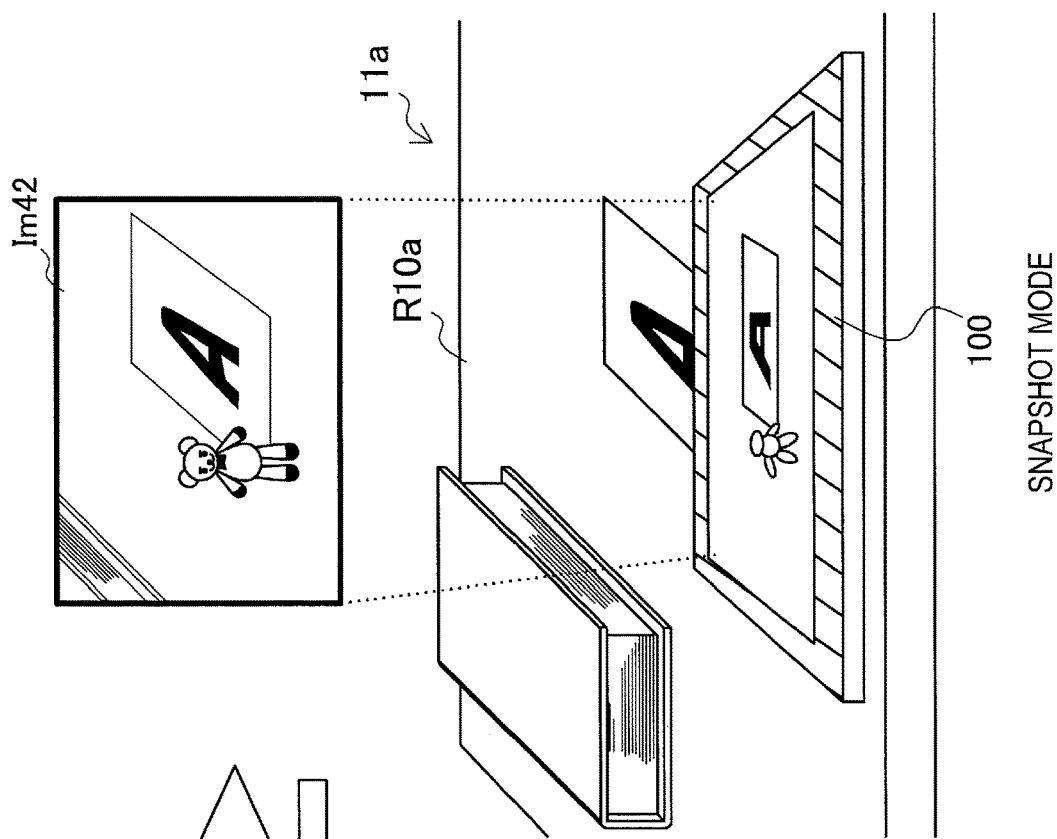
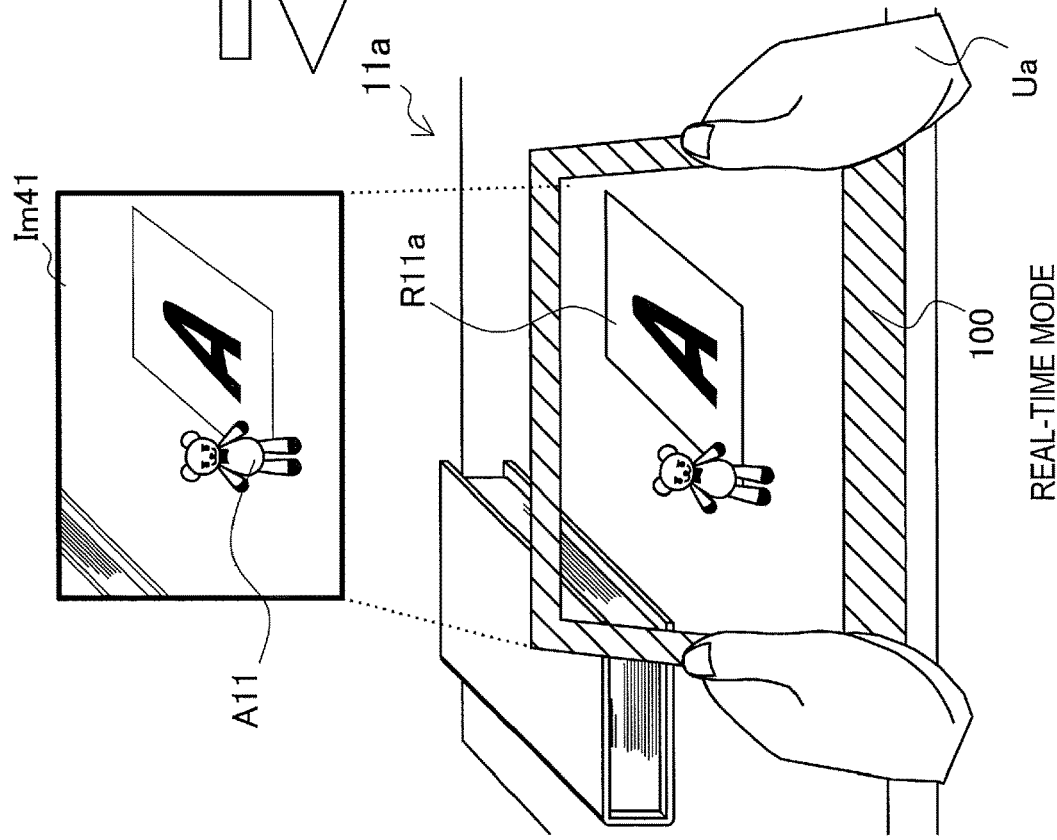

FIG.36
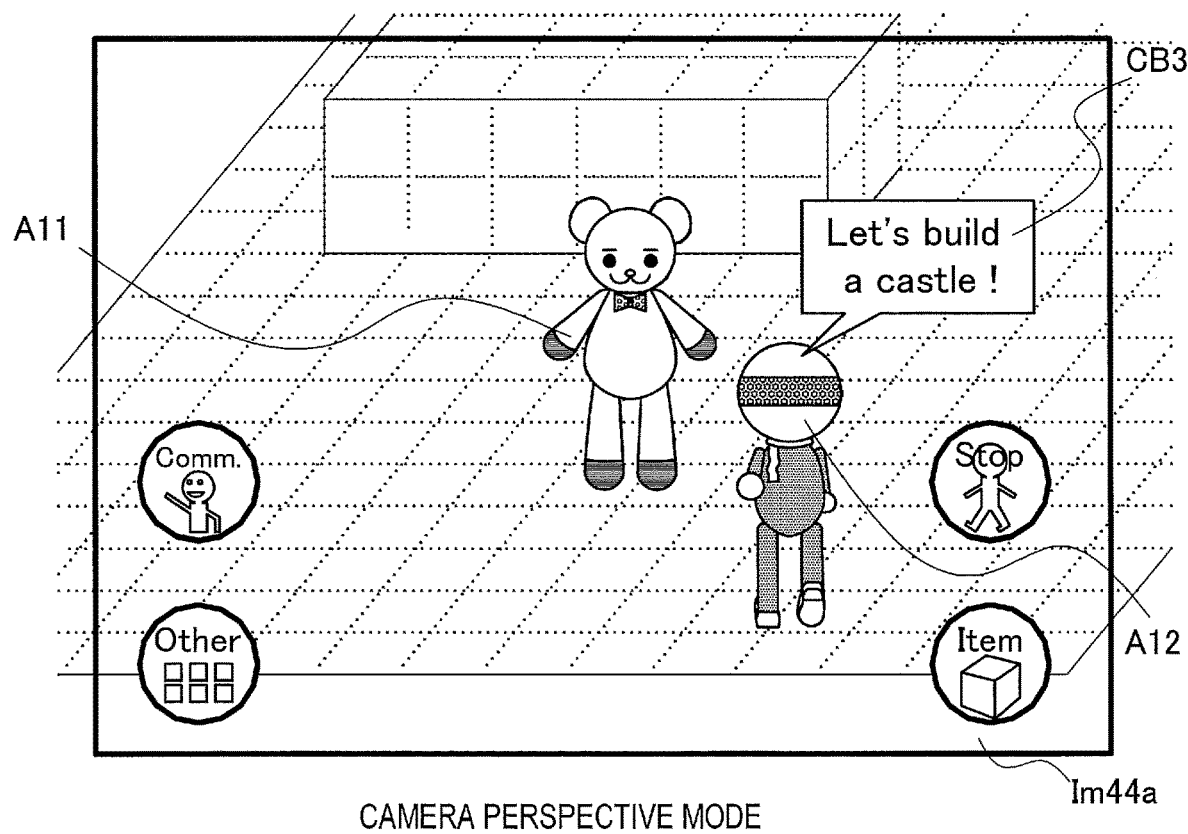
CAMERA PERSPECTIVE MODE
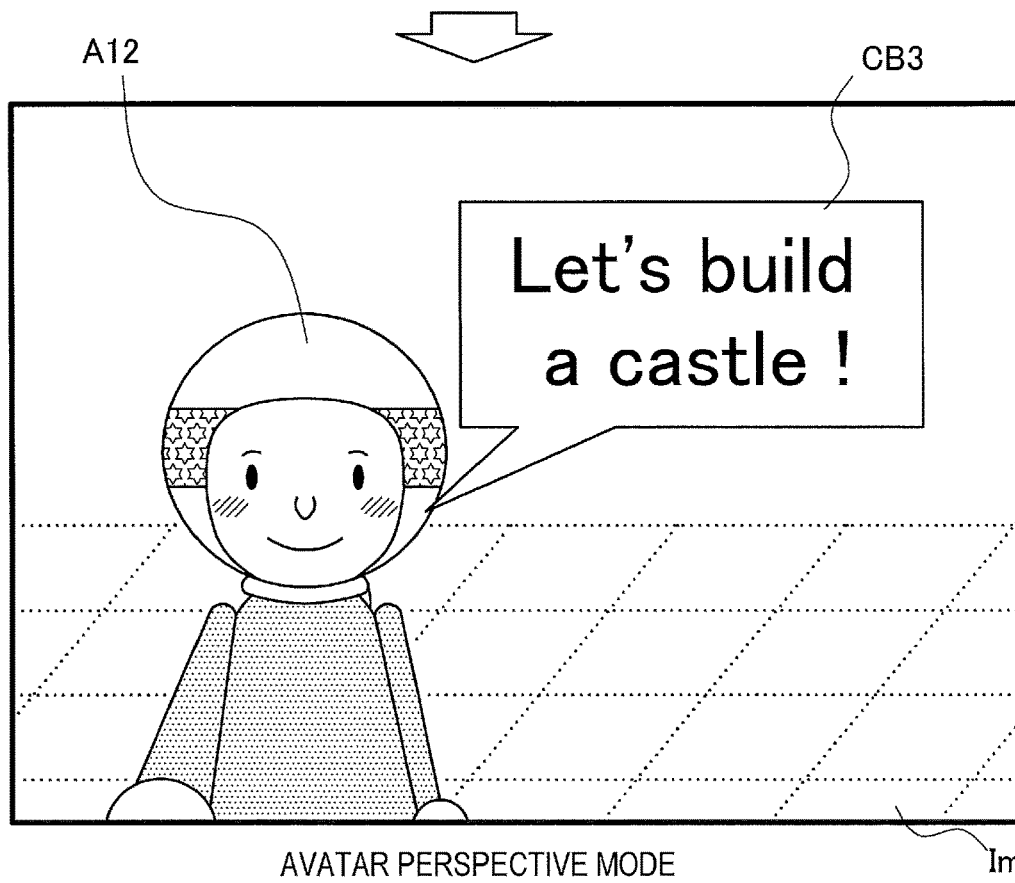
AVATAR PERSPECTIVE MODE

FIG.42
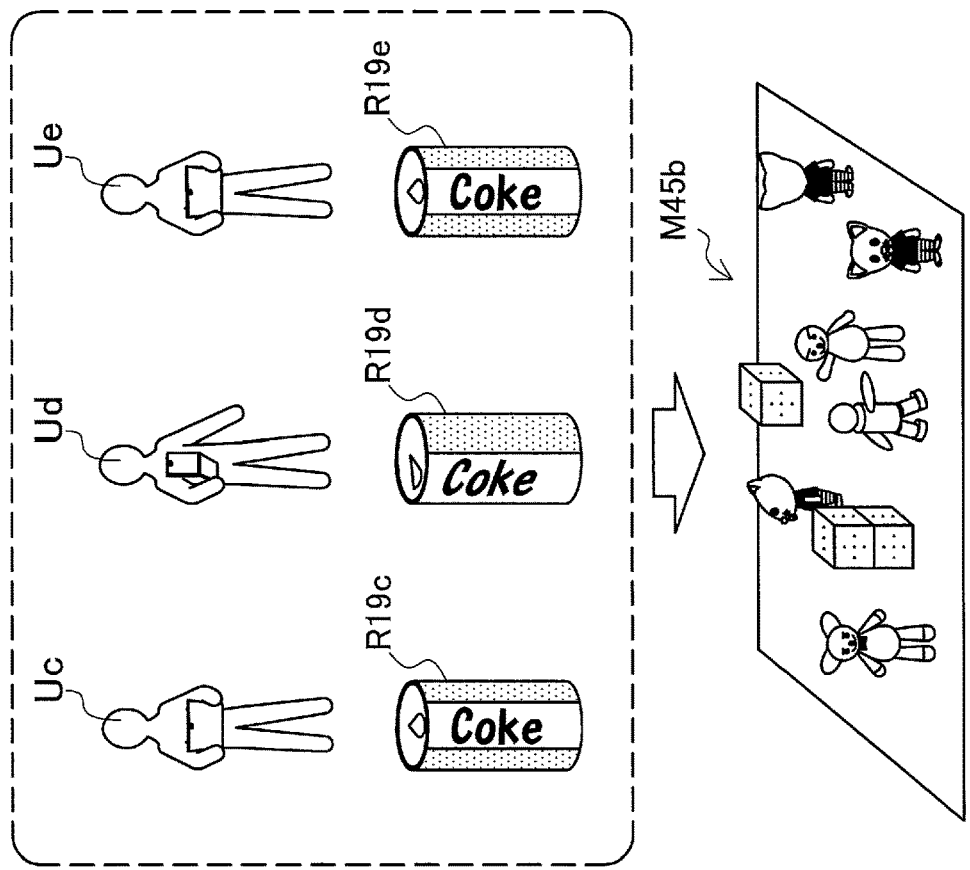
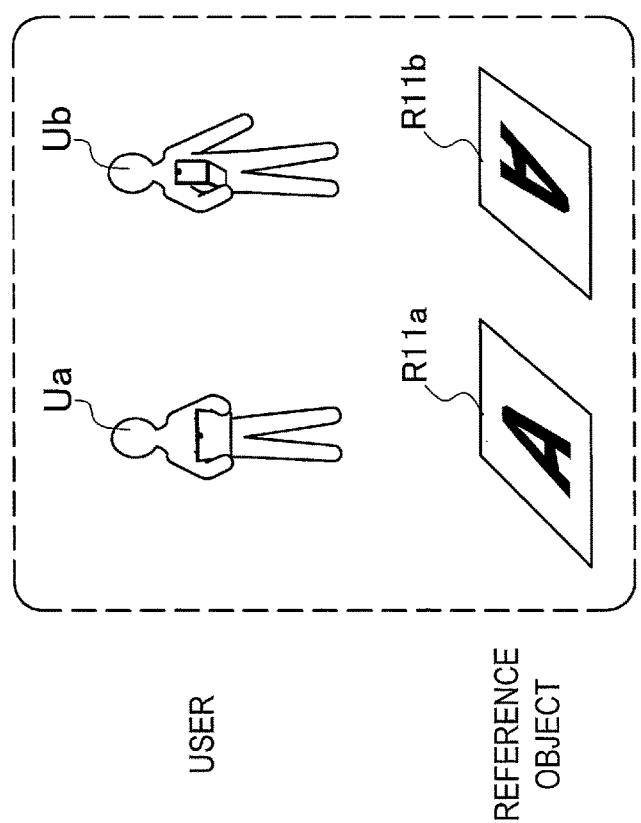

FIG.46
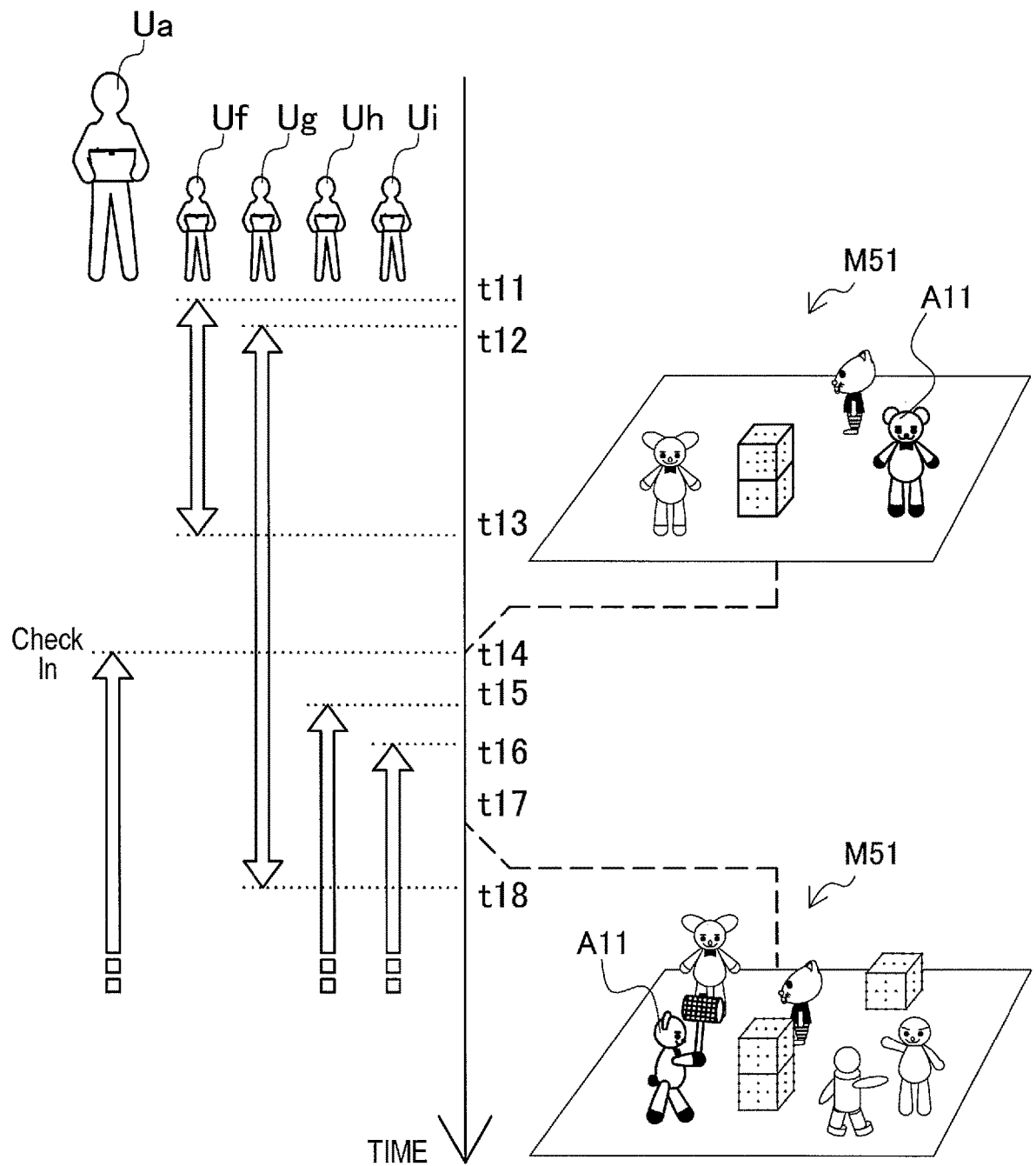

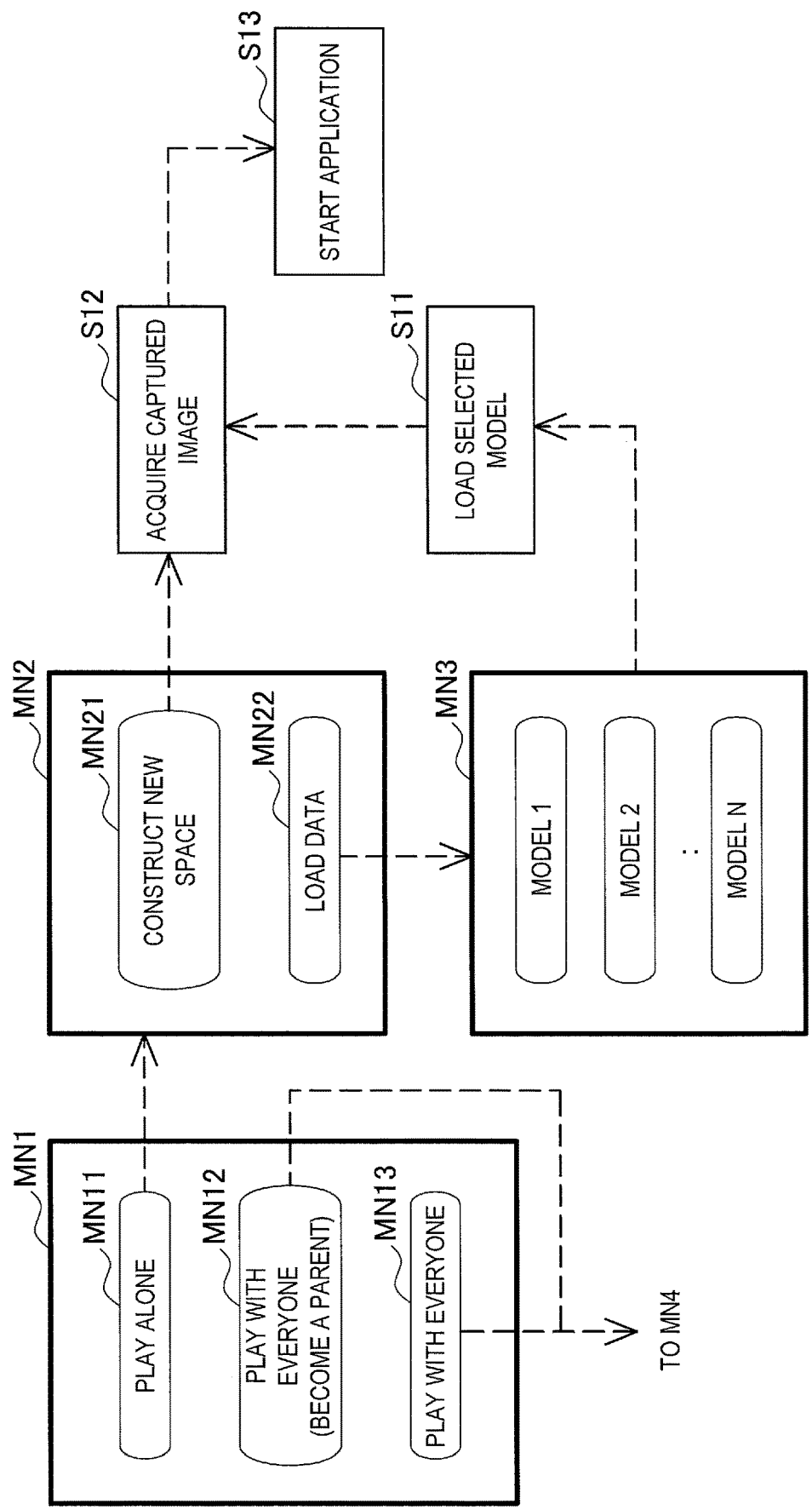

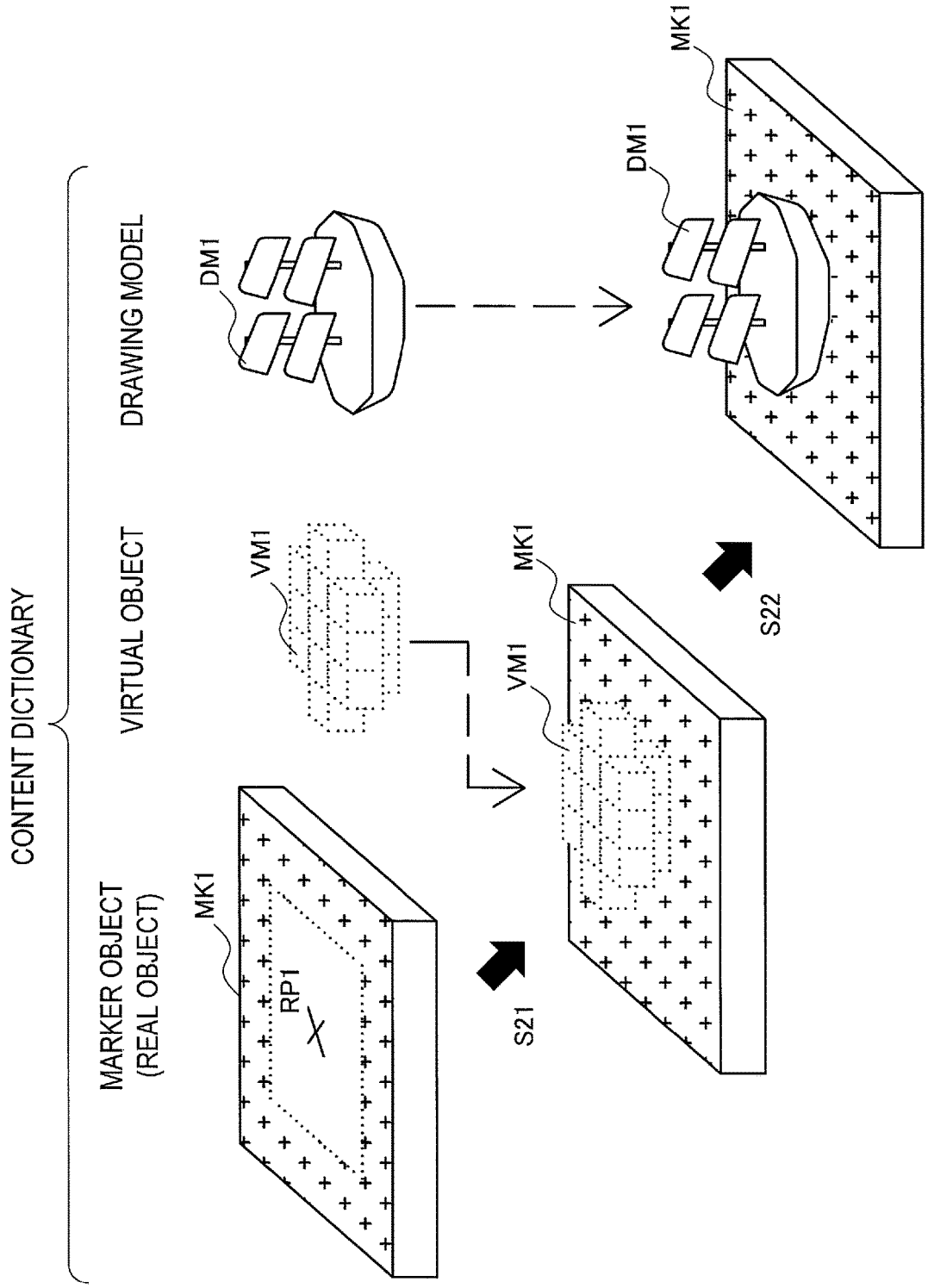

INFORMATION PROCESSING DEVICE, CLIENT DEVICE, INFORMATION PROCESSING METHOD, AND PROGRAM

CROSS REFERENCE TO PRIOR APPLICATION

This application is a National Stage Patent Application of PCT International Patent Application No. PCT/JP2013/081408 (filed on Nov. 21, 2013) under 35 U.S.C. § 371, which claims priority to Japanese Patent Application No. 2013-018436 (filed on Feb. 1, 2013), which are all hereby incorporated by reference in their entirety.

TECHNICAL FIELD

The present disclosure relates to an information processing device, a client device, an information processing method, and a program.

BACKGROUND ART

In the past, a variety of virtual reality (VR) technologies that present an artificially constructed virtual space to a user have been practically implemented. For example, Patent Literature 1 proposes a technology for achieving high operability when a user operates an avatar existing in a virtual space. In contrast, augmented reality (AR) technology, which has become the focus of recent attention, presents to a user an augmented reality space (AR space) by partially modifying a real space. With typical AR technology, a virtually generated object (virtual object) is superimposed onto an image from an image capture device pointed at a real space, providing a user experience as though that object exists in the real space depicted in the image.

CITATION LIST

Patent Literature

[Patent Literature 1] JP 2003-150978A

SUMMARY OF INVENTION

Technical Problem

By using a user avatar as a virtual object in AR technology, an application is realized in which an AR avatar may be expressed. However, simply having an image of a real space as the background of the space in which an avatar is active does not sufficiently demonstrate the appeal of augmented reality.

Accordingly, the present disclosure proposes a mechanism for providing an appealing user experience that makes good use of the characteristics of augmented reality as opposed to virtual reality.

Solution to Problem

According to an embodiment of the present disclosure, there is provided an information processing device including an image acquisition unit that acquires a captured image of a real space from an image capture device, a setting unit that sets, in association with the real space, an augmented reality space that virtually augments the real space depicted in the captured image, and a control unit that determines a target position for an action executed within the augmented reality space, on a basis of a positional relationship between an object within the augmented reality space and an optical axis of the image capture device.

According to an embodiment of the present disclosure, there is provided a client device including an image capture unit that generates a captured image by capturing a real space, a communication unit that communicates with a server device that sets, in association with the real space depicted in the captured image, an augmented reality space that virtually augments the real space, and determines a target position for an action executed within the augmented reality space, on a basis of a positional relationship between an object within the set augmented reality space and an optical axis of the image capture unit, and a control unit that causes an image expressing the action executed within the augmented reality space at the target position determined by the server device to be displayed on a screen.

According to an embodiment of the present disclosure, there is provided an information processing method executed by a client device provided with an image capture unit and a communication unit that communicates with a server device. The server device sets, in association with a real space depicted in a captured image, an augmented reality space that virtually augments the real space, and determines a target position for an action executed within the augmented reality space, on a basis of a positional relationship between an object within the set augmented reality space and an optical axis of the image capture unit, the information processing method including generating the captured image by using the image capture unit to capture a real space, and causing an image expressing the action executed within the augmented reality space at the target position determined by the server device to be displayed on a screen.

According to an embodiment of the present disclosure, there is provided a program for causing a computer that controls a client device to function as an image acquisition unit that acquires a captured image of a real space from an image capture device, and a control unit that causes an image expressing an action executed within an augmented reality space at a target position to be displayed on a screen, the target position being determined by a server device that sets, in association with the real space depicted in the captured image, the augmented reality space that virtually augments the real space, and determines a target position for the action executed within the augmented reality space, on a basis of a positional relationship between an object within the set augmented reality space and an optical axis of the image capture device.

Advantageous Effects of Invention

According to the technology in accordance with present disclosure, it is possible to provide an appealing user experience that makes good use of the characteristics of augmented reality.

BRIEF DESCRIPTION OF DRAWINGS

FIG. 5 is an explanatory diagram for describing a coordinate system for an AR space.

FIG. 6 is an explanatory diagram for describing an example of the discretization of a real object.

FIG. 20 is an explanatory diagram for describing an example of an operation for moving an avatar.

FIG. 22 is an explanatory diagram for describing an example of an operation for changing the direction of an avatar.

FIG. 24A is a first explanatory diagram for describing a first example of an item-using action executed by an avatar.

FIG. 24B is a second explanatory diagram for describing a first example of an item-using action executed by an avatar.

FIG. 26 is an explanatory diagram for describing a second example of an item-using action executed by an avatar.

FIG. 27 is an explanatory diagram for describing a first example of communication via avatars.

FIG. 28 is an explanatory diagram for describing a second example of communication via avatars.

FIG. 30 is an explanatory diagram for describing an example of an operation for changing the position of an AR space.

FIG. 31 is an explanatory diagram for describing an example of an operation for changing the orientation of an AR space.

FIG. 33 is an explanatory diagram for describing a real-time mode and a snapshot mode.

FIG. 36 is an explanatory diagram for describing a camera perspective mode and an avatar perspective mode.

FIG. 42 is an explanatory diagram for describing for a first example of adjusting variable parameters of an AR space.

FIG. 46 is an explanatory diagram for describing change in the number of avatars in an AR space in a normal mode.

FIG. 50A is the first part of a transition diagram for describing an example of screen transitions for checking into an AR space.

FIG. 54 is an explanatory diagram for describing an exemplary modification of a technique for determining virtual object placement.

DESCRIPTION OF EMBODIMENTS

Figure 1:
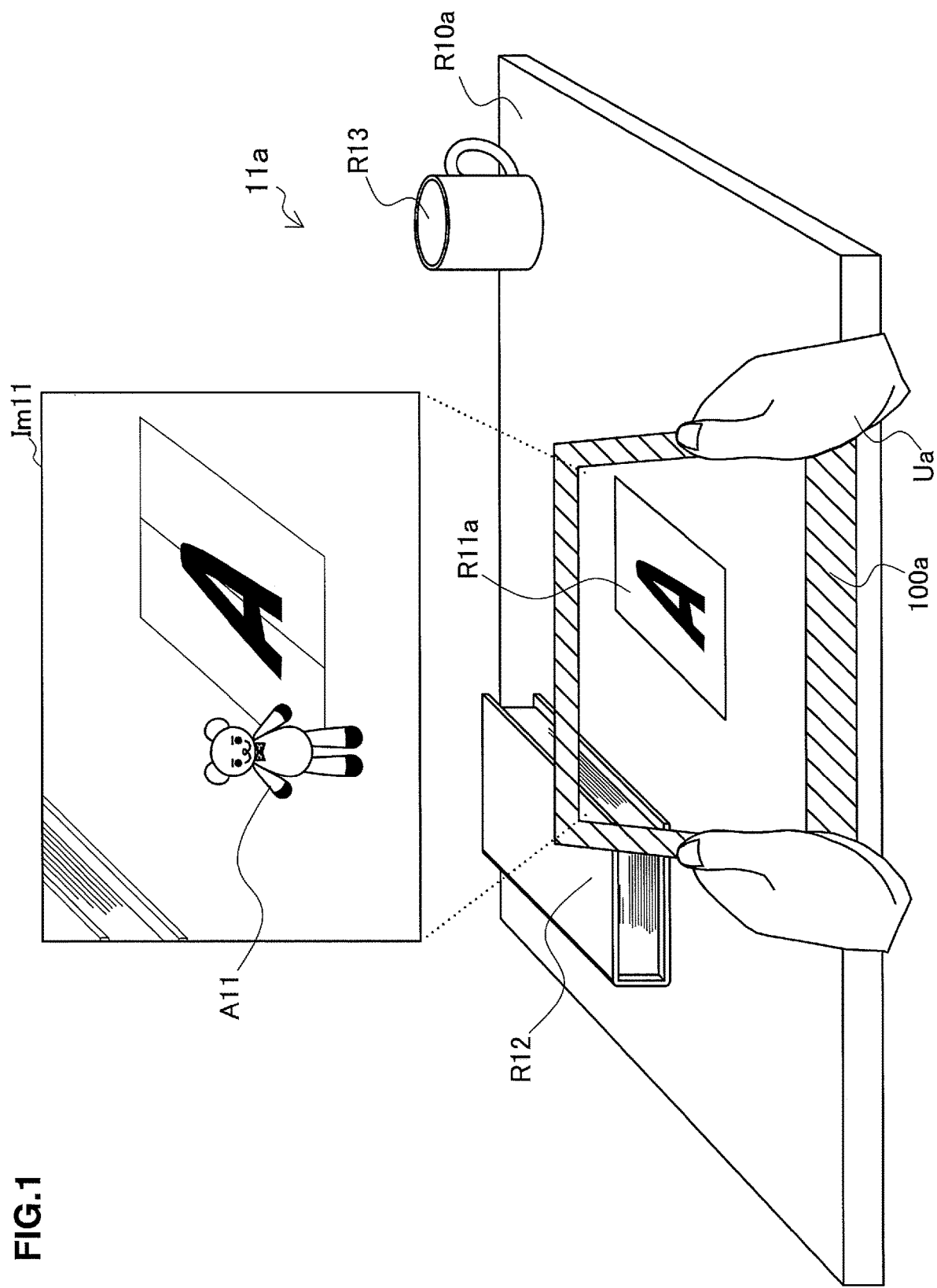
FIG. 1 is a first explanatory diagram for describing an overview of an information processing device according to an embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the description will proceed in the following order.
1. Overview
2. Exemplary configuration of information processing device according to embodiment
 2-1. Hardware configuration
 2-2. Logical function configuration
3. AR space settings
 3-1. Coordinate system of AR space
 3-2. Constructing AR space from real space map
 3-3. Customizing AR space
 3-4. Setting virtual object display attributes
 3-5. Sharing AR space
 3-6. Settings related to shared object
4. Virtual object operations
 4-1. Operation window examples
 4-2. Avatar actions
 4-3. Communication using avatars
 4-4. Operations on AR space
 4-5. Other operations
 4-6. Various operating modes
5. AR community
 5-1. Forming an AR community
 5-2. Adjusting variable parameters
 5-3. Setting initial position
 5-4. Various access modes
6. Process flow examples
 6-1. Screen transitions at check-in
 6-2. Executing AR application
 6-3. Action determination process
7. Exemplary modifications
 7-1. Client/server linkage
 7-2. Simple real space recognition
8. Conclusion <1. Overview>

Figure 2:
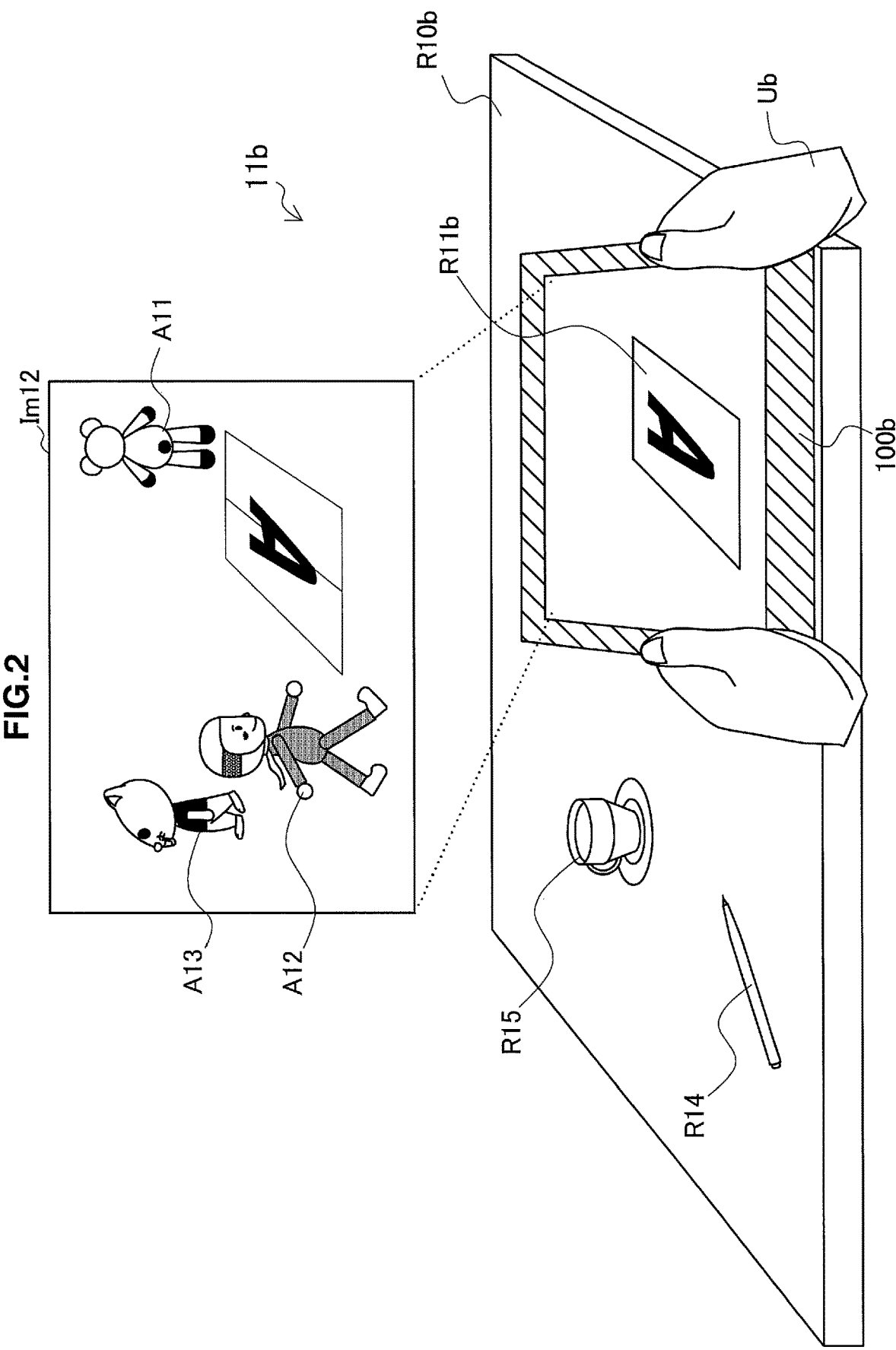
FIG. 2 is a second explanatory diagram for describing an overview of an information processing device according to an embodiment.

First, FIGS. 1 and 2 will be used to describe an overview of technology according to the present disclosure. FIGS. 1 and 2 are explanatory diagrams for describing an overview of an information processing device 100 according to an embodiment.

Referring to FIG. 1, an information processing device 100*a* possessed by a user Ua is illustrated. The user Ua is holding up the information processing device 100*a* towards a real space 11*a*. The information processing device 100*a* is equipped with a camera (image capture device) including a lens pointed at the real space 11*a*, and a display screen. In the example in FIG. 1, real objects R10*a*, R11*a*, R12, and R13 exist in the real space 11*a*. The real object R10*a* is a table. The real object R11*a* is a poster. The real object R12 is a book. The real object R13 is a mug. The camera of the information processing device 100*a* generates a captured image by capturing the real space 11*a*. The display of the information processing device 100*a* may display a captured image on-screen. The information processing device 100*a* may be equipped with a controller (not illustrated) that causes an augmented reality (AR) application to operate. The AR application receives a captured image depicting a real space as an input image, and outputs an output image superimposed with a virtual object to a display. In the example in FIG. 1, a virtual object A11 is superimposed onto an output image Im11 as though the virtual object A11 were standing on top of the table R10*a*.

Referring to FIG. 2, an information processing device 100*b* possessed by a user Ub is illustrated. The user Ub is holding up the information processing device 100*b* towards a real space 11*b*. The information processing device 100*b* is equipped with a camera (image capture device) including a lens pointed at the real space 11*b*, and a display screen. In the example in FIG. 2, real objects R10*b*, R11*b*, R14, and R15 exist in the real space 11*b*. The real object R10*b* is a table. The real object R11*b* is a poster. The real object R14 is a pen. The real object R15 is a coffee cup. The camera of the information processing device 100*b* generates a captured image by capturing the real space 11*b*. The display of the information processing device 100*b* may display a captured image on-screen. The information processing device 100*b* may be equipped with a controller (not illustrated) that causes an AR application to operate. The AR application receives a captured image depicting a real space as an input image, and outputs an output image superimposed with a virtual object to a display. In the example in FIG. 2, virtual objects A11, A12, and A13 are superimposed onto an output image Im12 as though the virtual objects A11, A12, and A13 were walking on top of the table R10*b*.

In the example in FIG. 1, the virtual object A11 is an avatar of the user Ua. The avatar A11 is placed within an augmented reality space (AR space) set in association with the real space 11*a*, and may execute various actions. The user Ua is able to enjoy the AR application by viewing or operating the avatar A11 displayed on-screen.

The AR application may be used by a lone user, or by multiple users. In the example in FIG. 2, the virtual object A11 is an avatar of the user Ua, while the virtual object A12 is an avatar of the user Ub. In other words, an AR space shared in common with the AR space set in association with the real space 11*a* in FIG. 1 is set in association with the real space 11*b* in FIG. 2. As a result, the same AR space is shared between the user Ua and the user Ub. The user Ua may use the information processing device 100*a* to operate the avatar A11, while the user Ub may use the information processing device 100*b* to operate the avatar A12. The avatar A11 and the avatar A12 are also capable of interacting with each other. As a result, communication between users via the AR application is established. The avatar A13 may be an avatar of yet another user, or a character who acts autonomously according to some kind of algorithm (also called a non-player character (NPC)).

In this way, when a user avatar is used as a virtual object with AR technology, simply having an image of a real space as the background of the space in which an avatar is active does not sufficiently demonstrate the appeal of augmented reality. Accordingly, the various embodiments described in detail in the following sections realize a mechanism for providing an appealing user experience that makes good use of the characteristics of augmented reality as opposed to virtual reality.

Note that in the following description, when the information processing devices 100*a*, and 100*b* are not being distinguished from each other, these devices will be collectively referred to as the information processing device 100 by omitting the trailing letters in the reference signs.

In FIGS. 1 and 2, a tablet device is illustrated as one example of an information processing device 100. However, the information processing device 100 is not limited to such an example. The information processing device 100 may also be a personal computer (PC), personal digital assistant (PDA), smartphone, game console, portable navigation device (PND), content player, digital appliance, or the like, for example. In addition, the information processing device 100 may also be a wearable device such as a head-mounted display (HMD). Also, instead of the AR application operating on a client operated by a user, the AR application may also operate on another device capable of communicating with the client (an application server, for example).

<2. Exemplary Configuration Of Information Processing Device According To Embodiment>

[2-1. Hardware Configuration]

Figure 3:
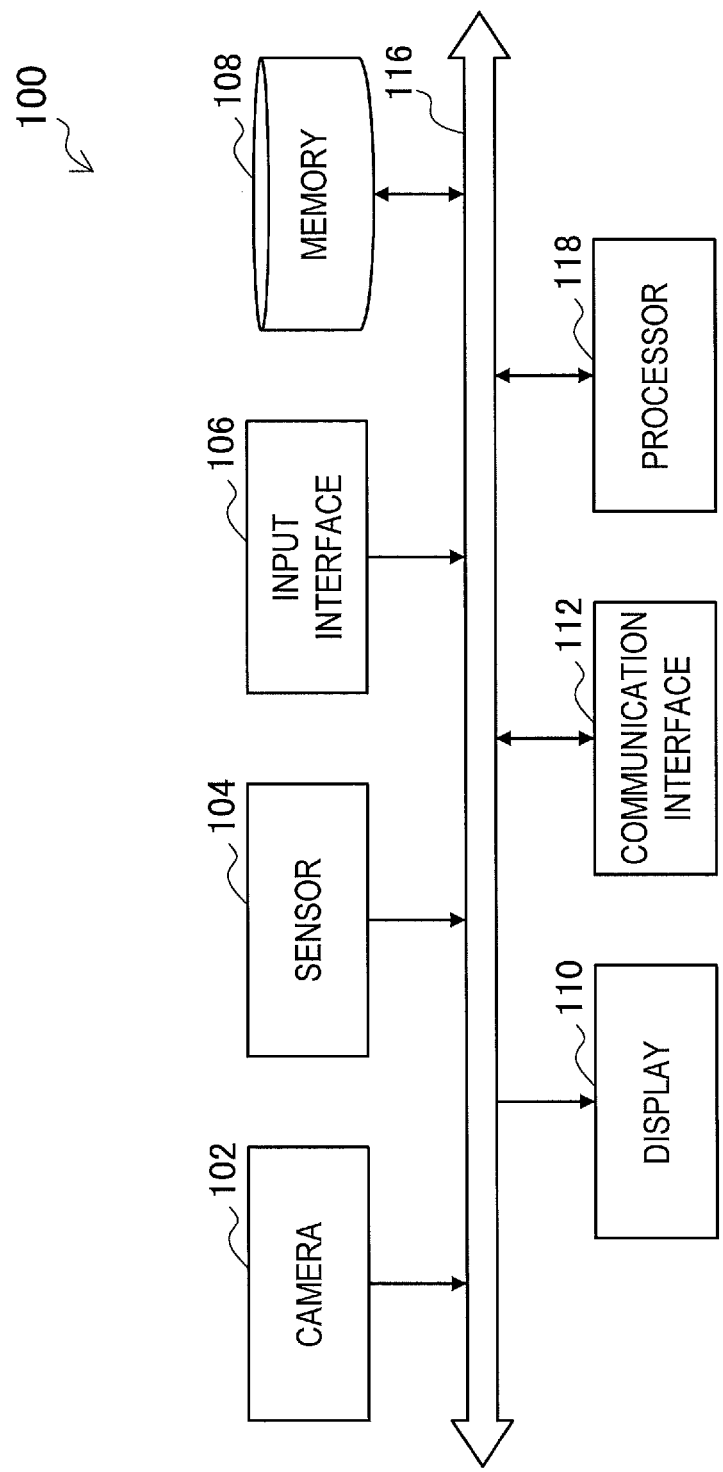
FIG. 3 is a block diagram illustrating an example of a hardware configuration of an information processing device according to an embodiment.

FIG. 3 is a block diagram illustrating an example of a hardware configuration of an information processing device 100 according to an embodiment. Referring to FIG. 3, the information processing device 100 is equipped with a camera 102, a sensor 104, an input interface 106, memory 108, a display 110, a communication interface 112, a bus 116, and a processor 118.

(1) Camera

The camera 102 is a camera module that captures images. The camera 102 is a device captures a real space using an image sensor such as a charge-coupled device (CCD) or complementary metal-oxide-semiconductor (CMOS) sensor, and generates a captured image. A captured image generated by the camera 102 becomes an input image for information processing executed by the processor 118. Note that the camera 102 is not strictly limited to being part of the information processing device 100. For example, an image capture device connected to the information processing device 100 in a wired or wireless manner may also be treated as the camera 102.

(2) Sensor

The sensor 104 is a sensor module including a positioning sensor that measures the geographical position of the information processing device 100. For example, the positioning sensor may receive Global Positioning System (GPS) signals to measure latitude, longitude, and altitude, or measure position on the basis of wireless signals transmitted and received to and from wireless access points. Furthermore, the sensor 104 may also include other types of sensors, such as an acceleration sensor and a gyroscopic sensor. Sensor data generated by the sensor 104 may be used for various applications, such as to assist in recognition of a real space, to acquire specialized data for a geographic position, or to detect user input.

(3) Input Interface

The input interface 106 is an input device used in order for a user to operate the information processing device 100 or input information into the information processing device 100. The input interface 106 may include a touch sensor that detects touches performed by a user on the screen of the display 110 (or a case surface on the opposite side of the screen), for example. Instead of (or in addition to) the above, the input interface 106 may also include other types of input devices, such as buttons, switches, a keypad, or a pointing device. In addition, the input interface 106 may also include a speech input module that recognizes speech commands uttered by the user as user input, or a gaze detection module that detects the direction of the user's gaze as user input.

(4) Memory

The memory 108 is realized with a storage medium such as semiconductor memory or a hard disk, and stores programs and data used in processing by the information processing device 100. Data stored by the memory 108 may include captured image data, sensor data, and various data inside the data storage unit discussed later. Note that some of the programs and data described in this specification may also be acquired from an external data source (such as a data server, network storage, or externally attached memory, for example), rather than being stored in the memory 108.

(5) Display

The display 110 is a display module that includes a display such as a liquid crystal display (LCD), an organic light-emitting diode (OLED), or a cathode ray tube (CRT). The display 110 is used to display AR application images generated by the information processing device 100, for example. Note that the display 110 is likewise not strictly limited to being part of the information processing device 100. For example, an image display device connected to the information processing device 100 in a wired or wireless manner may also be treated as the display 110.

(6) Communication Unit

The communication interface 112 is a communication interface that mediates communication between the information processing device 100 and another device. The communication interface 112 supports an arbitrary wireless communication protocol or wired communication protocol, and establishes a communication connection with another device.

(7) Bus

The bus 116 connects the camera 102, the sensor 104, the input interface 106, the memory 108, the display 110, the communication interface 112, and the processor 118 to each other.

(8) Controller

The processor 118 may correspond to a central processing unit (CPU), a digital signal processor (DSP), or the like. The processor 118 causes various functions of the information processing device 100 described later to operate by executing a program stored in the memory 108 or another storage medium.

[2-2. Logical Function Configuration]

Figure 4:
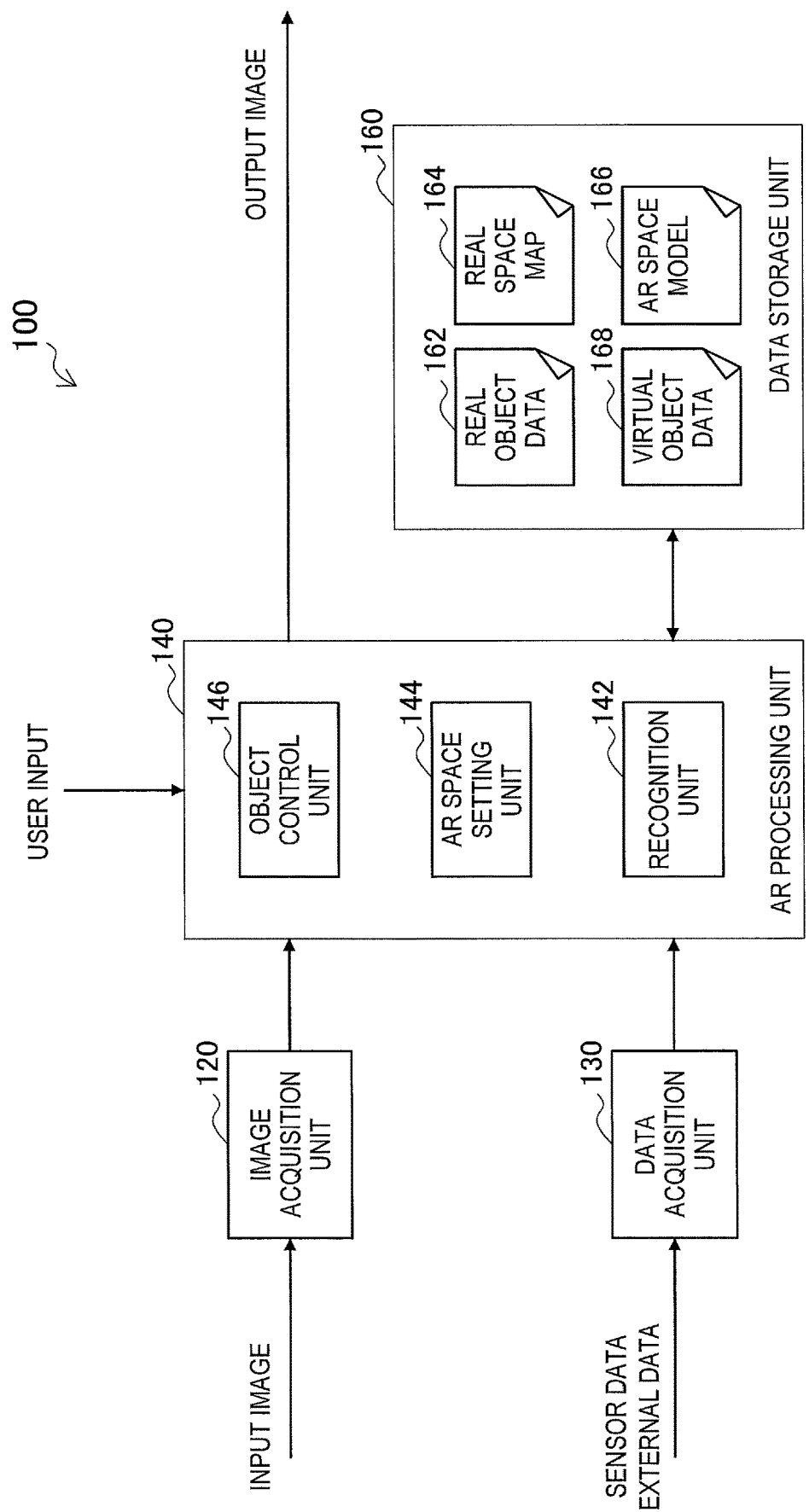
FIG. 4 is a block diagram illustrating an example of a configuration of logical functions of an information processing device according to an embodiment.

FIG. 4 is a block diagram illustrating an exemplary configuration of logical functions realized by the memory 108 and the processor 118 of the information processing device 100 illustrated in FIG. 3. Referring to FIG. 4, the information processing device 100 is equipped with an image acquisition unit 120, a data acquisition unit 130, an AR processing unit 140, and a data storage unit 160. The AR processing unit 140 includes a recognition unit 142, an AR space setting unit 144, and an object control unit 146.

(1) Image Acquisition Unit

The image acquisition unit 120 acquires captured images depicting a real space from the camera 102 as input images. Input images acquired by the image acquisition unit 120 are typically respective frames constituting a video. The image acquisition unit 120 outputs acquired input images to the AR processing unit 140.

(2) Data Acquisition Unit

The data acquisition unit 130 acquires data used in order for the AR processing unit 140 to cause the AR application to operate. For example, the data acquisition unit 130 acquires sensor data generated by the sensor 104, and external data received from an external device via the communication interface 112. The respective data inside the data storage unit 160 described later may be stored in advance by the information processing device 100, or dynamically received from an external device.

(3) Recognition Unit

The recognition unit 142 recognizes real objects depicted in an input image input from the image acquisition unit 120, and generates a real space map 164 that expresses the position and orientation of each recognized real object in the real space. In addition, the recognition unit 142 also recognizes the position and orientation of the information processing device 100 (camera 102). The recognition unit 142 may, for example, recognize the three-dimensional position and orientation of real objects and the information processing device 100 according to an established image recognition algorithm such as the structure from motion (SfM) technique of the simultaneous localization and mapping (SLAM) technique. As an example, JP 2011-159162A discloses a technique for dynamically constructing a real space map (environment map) by utilizing the SLAM technique. By applying such a technique, the recognition unit 142 is able to recognize the three-dimensional position and orientation of real objects and the information processing device 100 in real-time, and generate a real space map 164. Otherwise, the recognition unit 142 may also recognize the relative position and orientation of real objects with respect to the information processing device 100, on the basis of depth data from a depth sensor which may be additionally provided in the camera 102. The recognition unit 142 may also execute a recognition process on the basis of output data from an environment recognition system, such as an infrared ranging system or a motion capture system. The recognition unit 142 causes the data storage unit 160 to store the real space map 164, which may be updated every time a new input image is input.

(4) AR Space Setting Unit

The AR space setting unit 144 sets an augmented reality space (AR space) that virtually augments a real space depicted in an input image. In the present embodiment, an AR space is a three-dimensional space set in association with a real space. The avatars and other virtual objects described using FIGS. 1 and 2 are placed within an AR space set by the AR space setting unit 144, and conduct various actions within the AR space. Since an AR space is set in association with a real space, even if the angle of view of the camera 102 changes, for example, it is still possible to present a display in which a virtual object appears to remain at the same position within the real space, or a display in which an avatar appears to move over the surface of a real object. The AR space setting unit 144 generates or acquires an AR space model 166 that expresses an AR space to set, and causes the data storage unit 160 to store the AR space model 166.

In a working example, the AR space setting unit 144 generates an AR space model 166 by discretizing, in units of voxels, real objects within a real space depicted in an input image (for example, respective objects expressed by a real space map 164). A voxel is a unit element having volume. Ordinarily, small three-dimensional cubic blocks may be used as voxels. In another working example, the AR space setting unit 144 acquires an AR space model 166 generated on the basis of another user's captured image as external data. The AR space expressed by the AR space model 166 may differ depending on related information that relates to a captured image. Various techniques for setting such an AR space will be further described later.

In an AR space model 166, virtual objects that correspond to real objects within a real space discretely express, for example, the shapes of those real objects in units of voxels. The AR space setting unit 144 may set display attributes of these virtual objects (such as texture and color, for example) according to various conditions. Various conditions for setting display attributes of virtual objects will be further described later.

(5) Object Control Unit

The object control unit 146 places virtual objects within an AR space, and causes placed virtual objects to be displayed on-screen. The virtual objects placed by the object control unit 146 include user avatars as described using FIGS. 1 and 2. In addition, the virtual objects may also include objects that differ from avatars (such as message objects for chat or other communication, or autonomously acting characters, for example). The object control unit 146 may also place an avatar or character at a place on a horizontal plane expressed by the AR space model 166, for example. Also, the object control unit 146 may place a virtual object related to some real object near that real object. Typically, the object control unit 146 places each virtual object so that the virtual objects do not interfere with each other. Herein, interference refers to two or more virtual objects occupying the same volumetric element within an AR space (and may also be expressed as object collision). For example, if an avatar interferes with a virtual object that corresponds to a real object, an unnatural display may be presented in an output image, in which the avatar appears to be sunk into the real object. The avoidance of such interference between objects will be further described later.

In the case in which a virtual object placed within an AR space is operable by a user, the object control unit 146 determines an action for that virtual object according to user input. Also, the object control unit 146 determines an action for an autonomously acting virtual object according to some kind of autonomous control algorithm (or artificial intelligence (AI)). The object control unit 146 then causes the virtual object to execute the determined action. Various user interfaces by which a user operates a virtual object (an avatar, for example) will be further described later.

The object control unit 146, on the basis of an input image input from the image acquisition unit 120 and user input, dynamically updates the state of one or more virtual objects within an AR space set by the AR space setting unit 144, and generates image of virtual objects. Images of respective virtual objects may be generated according to a pinhole model, on the basis of the position and orientation of the camera 102, as well as the position of orientation of each virtual object within the AR space, for example. The object control unit 146 then causes an image of a real space with the virtual object images superimposed (an output image) to be displayed on the screen of the display 110. As a result of the output image being dynamically updated in this way, an on-screen display may be realized in which a real space appears to be augmented by virtual objects.

(6) Data Storage Unit

The data storage unit 160 stores real object data 162, a real space map 164, an AR space model 166, and virtual object data 168.

The real object data 162 is data defining features of real objects that may exist in a real space. The real object data 162 may define a shape, size, and texture for individual real objects, or include image features for individual real objects, for example. The real object data 162 may be used in order for the recognition unit 142 to recognize a real object depicted in a captured image, for example.

The real space map 164 is data that expresses a position and orientation within a real space for individual real objects recognized by the recognition unit 142. The real space map 164 may be referenced when the AR space setting unit 144 sets an AR space, for example. The position and orientation of the camera 102 may be additionally expressed by the real space map 164.

The AR space model 166 is data that expresses an AR space set by the AR space setting unit 144. The AR space model 166 may be referenced when the object control unit 146 places a virtual object in an AR space, or determines an action for a virtual object, for example. The AR space model 166 may also include data expressing the position and orientation of each placed virtual object.

The virtual object data 168 is data defining features of virtual objects that may be placed in an AR space. For example, the virtual object data 168 defines a nickname, appearance, and types of executable actions for avatars selected by individual users. In addition, the virtual object data 168 may also define an appearance and types of executable actions for virtual objects that differ from avatars. The virtual object data 168 likewise may be referenced when the object control unit 146 places a virtual object in an AR space, or determines an action for a virtual object, for example.

Details of an AR application that may be realized by such an information processing device 100 will be further described in the next section.

<3. AR Space Settings>

In this section, various techniques for setting an AR space in association with a real space will be described.

[3-1. Coordinate System of AR Space]

The position and orientation of a virtual object is expressed in a coordinate system of an AR space (hereinafter called the AR coordinate system). The AR coordinate system may be the same as a coordinate system used in order to express the position and orientation of a real object in the real space map 164. The AR coordinate system may be set according to some real object depicted in an input image, or set according to a horizontal plane which may be estimated from sensor data.

As an example, a real object that is captured when the user starts the AR application is designated a reference object. The AR coordinate system may be set with reference to the position and orientation of a reference object recognized by the recognition unit 142. Referring to FIG. 5, a real object R11a is illustrated. The real object R11a is a poster with the letter "A" written thereon. Herein, the real object R11a is used as a reference object. The X-Y-Z coordinate system illustrated in FIG. 5 is set according to the position and orientation of the reference object R11a. This X-Y-Z coordinate system may be used as the AR coordinate system. The scale of the AR coordinate system may be set to match the size of the reference object R11a. Note that in the case in which a real space is recognized according to the SLAM technique discussed earlier, after capturing a reference object in the initial stage of recognition, it is possible to continue recognition of the real space without losing track of the AR coordinate system, even if the reference object moves outside the angle of view.

[3-2. Constructing AR Space from Real Space Map]

In a working example, the AR space setting unit 144 constructs an AR space by discretizing, in units of voxels as discussed earlier, individual real objects within a real space map 164 generated by the recognition unit 142, for example.

FIG. 6 is an explanatory diagram for describing an example of the discretization of a real object. Referring to the upper part of FIG. 6, a real object R12 existing on the surface of a real object R10a is illustrated. The position and orientation (P12, W12) of the real object R12 in the AR coordinate system is stated in the real space map 164 as a result of a recognition process executed by the recognition unit 142. The shape and size of the real object R12 may be predefined by the real object data 162. Consequently, the AR space setting unit 144 computes spatial boundaries of the real object R12 on the basis of the position, orientation, shape, and size of the real object R12, and is able to determine a range of voxels that the real object R12 occupies.

In the lower part of FIG. 6, a virtual object V12 corresponding to the set of voxels occupied by the real object R12 is illustrated. For example, since at least half the volume of the voxel VX1 is inside the spatial boundaries of the real object R12, the voxel VX1 constitutes part of the virtual object V12. On the other hand, since the voxel VX2 is outside the spatial boundaries of the real object R12, the voxel VX2 does not constitute part of the virtual object V12. The question of whether or not each voxel constitutes part of a real object may be expressed by one bit of information for each voxel, for example. In this way, discretizing real objects in units of voxels and distinguishing voxels occupied by a real object and unoccupied voxels in the AR space model 166 yields various merits when handling the AR space. These merits will be further described later.

Figure 7:
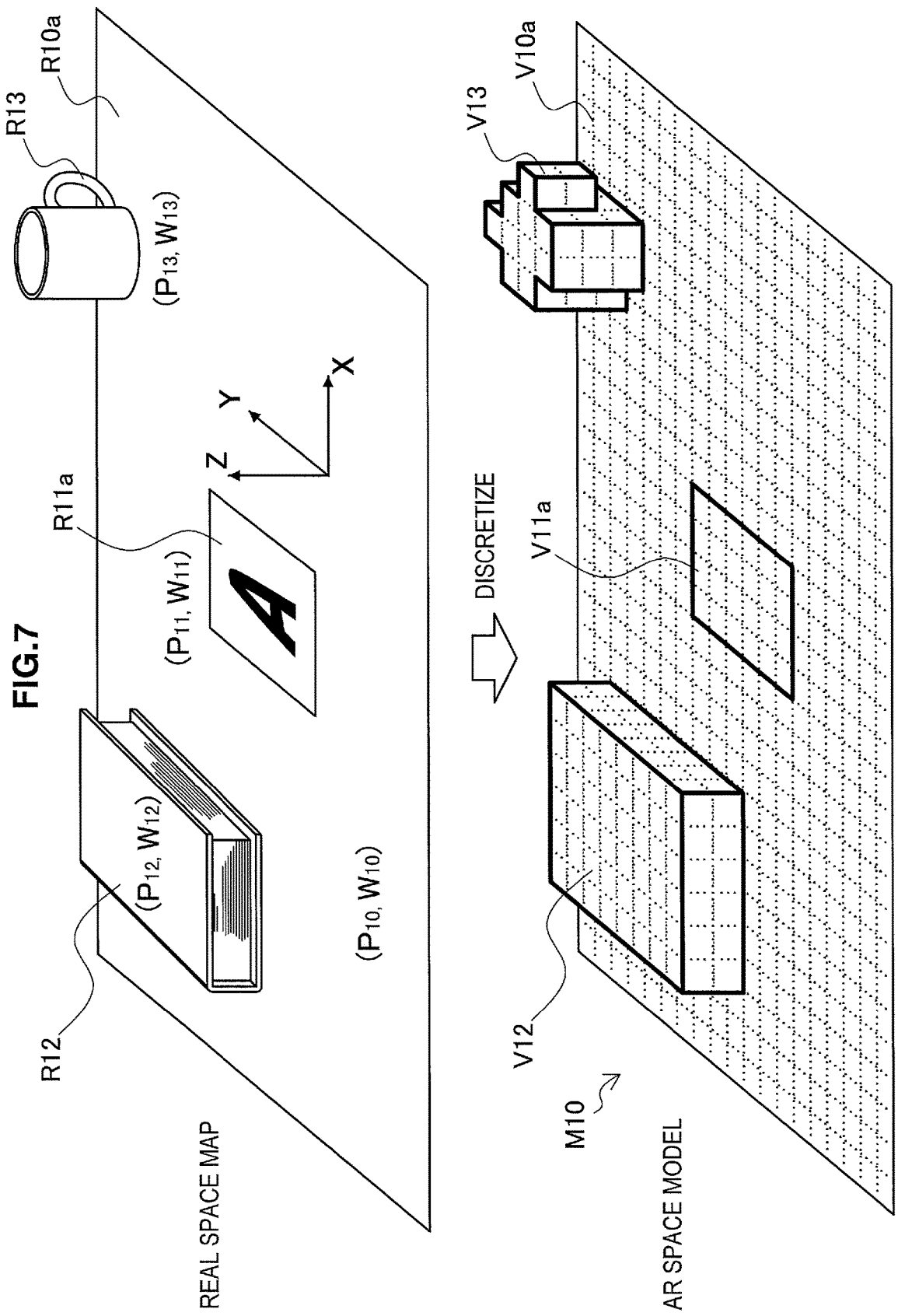
FIG. 7 is an explanatory diagram for describing an example of an AR space constructed from a real space map.

FIG. 7 is an explanatory diagram for describing an example of an AR space constructed from a real space map. In the upper part of FIG. 7, a real space map which may be generated by the recognition unit 142 for the real space 11a described using FIG. 1 is conceptually illustrated. This real space map includes the position and orientation (P10, W10) of a real object R10a, the position and orientation (P11, W11) of a real object R11a, the position and orientation (P12, W12) of a real object R12, and the position and orientation (P13, W13) of a real object R13. In the lower part of FIG. 7, an AR space model M10 which may be generated by discretizing a real space map for the real space 11a is conceptually illustrated. The AR space model M10 distinguishes voxels that are spatially occupied by the real objects R10a, R11a, R12, and R13. The virtual object V10a corresponds to the real object R10a, the virtual object V11a to the real object R11a, the virtual object V12 to the real object R12, and the virtual object V13 to the real object R13, respectively. Such an AR space model may be used in order to control the actions of avatars and other virtual objects within the AR space.

Note that a real space map and an AR space model may each be generated on the basis of a cumulative recognition result using multiple input images. In other words, during the phase in which an AR space is constructed, a single user may move the angle of view of the camera 102 so as to scan the nearby real space, and thereby generate a real space map and an AR space model over a wide spatial range recognized over multiple frames. Otherwise, a real space map and an AR space model over a wide spatial range may also be cooperatively generated from multiple input images of a real space captured in parallel by multiple users.

[3-3. Customizing AR Space]

Figure 8:
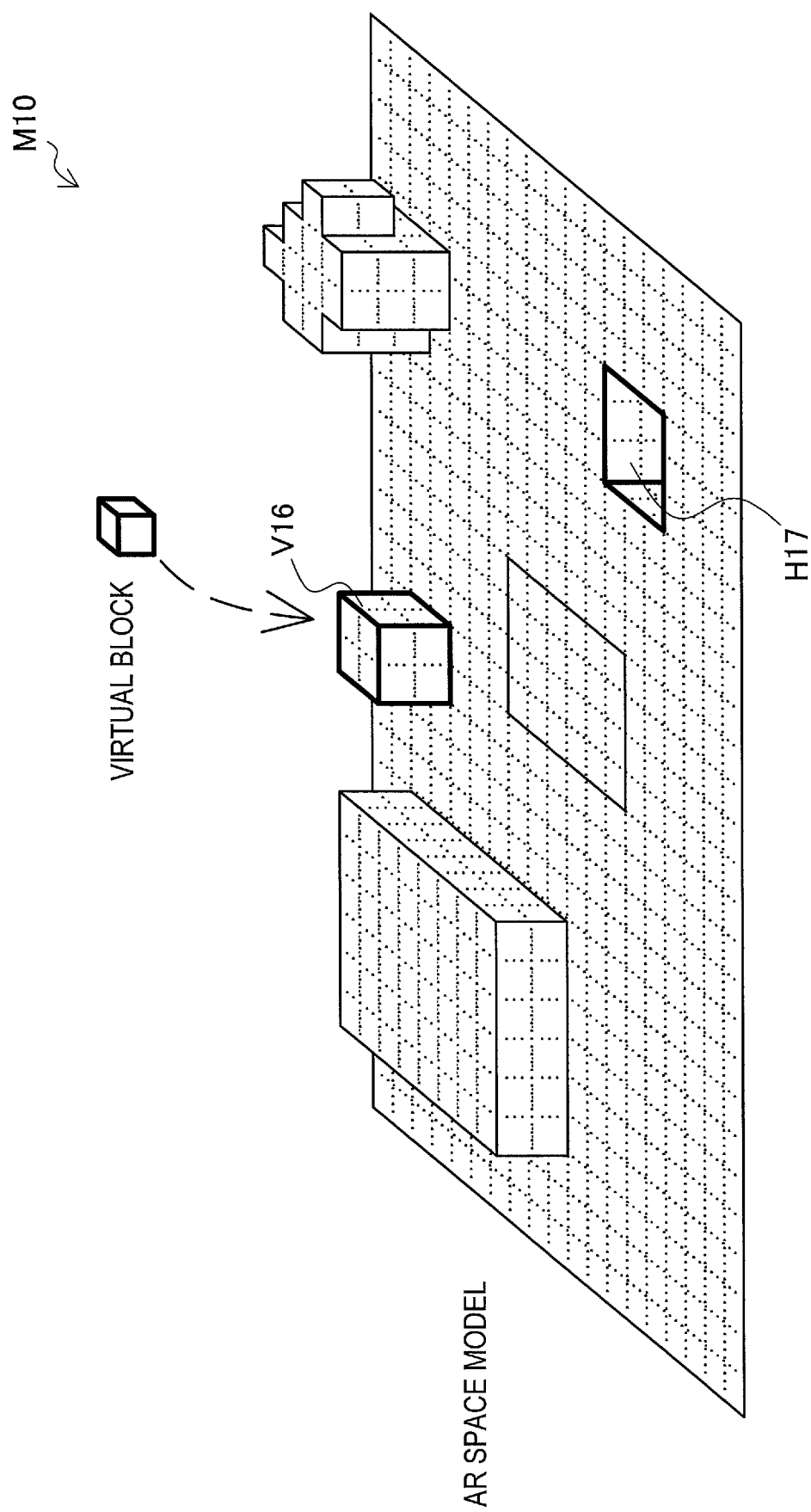
FIG. 8 is an explanatory diagram for describing an example of the customization of an AR space.

An AR space may also be customized by a user from the state of being constructed by discretizing a real space. FIG. 8 is an explanatory diagram for describing an example of the customization of an AR space. Referring to FIG. 8, the AR space model M10 illustrated in the lower part of FIG. 7 is again illustrated. However, in the example in FIG. 8, the AR space model M10 includes a virtual object V16 and a hollow H17. The virtual object V16 is a set of virtual blocks, and does not correspond to a real object. The voxels occupied by the virtual object V16 likewise may be distinguished by the AR space model M10. An example of a user interface for adding virtual blocks will be further described later. The hollow H17 is voxels that should have been occupied by a real object, and corresponds to voxels at which a real object does not exist. If such customization of an AR space is enabled, it becomes possible for a user to independently construct a field for a game or a field for communication with other users, according to his or her own intentions. For example, in a field for a competitive multiplayer game, the virtual object V16 may become an obstacle, while the hollow H17 may become a pitfall.

[3-4. Setting Virtual Object Display Attributes]

The AR space setting unit 144 may set display attributes of a virtual object corresponding to a real object in the AR space model 166 according to various conditions. Display attributes of a virtual object which may be set by the AR space setting unit 144 may include the texture and color of the virtual object. Hereinafter, several examples of techniques for setting display attributes of a virtual object corresponding to a real object will be described.

(1) First Example

Figure 9:
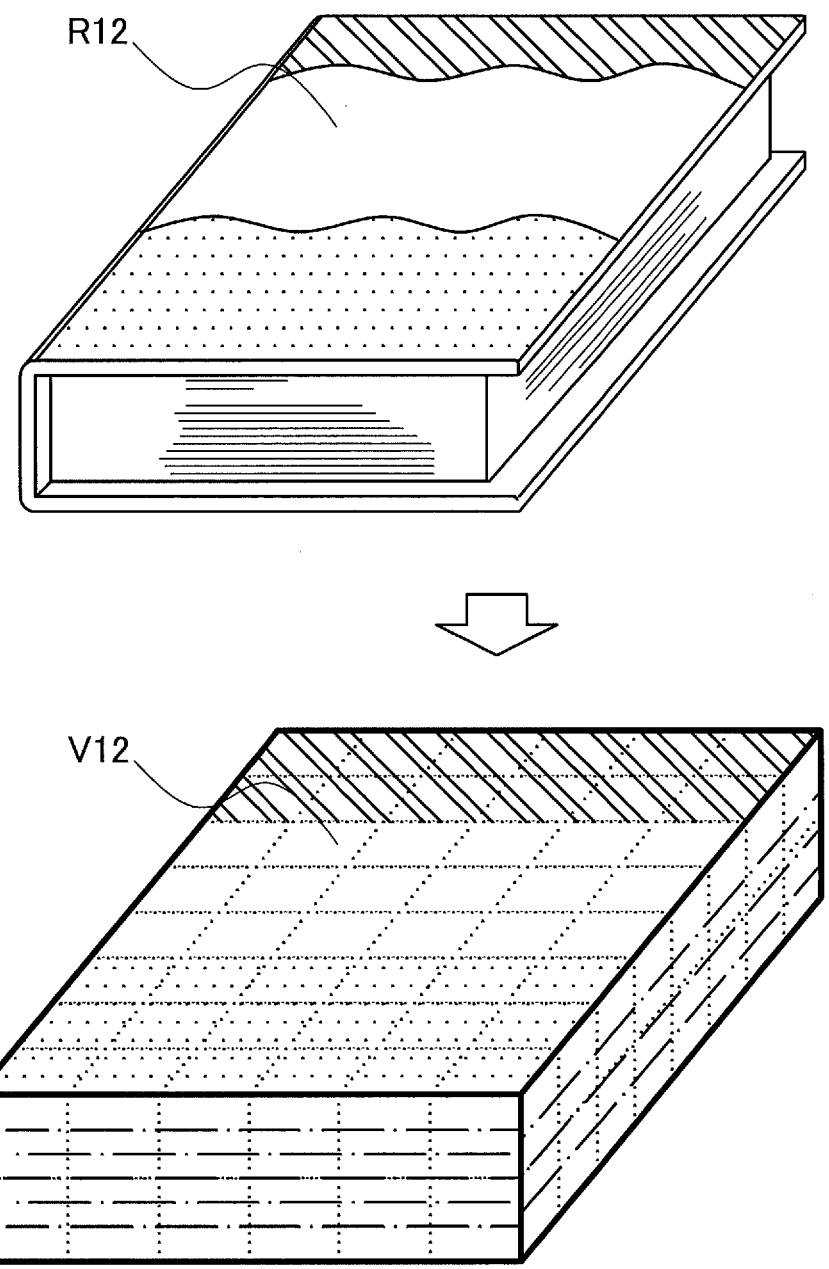
FIG. 9 is an explanatory diagram for describing a first example of a technique for setting a texture or color of a virtual object.

FIG. 9 is an explanatory diagram for describing a first example of a technique for setting a texture or color of a virtual object. In the first example, the AR space setting unit 144 sets the texture or color of each virtual object corresponding to each real object on the basis of the texture or color of that real object. In the upper part of FIG. 9, a real object R12 is illustrated. The real object R12 is a book, and a pattern is drawn on the cover. On the sides of the real object R12, the edges of stacked pages are visible. The AR space setting unit 144 sets the texture or color of the surface of a virtual object V12 corresponding to such a real object R12, on the basis of the texture or color of the real object R12, which may be acquired from an input image. In the lower part of FIG. 9, a virtual object V12 with applied texture or color is illustrated. In the example in FIG. 9, the texture or color is determined for each voxel face. Note that the texture or color of a virtual object may also be determined for each object, or for each face of a virtual object. According to such a technique, the appearance of a discretized virtual object will resemble the appearance of the corresponding real object, thus enabling a user to easily ascertain the conditions of the real space in an output image, even in the case in which a corresponding virtual object is displayed instead of a real object.

(2) Second Example

Figure 10:
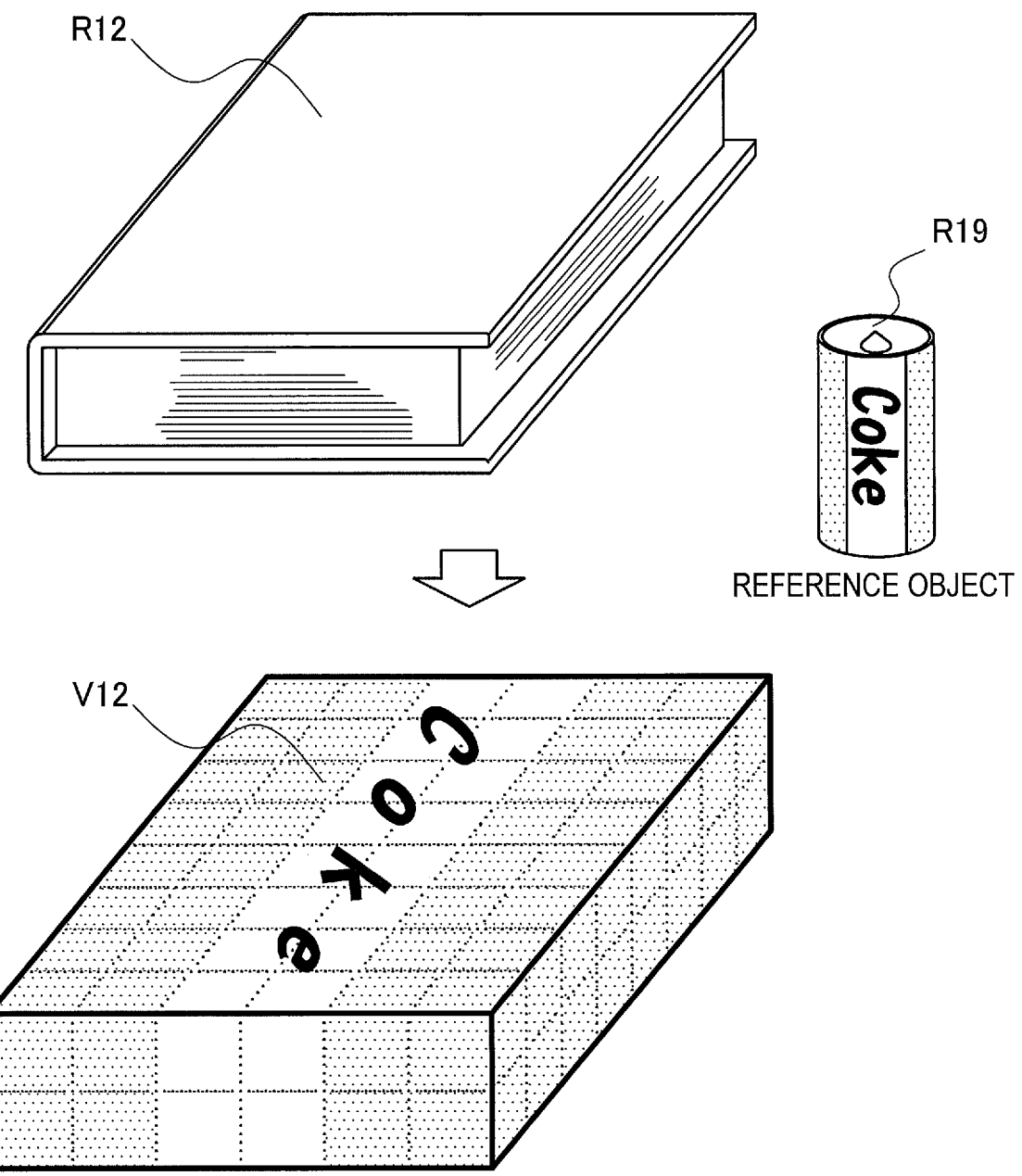
FIG. 10 is an explanatory diagram for describing a second example of a technique for setting a texture or color of a virtual object.

FIG. 10 is an explanatory diagram for describing a second example of a technique for setting a texture or color of a virtual object. In the second example, the AR space setting unit 144 sets the texture or color of each virtual object corresponding to each real object on the basis of the texture or color of a reference object. In the upper part of FIG. 10, real objects R12 and R19 are illustrated. The real object R12 is a book. The real object R19 is a beverage can. From between these two real objects, assume that the real object R19 is a reference object. The AR space setting unit 144 sets the texture or color of the surface of a virtual object V12 corresponding to the real object R12, on the basis of the texture or color of the reference object R19. In the lower part of FIG. 10, a virtual object V12 with applied texture is illustrated. In the example in FIG. 10, the texture of the virtual object V12 indicates an appearance that resembles the appearance of the reference object R19. According to such a technique, it becomes possible to provide a special AR space, such as one in which the space of a user's room is decorated with the appearance of a specific real object captured by the user. Also, a company planning a marketing campaign for a specific product may also provide an AR application that uses the product as a reference object. In such a case, a user's nearby space is decorated with the appearance of the product's packaging or logo, thereby heightening the user's awareness of the product, and potentially enticing a user's willingness to buy.

(3) Exemplary Modification

Figure 11:
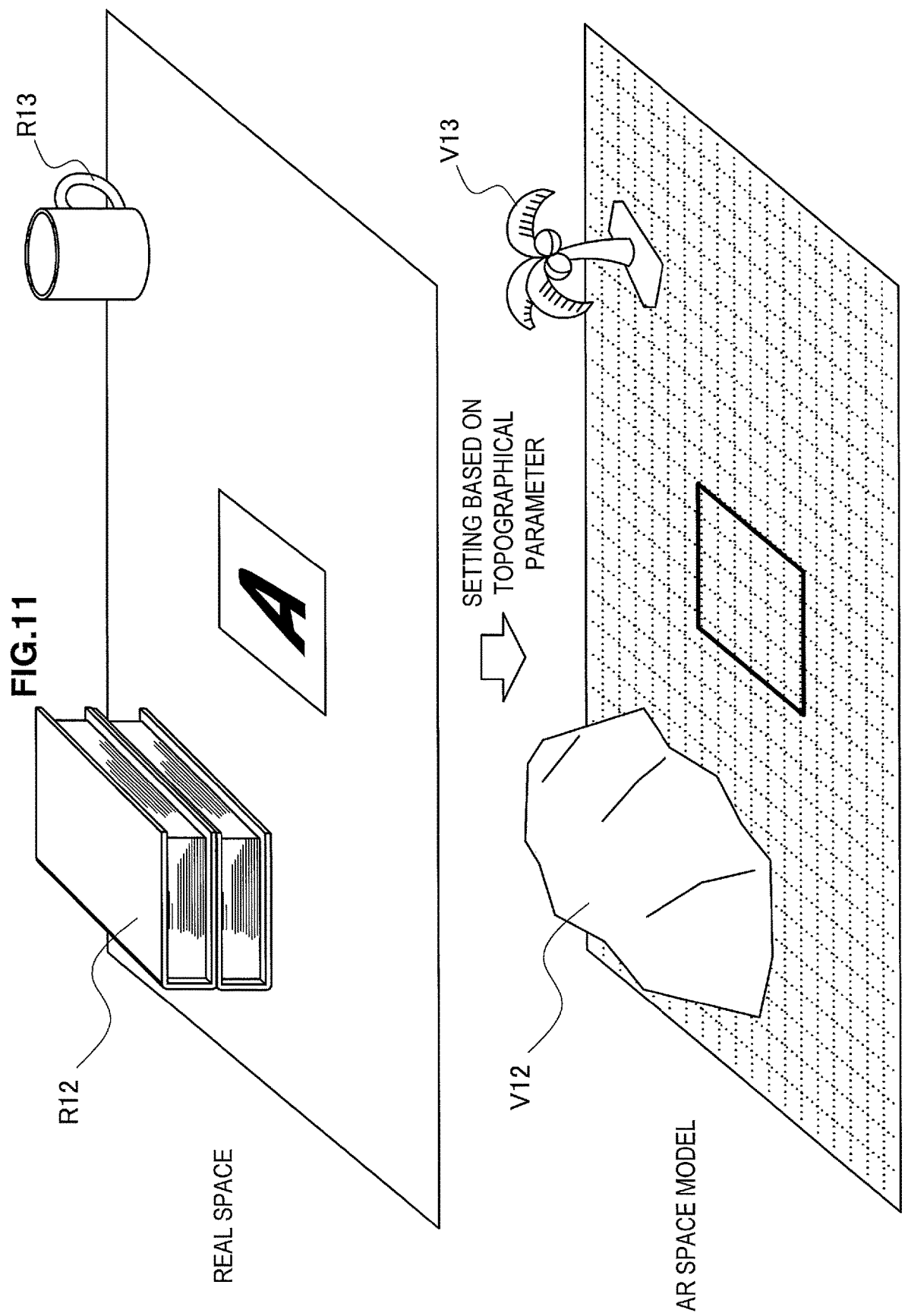
FIG. 11 is an explanatory diagram for describing an exemplary modification of a technique for setting display attributes of a virtual object.

FIG. 11 is an explanatory diagram for describing an exemplary modification of a technique for setting display attributes of a virtual object. Herein, the AR space setting unit 144 sets an appearance type of each virtual object corresponding to each real object on the basis of topographical parameters of that real object. Topographical parameters of a real object may include the horizontal width, the height from some reference surface, and the position of the real object, for example. In the upper part of FIG. 11, real objects R12 and R13 are illustrated. The real object R12 has a width above a first threshold and a height above a second threshold. The real object R13 has a width below the first threshold and a height above the second threshold. The AR space setting unit 144, on the basis of such topographical parameters, sets the appearance type of a virtual object V12 corresponding to the real object R12 to a mountain. Also, the AR space setting unit 144 sets the appearance type of a virtual object V13 corresponding to the real object R13 to a tree. The AR space setting unit 144 may also respective set the appearance type of an area having a height equal to the reference surface to the ground, and set the appearance type of an area having a height lower than the reference surface to a water surface. With such a technique, it is possible to provide a user with a special AR space in which the user's nearby space appears to be decorated with a natural landscape.

[3-5. Sharing AR Space]

An AR space constructed with a technique like those described up to this point may be utilized in order for a single user to enjoy an AR application, or utilized in order for multiple users to communicate via virtual objects such as avatars. In the latter case, simply having multiple users respectively and individually construct AR spaces does not result in those AR spaces being shared. Accordingly, in this section, several examples of techniques for sharing an AR space among multiple users will be described.

(1) First Example

Figure 12:
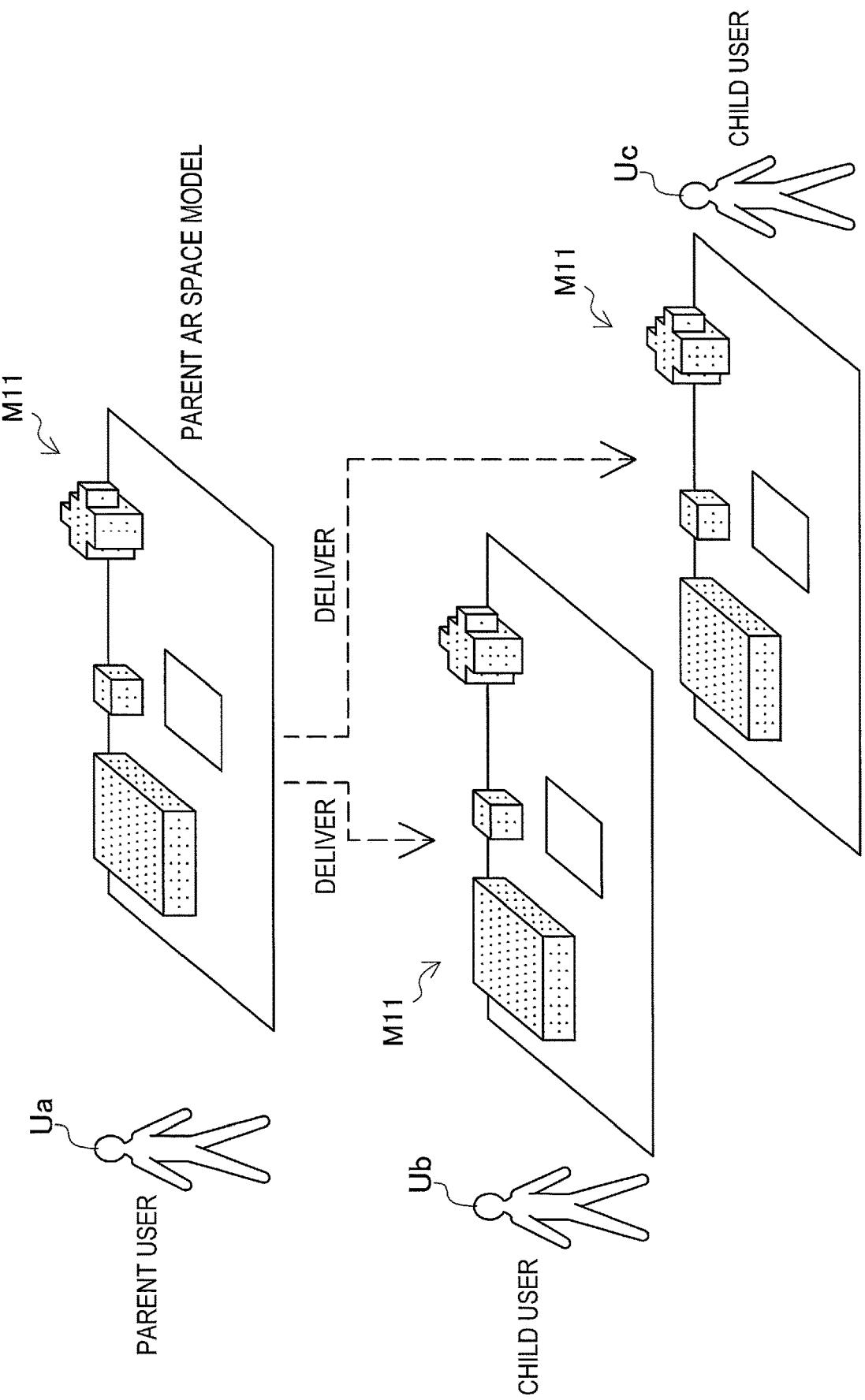
FIG. 12 is an explanatory diagram for describing for a first example of a technique for sharing an AR space among multiple users.

FIG. 12 is an explanatory diagram for describing for a first example of a technique for sharing an AR space among multiple users. In the first example, in the case in which an AR space is shared by multiple users, the AR space setting unit 144 applies, to each of the multiple users, an AR space set on the basis of a captured image from a parent user from among those multiple users. FIG. 12 illustrates users Ua, Ub, and Uc. Among these users, the user Ua is a parent user, while the users Ub and Uc are child users. The AR space model M11 is a model expressing an AR space set on the basis of a captured image from the parent user Ua (hereinafter called the parent AR space model). The parent AR space model M11 may be generated by discretizing a real space near the parent user Ua, for example. Subsequently, the parent AR space model M11 is respectively delivered to the devices of the child users Ub and Uc from the device of the parent user Ua or an application server. The AR space setting unit 144 of an information processing device 100 on the child user side references the parent AR space model acquired via the data acquisition unit 130, and sets the AR space expressed by the parent AR space model in association with a real space depicted in an input image acquired by the image acquisition unit 120. According to such a technique, it becomes possible to realize an AR application in which the avatar of a child user appears to visit the room of a selected parent user, for example.

(2) Second Example

Figure 13:
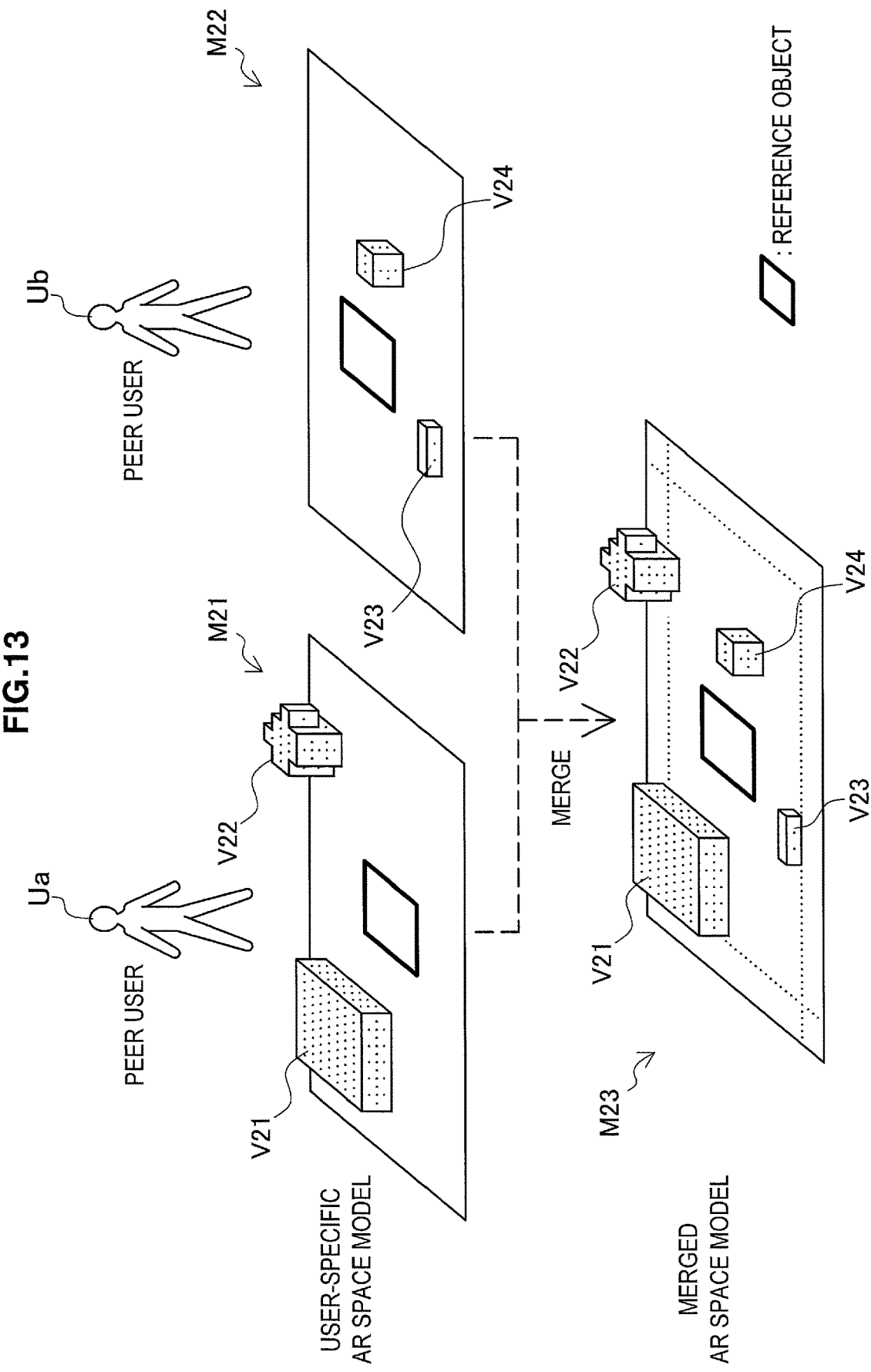
FIG. 13 is an explanatory diagram for describing for a second example of a technique for sharing an AR space among multiple users.

FIG. 13 is an explanatory diagram for describing for a second example of a technique for sharing an AR space among multiple users. In the second example, in the case in which an AR space is shared by multiple users, the AR space setting unit 144 forms a single AR space by merging multiple, user-specific AR spaces which are respectively constructed on the basis of captured images from those multiple users. The AR space setting unit 144 may merge multiple, user-specific AR spaces by calculating the sum of the multiple, user-specific AR spaces in units of voxels. FIG. 13 illustrates users Ua and Ub. The users Ua and Ub are mutual peer users. In the upper-left of FIG. 13, there is illustrated a user-specific AR space model M21 expressing a user-specific AR space constructed by discretizing a real space near the user Ua. In the upper-right of FIG. 13, there is illustrated a user-specific AR space model M22 expressing a user-specific AR space constructed by discretizing a real space near the user Ub. The user-specific AR space models M21 and M22 are merged on the devices of the users Ua and Ub or on an application server to form a single merged AR space model M23. In the example in FIG. 13, the user-specific AR space models M21 and M22 are first aligned by taking the position and orientation of a reference object as a reference, and then merged by calculating the logical OR in units of voxels, thereby forming the merged AR space model M23. Herein, a logical OR means that a voxel distinguished as being occupied by a real (virtual) object in at least one of the user-specific AR space models is also distinguished as being occupied by a real (virtual) object in the merged AR space model. For example, the user-specific AR space model M21 includes virtual objects V21 and V22 corresponding to real objects. The user-specific AR space model M22 includes virtual objects V23 and V24 corresponding to real objects. The merged AR space model M23 includes all of these virtual objects V21, V22, V23, and V24.

Herein, for the purpose of comparison, assume a situation in which the user-specific AR space model M22 (not the merged AR space model M23) is shared between the users Ua and Ub. The avatars described using FIGS. 1 and 2 may move within the AR space so as not to collide with other virtual objects. However, since the user-specific AR space model M22 does not include the virtual object V22, an avatar may pass the position of the virtual object V22. Since a real object does not exist at the position of the virtual object V22 on the side of the user Ub, such avatar movement does not pose a problem. However, on the side of the user Ua, a real object exists at the position of the virtual object V22, and for this reason an unnatural display may be presented in which an avatar appears to go right through that real object. In contrast, in the case in which the merged AR space model M23 is shared between the users Ua and Ub, the merged AR space model M23 includes all of the virtual objects V21, V22, V23, and V24, thereby effectively preventing an avatar within the shared AR space from interfering with a real object near either user. If the user-specific AR space models are discretized in units of voxels, it is possible to merge the AR space models with a small computational load by using a simple algorithm based on logical operations in units of voxels. Note that in other examples, a logical AND may also be computed instead of a logical OR.

(3) Third Example

Figure 14:
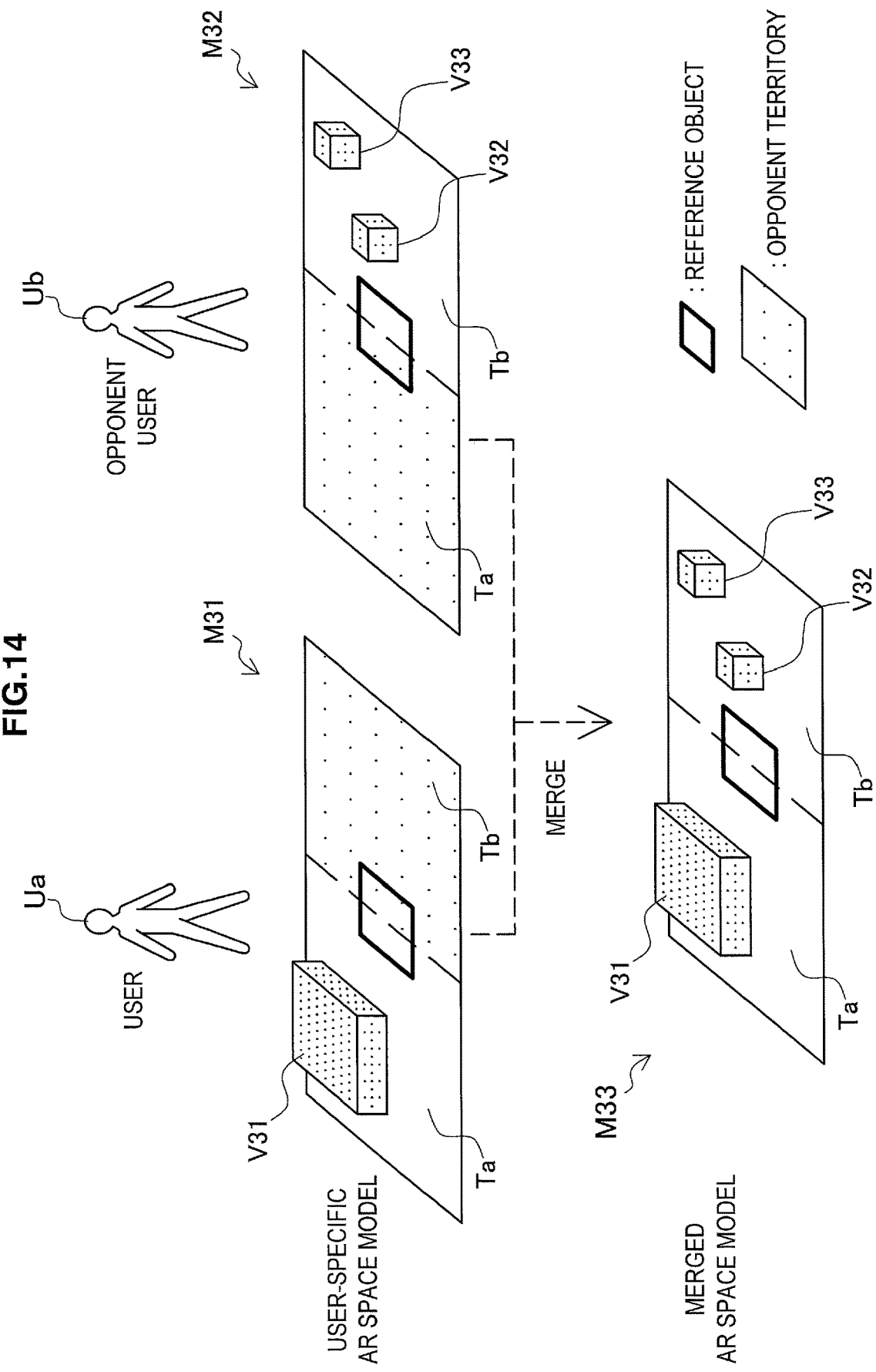
FIG. 14 is an explanatory diagram for describing for a third example of a technique for sharing an AR space among multiple users.

FIG. 14 is an explanatory diagram for describing for a third example of a technique for sharing an AR space among multiple users. In the third example, in the case in which an AR space is shared by multiple users, the AR space setting unit 144 forms a single AR space by merging multiple, user-specific AR spaces which are respectively constructed on the basis of captured images from those multiple users. The AR spaces are divided into multiple territories respectively assigned to each user, and the AR space setting unit 144 may merge user-specific augmented reality spaces by selecting respectively different user-specific augmented reality spaces for individual territories according to the user assignments of the individual territories, for example. FIG. 14 illustrates users Ua and Ub. The user Ub is the opponent of the user Ua. In the upper-left of FIG. 14, there is illustrated a user-specific AR space model M31 expressing a user-specific AR space constructed by discretizing a real space near the user Ua. In the upper-right of FIG. 14, there is illustrated a user-specific AR space model M32 expressing a user-specific AR space constructed by discretizing a real space near the user Ub. The user-specific AR space models M31 and M32 are merged on the devices of the users Ua and Ub or on an application server to form a single merged AR space model M33. In the example in FIG. 14, the left half of the AR space is a territory Ta assigned to the user Ua, while the right half of the AR space is a territory Tb assigned to the user Ub, taking the position of a reference object as a reference. The AR space setting unit 144 selects the user-specific AR space model M31 for the territory Ta, selects the user-specific AR space model M32 for the territory Ta, and forms the merged AR space model M33 by joining these selected user-specific AR space models at the territory boundary. The merged AR space model M33 includes a virtual object V31 that was included in the user-specific AR space model M31 in the territory Ta, and includes virtual objects V32 and V33 that were included in the user-specific AR space model M32 in the territory Tb.

According to such a technique, it becomes possible for multiple users to divide the task of constructing and customizing an AR space into separate territories. Also, in competitive multiplayer game applications (such as a survival game, dodgeball, or snowball fight played with avatars), it becomes possible for each user to construct his or her own base, in which the user-specific bases are joined to form a single multiplayer field as a whole.

Note that in any of the techniques, the AR space setting unit 144 may also set the display scale of an AR space shared by multiple users on the basis of the size of a reference object within a real space depicted in an input image, for example. For this reason, in the case in which an AR space model delivered from a server is used to set an AR space, for example, it is possible to avoid an unnatural display in which the set AR space appears to be floating above, or conversely sunken into, the real space. Otherwise, the display scale of the AR space may be set on the basis of the distance between the camera and some kind of reference surface, such as a floor surface, wall surface, or table surface in the real space, for example.

[3-6. Displaying Shared Objects]

(1) Virtual Object Display Attributes

In the case in which an AR space is shared among multiple users, there is a possibility that a virtual object corresponding to a real object that does not exist near a given user is included in the shared AR space model. In this case, if that virtual object is not displayed, the user will not recognize the existence of that object. On the other hand, even if a virtual object corresponding to a real object that does exist near a user is not displayed, since the real object is depicted in an input image, the user is able to recognize the existence of that object. When causing a virtual object corresponding to a real object to be displayed on-screen, the object control unit 146 may change the display attributes of the virtual object according to which user's captured image depicts the real object corresponding to that virtual object. For example, the object control unit 146 may hide or make semi-transparent a virtual object corresponding to a real object that is depicted in a captured image from the user of the current device, and superimpose onto an input image only virtual objects corresponding to real objects depicted in captured images from other users. In addition, the object control unit 146 may also set the texture or color of virtual objects corresponding to real objects depicted in captured images from other users differently for each user.

Figure 15:
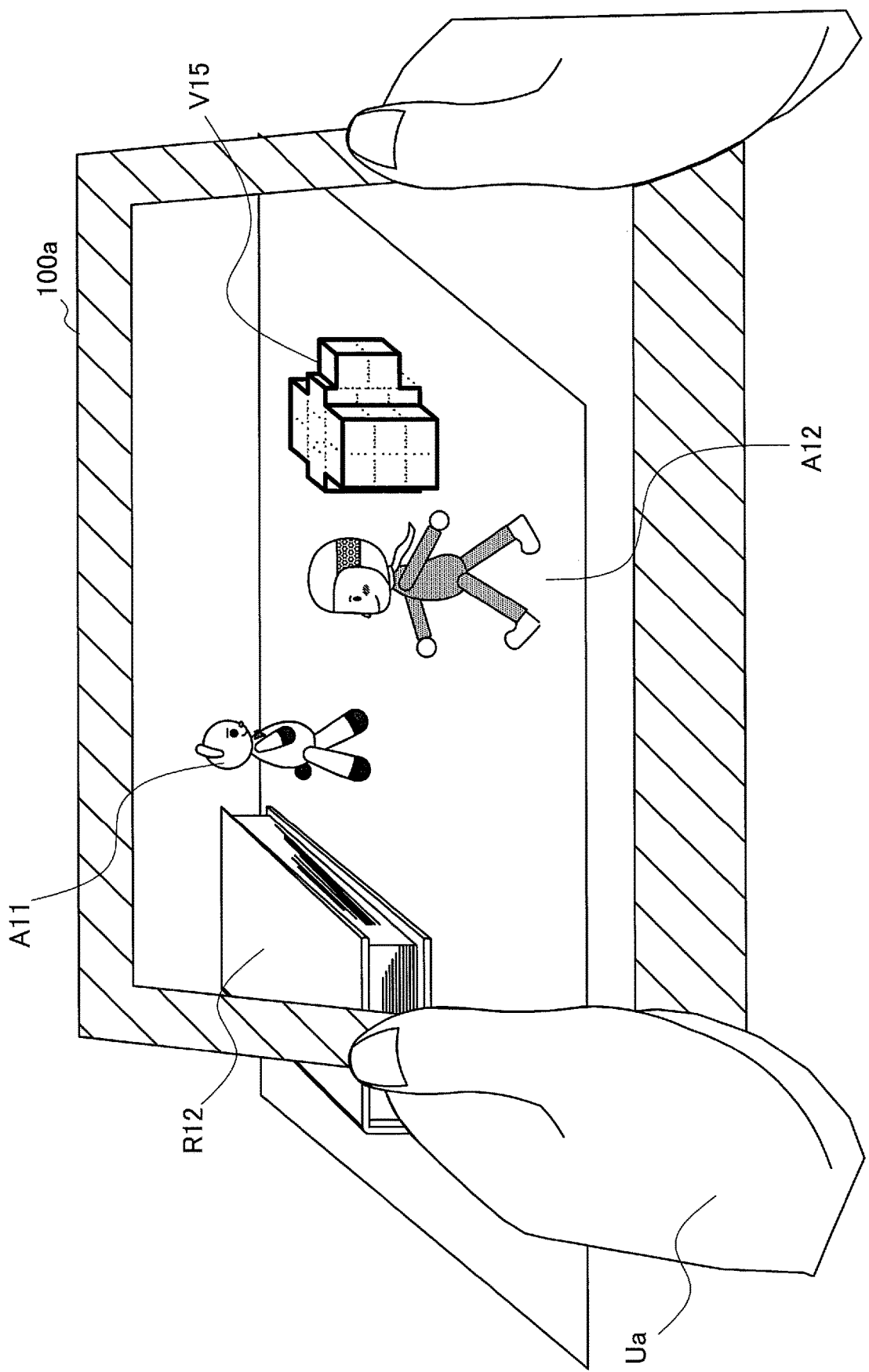
FIG. 15 is an explanatory diagram for describing an example of a display of an AR space shared by multiple users.

FIG. 15 is an explanatory diagram for describing an example of a display of an AR space shared by multiple users. Referring to FIG. 15, an information processing device 100*a* possessed by a user Ua is illustrated. On the screen of the information processing device 100*a*, there are displayed an avatar A11 of the user Ua and an avatar A12 of the user Ub superimposed onto an input image. The input image depicts a real object R12. The real object R12 exists in a real space near the user Ua. Additionally, a virtual object V15 is displayed on the screen of the information processing device 100*a*. A real object corresponding to the virtual object V15 does not exist in the real space near the user Ua, but does exist in a real space near the user Ub (not illustrated). By setting the display attributes of a virtual object in this way (in the example in FIG. 15, display/hide), a user is able to distinguish between objects that exist near himself or herself and all other objects within an AR application image. Also, in the case in which the display attributes of virtual objects are separately set for each user, it becomes possible for a user to distinguish which virtual objects originate from real objects near which users.

(2) Shared/Unshared Settings

In the case in which an AR space is shared among multiple users, there is a possibility that a user does not want other users to know what kinds of real objects exist near himself or herself. If starting an AR application required physically removing real objects that a user does not want other users to know about from a real space, the user would be inconvenienced. Accordingly, the AR space setting unit 144 may also set an AR space by discretizing only real objects specified by the user. Otherwise, the AR space setting unit 144 may also prompt the user to specify real objects to exclude from the AR space, and set the AR space by discretizing real objects that were not excluded.

Figure 16:
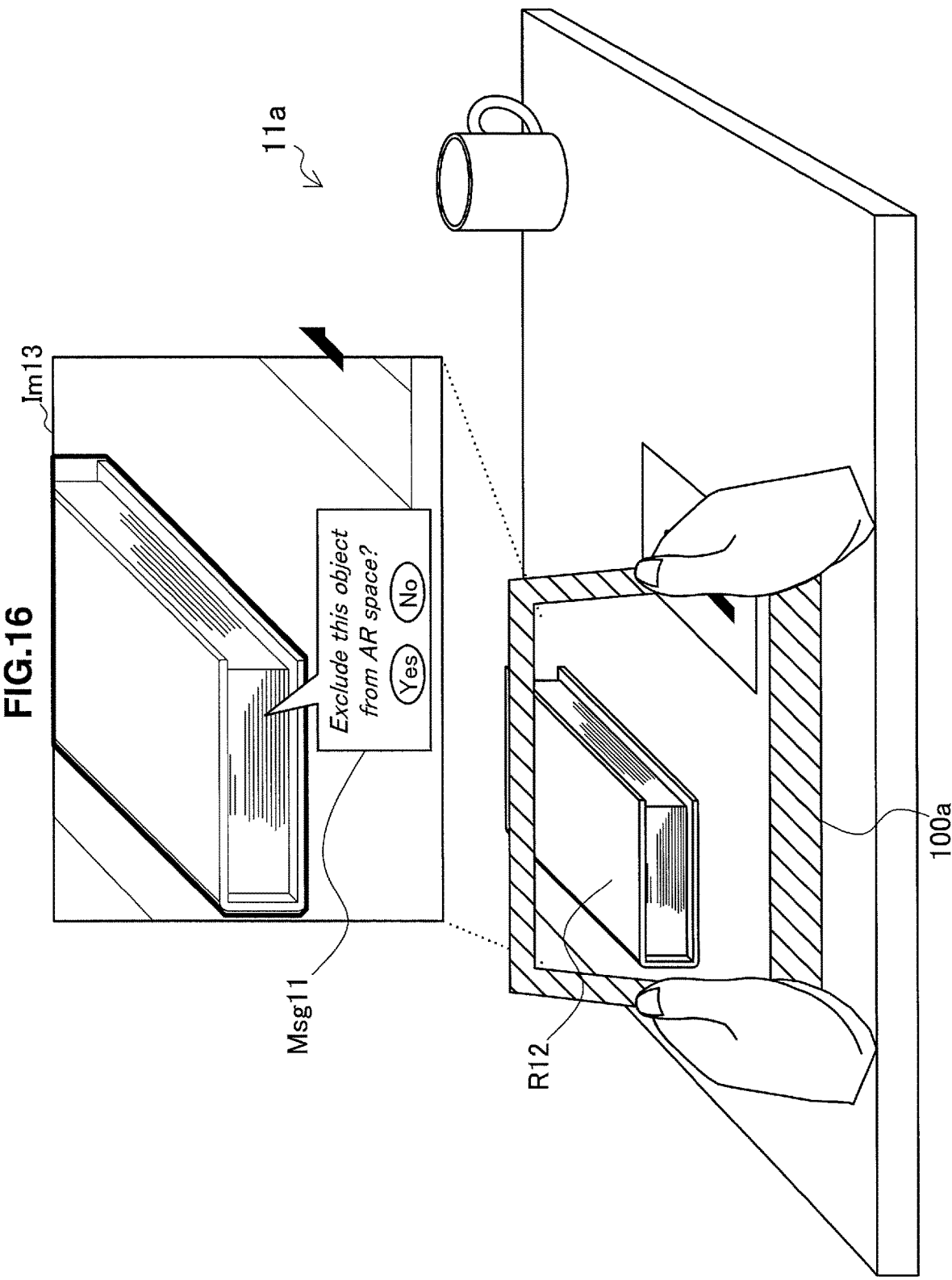
FIG. 16 is an explanatory diagram for describing an example of a user interface for specifying an object to share or not share.

FIG. 16 is an explanatory diagram for describing an example of a user interface by which a user specifies an object to share or not share. Referring to FIG. 16, an image Im13 depicting a real space 11*a* is displayed on-screen in the information processing device 100*a*. The image Im13 depicts a real object R12 existing in the real space 11*a*. The recognition unit 142 uses the real object data 162 to recognize the real object R12, for example. Before setting the AR space, the AR space setting unit 144 superimposes onto the image Im13 a message MSG11 querying whether or not to exclude the recognized real object R12 from the AR space. For example, in the case in which the user chooses to exclude the real object R12 from the AR space, a virtual object corresponding to the real object R12 is not included in the AR space model. On the other hand, in the case in which the user chooses not to exclude the real object R12 from the AR space, a virtual object corresponding to the real object R12 is included in the AR space model. By providing such a user interface, it becomes possible to share only objects that a user allows to share with other users in an AR application.

(3) Voxel Granularity

The AR space setting unit 144 may also prompt a user to specify the granularity of voxels used in order to discretize real objects. If the voxel granularity is small, a virtual object corresponding to a real object may clearly reproduce the appearance of that real object. If the voxel granularity is large, a virtual object corresponding to a real object may only vaguely reproduce the appearance of that real object.

Figure 17:
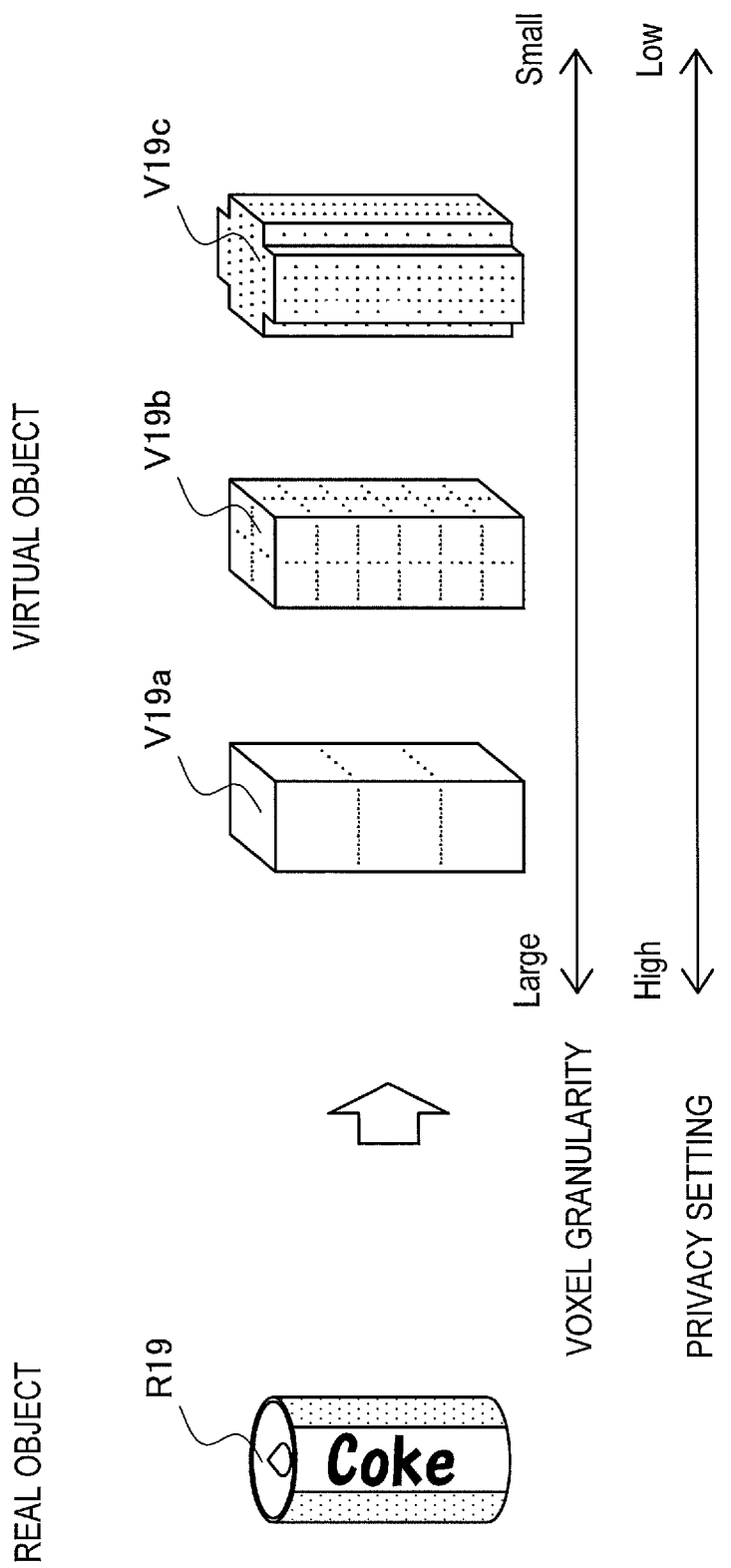
FIG. 17 is an explanatory diagram for describing the setting of voxel granularity.

FIG. 17 is an explanatory diagram for describing the setting of voxel granularity. On the left of FIG. 17, a real object R19 is illustrated as an example. On the right of FIG. 17, virtual objects V19*a*, V19*b*, and V19*c* corresponding to the real object R19 are illustrated. The voxel granularity of the virtual object V19*a* is relatively large, and the virtual object V19*a* is made up of three voxels. The voxel granularity of the virtual object V19*b* is smaller than the virtual object V19*a*, and the virtual object V19*b* is made up of 24 voxels. The voxel granularity of the virtual object V19*c* is even smaller than the virtual object V19*b*, and the virtual object V19*c* is made up of even more voxels. As FIG. 17 demonstrates, the virtual object V19*c* more clearly reproduces the appearance of the real object R19 compared to the virtual objects V19*a* and V19*b*.

For example, in the case in which a user places importance on the reproducibility of a real space, the user may specify a smaller voxel granularity. Conversely, in the case in which a user places more on importance on protecting privacy than the reproducibility of a real space, the user may specify a larger voxel granularity. If a user interface enabling such voxel granularity to be specified is provided, it becomes possible for a user to select a voxel granularity matching his or her own intentions at individual times.

Instead of being directly specified by a user, the voxel granularity may also be determined on the basis of a user's privacy settings. As illustrated in FIG. 17, in the case in which a user seeks a high level of privacy protection, the AR space setting unit 144 determines a larger voxel granularity. On the other hand, in the case in which a user allows a low level of privacy protection, the AR space setting unit 144 determines a smaller voxel granularity. If a user interface enabling such privacy levels to be specified is provided, it becomes possible for an AR application to adaptively adjust the voxel granularity to match the level of privacy protection sought by a user.

<4. Virtual Object Operations>

In this section, various working examples related to operations on avatars and other virtual objects placed within an AR space will be described.

[4-1. Operation Window Examples]

(1) Avatar Selection Window

Figure 18:
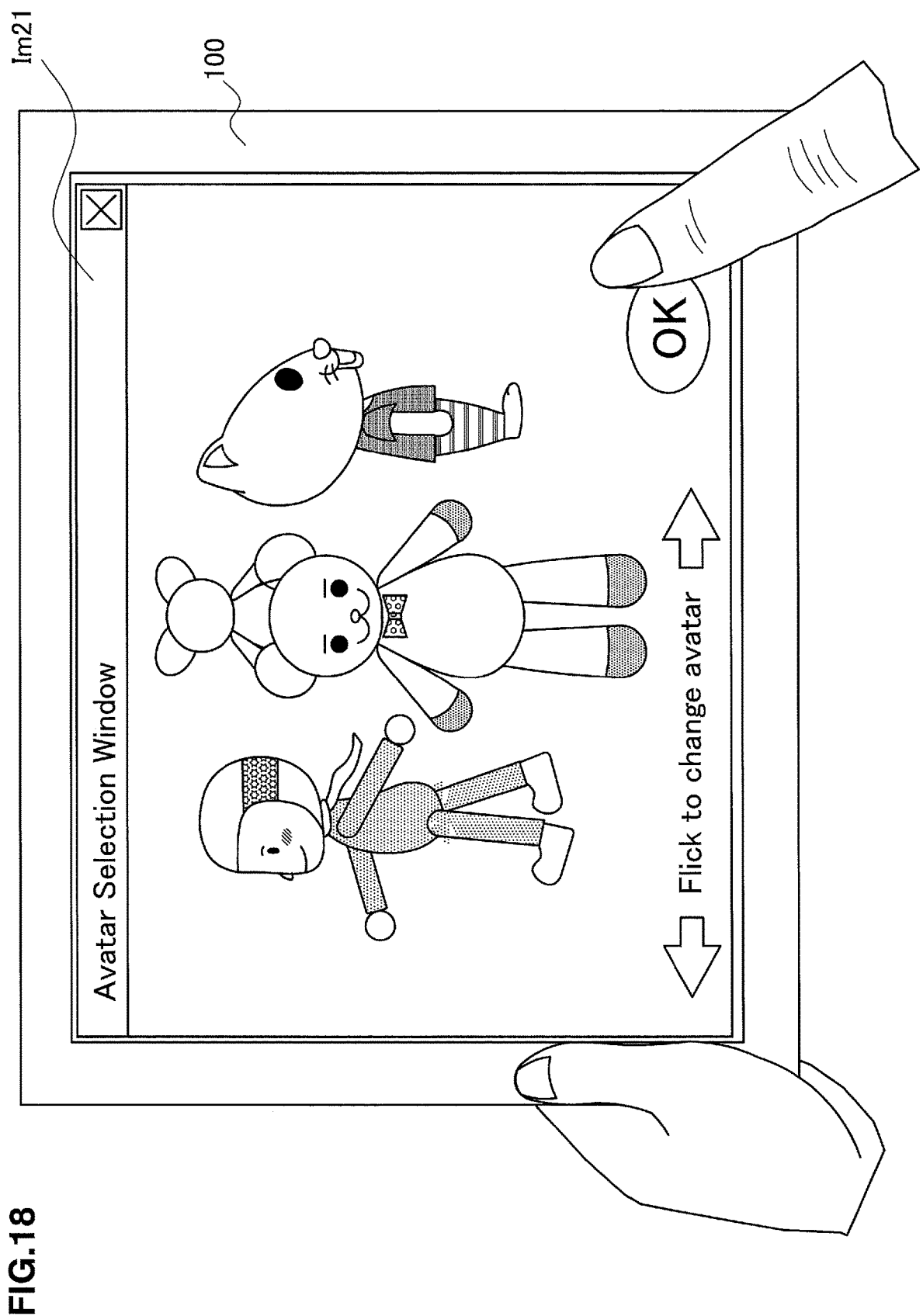
FIG. 18 is an explanatory diagram for describing an example of an avatar selection window.

FIG. 18 is an explanatory diagram for describing an example of an avatar selection window. The avatar selection window is a window that may be displayed when a user starts an avatar-based AR application, or when a user registers user data in an application. In the example in FIG. 18, four avatars are being displayed in an avatar selection window Im21 The user is able to change the currently selected candidate avatar by flicking in the left and right directions, for example. If the user taps an OK button, the candidate avatar selected at that time (typically, the avatar being displayed in front) is selected as the avatar for the user.

(2) Operation Window

Figure 19:
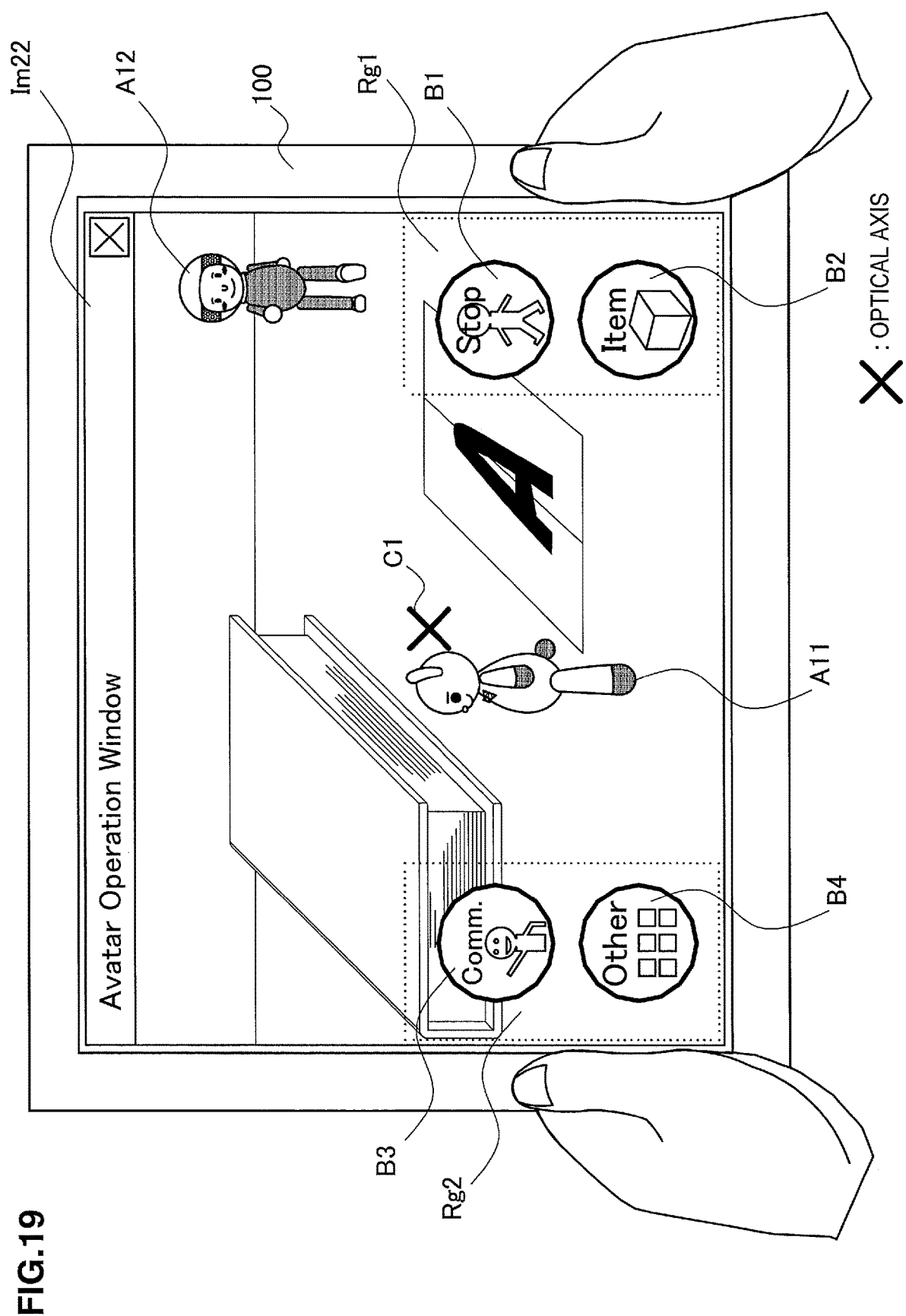
FIG. 19 is an explanatory diagram for describing an example of a basic operation window.

FIG. 19 is an explanatory diagram for describing an example of a basic operation window. The operation window is a window that may be displayed while an AR application is executed. In the example in FIG. 19, an output image generated by the object control unit 146 is displayed in an operation window Im22 This output image may be generated by superimposing virtual objects onto an input image depicting a real space, for example. In the example in FIG. 19, an avatar A11 and an avatar A12 are being displayed as virtual objects. Also, buttons B1, B2, B3, and B4 are superimposed onto the operation window Im22.

As described using FIGS. 1 and 2, while using the AR application, the user holds up a device (camera) pointed at the real space as a general rule. The question of in which direction the camera is pointed is important for the AR application. Unintentional shaking in the camera orientation may also adversely affect the accuracy of real space recognition. In addition, most mobile devices have a touch panel display and implement a user interface based on touch input, but touch input causes shaking in device orientation comparatively easily. In contrast, the user interface described in this section, by reducing shaking in device orientation as much as possible, realizes consistent operation of the AR application and improved operability.

For example, the object control unit 146 superimposes a user interface operated by the user onto at least one of a right-edge region and a left-edge region of an operation window that displays objects within an AR space. The right-edge region and the left-edge region are regions reached by the thumbs of a user gripping the display. In the example in FIG. 19, buttons B1 and B2 are superimposed onto a right-edge region Rg1 reached by the user's right-hand thumb, while buttons B3 and B4 are superimposed onto a left-edge region Rg2 reached by the user's left-hand thumb. With such a user interface placement, a user is capable of touching the button B1, B2, B3, or B4 while supporting the information processing device 100 with both hands. The object control unit 146 may also automatically distinguish the handedness of the user, and place more of the user interface in an edge region on the side of the user's dominant hand.

Also, the object control unit 146 determines a target position for an action executed within an AR space, on the basis of the positional relationship between an object within the AR space and the optical axis of the camera, for example. The optical axis of the camera is ordinarily a straight line extending in the depth direction from the center image capture plane, orthogonally to the image capture plane. In FIG. 19, the intersection C1 between the surface of a table within the AR space and the optical axis of the camera is indicated with an "X" symbol. Several examples of avatar actions based on such a positional relationship between an object in an AR space and the optical axis of the camera will be described in the next section.

[4-2. Avatar Actions]

As an example, the object control unit 146 determines a target position for an action executed by an avatar on the basis of the position of the intersection between an object within an AR space and the optical axis of the camera. For example, an avatar may move within an AR space. In this case, the destination of the avatar movement is the target position for the action. Also, an avatar may use an item within an AR space. In this case, the point of application of the item used by the avatar is the target position for the action.

(1) Moving/Stopping

FIG. 20 is an explanatory diagram for describing an example of an operation for moving an avatar. In the upper part of FIG. 20, an image Im23a is illustrated. In the image Im23a, an avatar A11 is being displayed. Herein, for the sake of simplicity, the voxels of virtual objects corresponding to real objects are rendered visible as a grid. However, the voxels may not actually be visible. The avatar A11 is placed on top of a virtual object V10. The position P11 is the position of the intersection between the virtual object V10 and the optical axis of the camera. To allow a user to perceive the position P11, a mark indicating the position P11 may also be displayed. The avatar A11 moves within the AR space with the position P11 as the destination. In the image Im23b illustrated in the lower part of FIG. 20, the avatar A11 is closer to the position P11. A user, by moving the information processing device 100 and changing the direction of the camera, is able to make an avatar move towards a desired destination. At this point, since the user does not need to touch the screen, the user is able to move the avatar while stably supporting the information processing device 100. Note that the destination of movement (the target position for the action) may also not match the position of the intersection between an object and the optical axis of the camera. For example, a position having a fixed offset from that intersection may also be determined as the target position for the action.

Note that even if the destination of movement changes according to a user operation, the object control unit 146 does not immediately move the avatar to that destination, but rather moves the avatar towards the destination at a slower speed than the destination changing speed. In addition, an AR space model may be generated by discretizing real objects in units of voxels, and the object control unit 146 may determine a target position for the action in units of voxels like in the example in FIG. 20. Consequently, even if the position of the intersection between an object and the optical axis of the camera fluctuates slightly due to minute shaking of the camera orientation, as long as that fluctuation remains within the range of one voxel, the target position for the action does not change. With these innovations, avatar motion is kept from becoming overly sensitive with respect to camera motion. As a result, natural avatar motion is realized in an AR application. The object control unit 146 may also determine a target position for an action in units of voxel sets that include multiple voxels, rather than in units of single voxels. By increasing the size of the voxel set as the distance from the camera to the object increases, it is also possible to stabilize the sensitivity of avatar motion without being affected by the distance.

In an application such as a competitive multiplayer game, for example, it is also valuable to additionally provide a means to rapidly move an avatar. Such rapid movement may be associated with user input via a rear input interface (such as a touch sensor provided on the case surface on the opposite side of the screen).

In the case in which there exists a virtual object that poses an obstacle on the linear route from an avatar's current position to a destination, the object control unit 146 may automatically set a nonlinear route so that the avatar automatically avoids the obstacle. In the case in which the AR space is expressed by an AR space model that is discretized in units of voxels, it is easy to determine whether or not a given coordinate point within the AR space is occupied by some kind of object. Consequently, the object control unit 146 is able to refer to such an AR space model and automatically set an avatar route at low computational cost.

The button B1 is a user interface for enabling the user to select an action type. Action types associated with the button B1 include moving and stopping an avatar. In the example in FIG. 20, moving an avatar has already been selected as an action.

Figure 21:
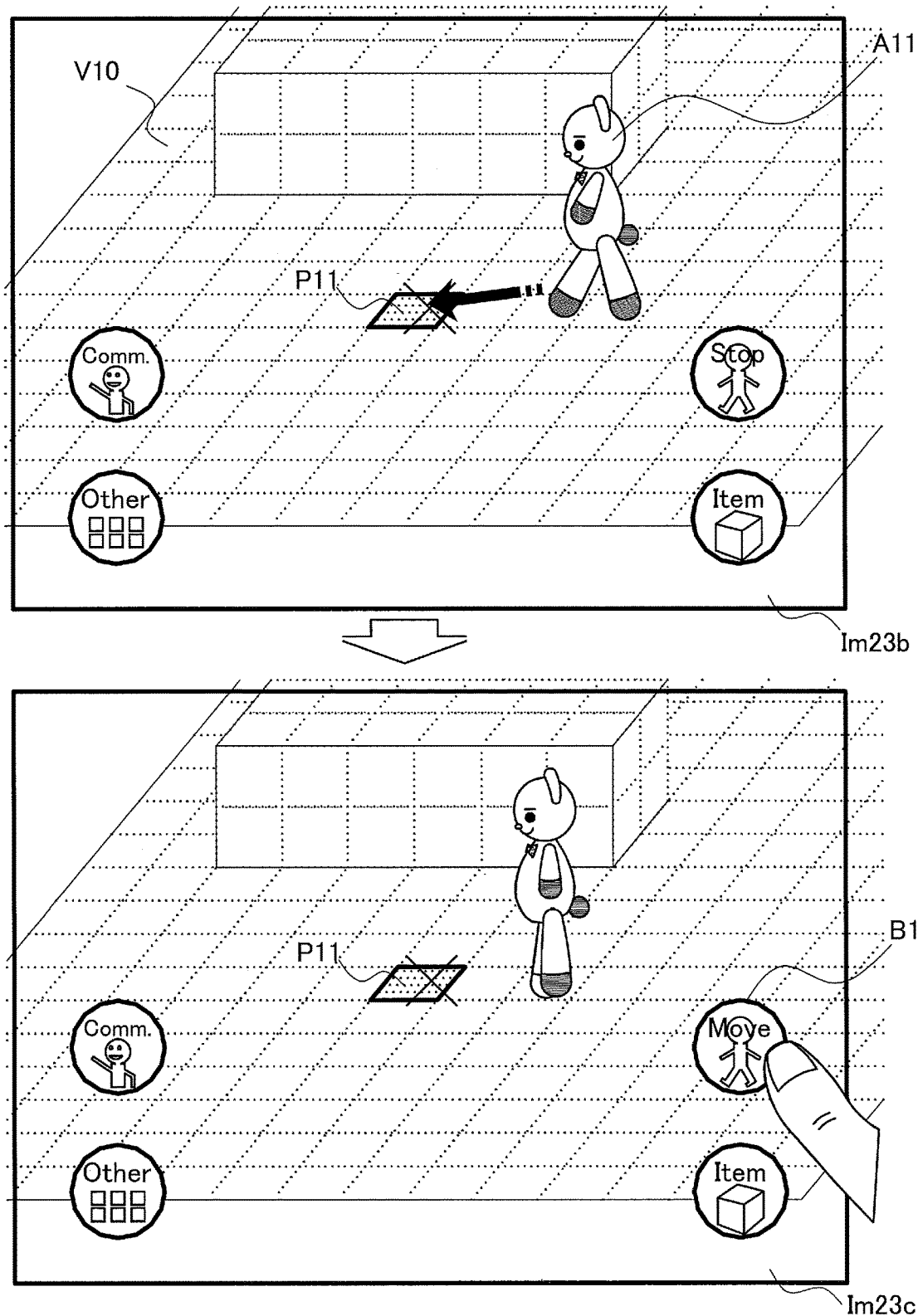
FIG. 21 is an explanatory diagram for describing an example of an operation for stopping avatar movement.

FIG. 21 is an explanatory diagram for describing an example of an operation for stopping avatar movement. In the upper part of FIG. 21, the image Im23b is again illustrated. In the image Im23b, an avatar A11 is being displayed. The position P11 is the position of the intersection between a virtual object V10 and the optical axis of the camera, and is the destination of the movement of the avatar A11. At this point, if the user taps the button B1 with his or her right-hand thumb, for example, the movement of the avatar A11 stops. In the image Im23c illustrated in the lower part of FIG. 21, the avatar A11 has stopped at the position at that time. Since the button B1 is placed in the right-edge region of the operation window, the user is able to stop the avatar without removing his or her right hand from the information processing device 100. If the user taps the button B1 again, the movement of the avatar A11 may be resumed.

(2) Changing Direction

Changing the direction of an avatar may be realized using several techniques. For example, an avatar may simply face in the direction of the movement destination. FIG. 22 is an explanatory diagram for describing an example of an operation for changing the direction of an avatar. In the upper part of FIG. 22, the image Im23b is again illustrated. In the image Im23b, an avatar A11 is being displayed. The position P11 is the position of the intersection between a virtual object V10 and the optical axis of the camera, and is the destination of the movement of the avatar A11. After that, assume that a position P12 becomes the new destination of movement as a result of the user moving the information processing device 100 and changing the direction of the camera. In the image Im23d illustrated in the lower part of FIG. 22, the avatar A11 is facing in the direction of the position P12. In this way, by moving the information processing device 100, a user is also able to change the direction of an avatar.

Figure 23:
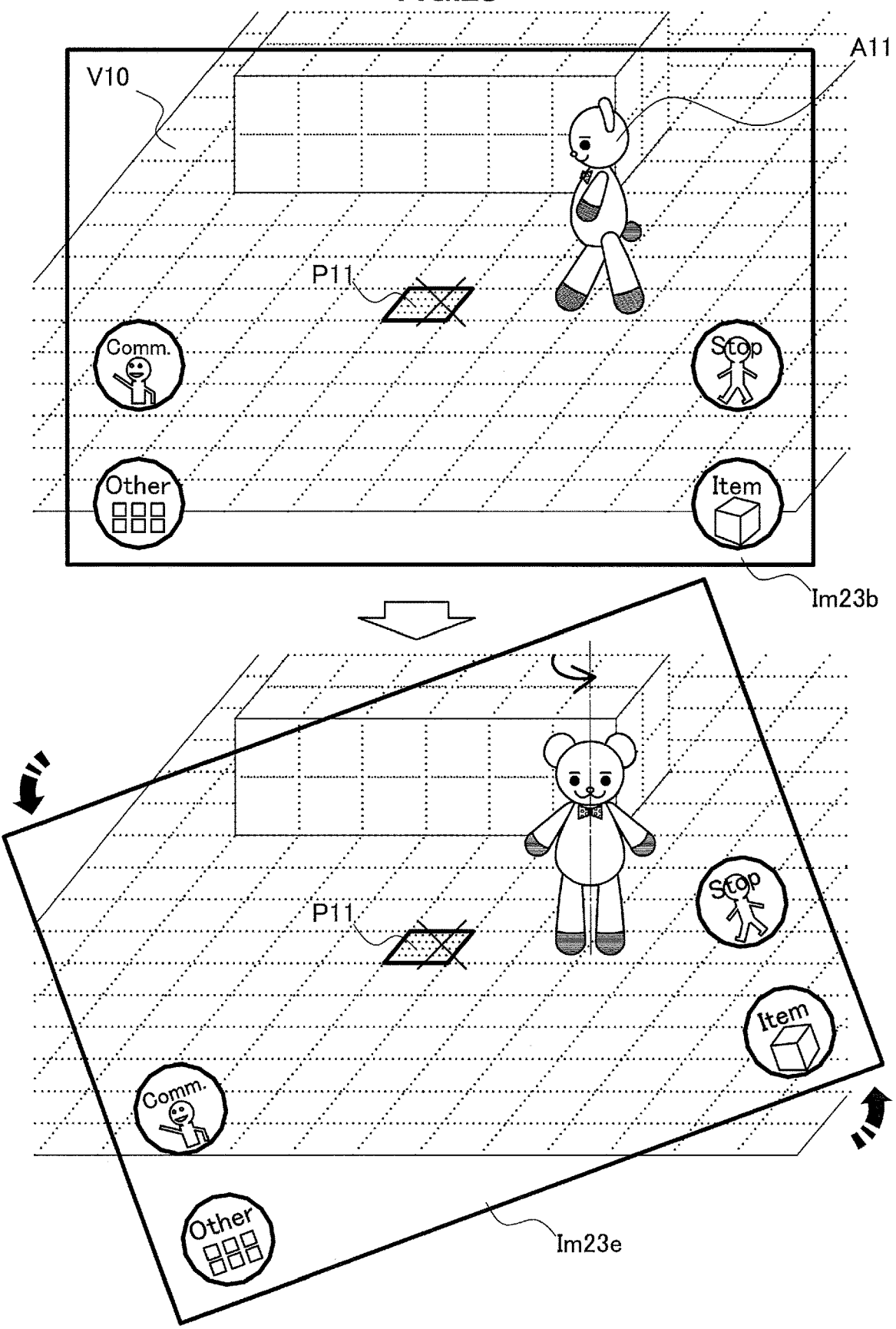
FIG. 23 is an explanatory diagram for describing another example of an operation for changing the direction of an avatar.

Furthermore, an additional user interface for changing the direction of an avatar may also be implemented. For example, the object control unit 146 may control the orientation of an avatar on the basis of rotation about the optical axis of the camera. FIG. 23 is an explanatory diagram for describing another example of an operation for changing the direction of an avatar. In the upper part of FIG. 23, the image Im23b is again illustrated. At this point, assume that the user rotates the information processing device 100 about the optical axis. The object control unit 146 detects this rotation from a recognition result for the camera orientation by the recognition unit 142, and changes the direction of the avatar A11. In the image Im23e illustrated in the lower part of FIG. 22, the avatar A11 has turned to its left.

Note that it may be uncomfortable for the user to continue avatar operations with the information processing device 100 tilted as in the lower part of FIG. 23. Consequently, the object control unit 146 may also change the orientation of the avatar on the basis of rotation about the optical axis of the camera only while in a state in which a designated button (not illustrated) is touched or depressed, for example. As a result, a user is able to return the information processing device 100 to the original orientation while keeping the avatar from reverting to its original orientation.

The technique for changing the direction of an avatar is not limited to the above examples. For example, in the case in which a designated object of focus exists near an avatar, the object control unit 146 may automatically change the direction of the avatar towards that object of focus. Objects of focus may include the avatar of another user, or some other predefined virtual object, for example.

(3) Using Items

FIGS. 24A and 24B are explanatory diagrams for describing a first example of an item-using action executed by an avatar. In the upper part of FIG. 24A, an image Im24a is illustrated. In the image Im24a, an avatar A11 is being displayed. The position P11 is the position of the intersection between a virtual object V10 and the optical axis of the camera. The button B2 is a user interface for enabling the user to select an action type. Action types associated with the button B2 include placing a block. In the example in FIG. 24A, the avatar A11 is carrying a block BL1 as a result of a user tapping the button B2. If the user additionally taps the screen, the avatar A11 places the block BL1 within the AR space, taking the position P11 as the item's point of application (in this case, the block's point of placement). In the image Im24b illustrated in the lower part of FIG. 24A, the avatar A11 is tossing the block BL1 towards the position P11. Furthermore, in the image Im24c illustrated in the upper part of FIG. 24B, the block BL1 has landed at the position P11. According to such a user interface, a user is able to cause an avatar to place a block at a desired location within an AR space by moving the information processing device 100 to change the direction of the camera. In this case, the user is able to specify a desired location without removing his or her hands from the information processing device 100. In the image Im24d illustrated in the lower part of FIG. 24B, more blocks have been placed within the AR space. Such a user interface may also be implemented in order to enable a user to customize an AR space as described using FIG. 8, for example. Otherwise, this user interface may be implemented in order to realize an AR application similar to building blocks or a 3D block-matching game, for example.

Figure 25:
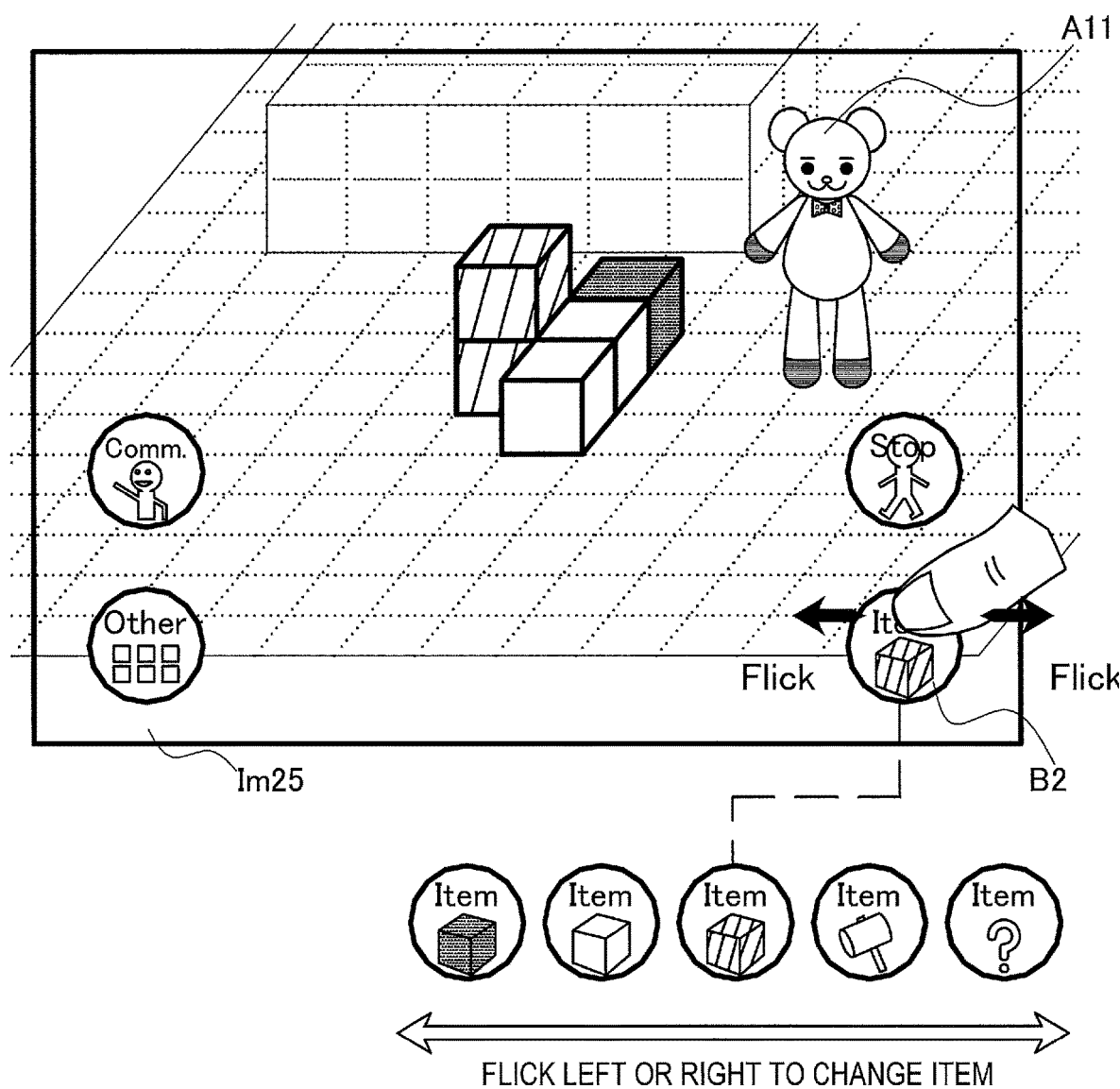
FIG. 25 is an explanatory diagram for describing an example of an operation for switching an item used by an avatar.

FIG. 25 is an explanatory diagram for describing an example of an operation for switching an item used by an avatar. In FIG. 25, an image Im25 is illustrated. In the image Im25, a button B2 is superimposed. If the user performs flick input on the button B2, the usable item switches among multiple item candidates (item candidates may be toggled). In FIG. 25, five types of item candidates are illustrated. These item candidates may include blocks with different textures or colors, or items other than blocks, for example. Note that the usable item candidates may also change according to costs borne by the user (such as monetary costs like an item purchase fee, or costs in terms of work, like activity achievements within the AR space). In the next example, a hammer for smashing a placed block is used by an avatar.

FIG. 26 is an explanatory diagram for describing a second example of an item-using action executed by an avatar. In the upper part of FIG. 26, an image Im26a is illustrated. In the image Im26a, an avatar A11 is being displayed. The position P13 is the position of the intersection between a virtual object V10 and the optical axis of the camera. In the example in FIG. 26, the avatar A11 is carrying a hammer HM1 as a result of a user tapping the button B2. If the user additionally taps the screen, the avatar A11 swings the hammer HM1, taking the position P13 as the item's point of application (in this case, the point where the hammer hits). In the image Im26b illustrated in the lower part of FIG. 26, the avatar A11 has swung the hammer HM1, and the block BL12 that existed at the position P13 has been smashed. According to such a user interface, a user is able to cause an avatar to smash a block placed at a desired location within an AR space by moving the information processing device 100 to change the direction of the camera. In this case, the user is able to specify a desired location without removing his or her hands from the information processing device 100.

Note that, in the case of executing an action like that illustrated by example in this section, when a real object within a real space corresponding to the target position is capable of performing a reaction, the object control unit 146 may instruct that real object to perform a reaction. For example, in the case in which the real space map 164 indicates that a client device (a real object) housing a vibrator exists at the target position onto which a hammer is swung, the object control unit 146 may transmit a wireless signal to that client device and cause the vibrator to vibrate. The reaction of a real object is not limited to such an example, and may also be light emission from a light-emitting diode (LED) or the output of a sound effect from a speaker, for example. As a result, it is possible to present a close connection between the real space and the AR space, and increase the reality of the AR application.

[4-3. Communication Using Avatars]

Avatar actions may also be executed for the purpose of communication between users via avatars. The object control unit 146 causes an avatar to execute an action for the purpose of communication via avatars, according to user input.

FIG. 27 is an explanatory diagram for describing a first example of communication via avatars. In the upper part of FIG. 27, an image Im31a is illustrated. In the image Im31a, an avatar A11 and an avatar A12 are being displayed. The avatar A11 is an avatar operated by a user. The avatar A12 is the avatar of another user. The button B3 is a user interface for switching between displaying and hiding an action menu for the purpose of communication via avatars. In the example in FIG. 27, as a result of the user tapping the button B3, an action menu containing seven command buttons is superimposed onto the image. Among these command buttons, the command button CO1 is a user interface for causing an avatar to execute a hand-waving action. In the image Im31b illustrated in the lower part of FIG. 27, the avatar A11 is waving its hand as a result of the user tapping the command button CO1. Such an action is also displayed on the screen of a device of the other user who operates the avatar A12. As a result, communication via avatars is established.

FIG. 28 is an explanatory diagram for describing a second example of communication via avatars. In the upper part of FIG. 28, an image Im31c is illustrated. In the image Im31c, an avatar A11 and an avatar A12 are being displayed. The button B5 is a user interface for the purpose of chat via avatars, and is displayed as part of the action menu, for example. In the case of tapping the button B5, a software keyboard enabling the user to input a chat message may also be displayed on-screen. Otherwise, a chat message may also be input via a speech input interface. In the image Im31d illustrated in the lower part of FIG. 28, a popup CB1 displaying a chat message input by the user is superimposed near the avatar A11. Such a chat action is also displayed on the screen of a device of the other user who operates the avatar A12. As a result, communication is established as though the avatars were having a conversation.

Figure 29:
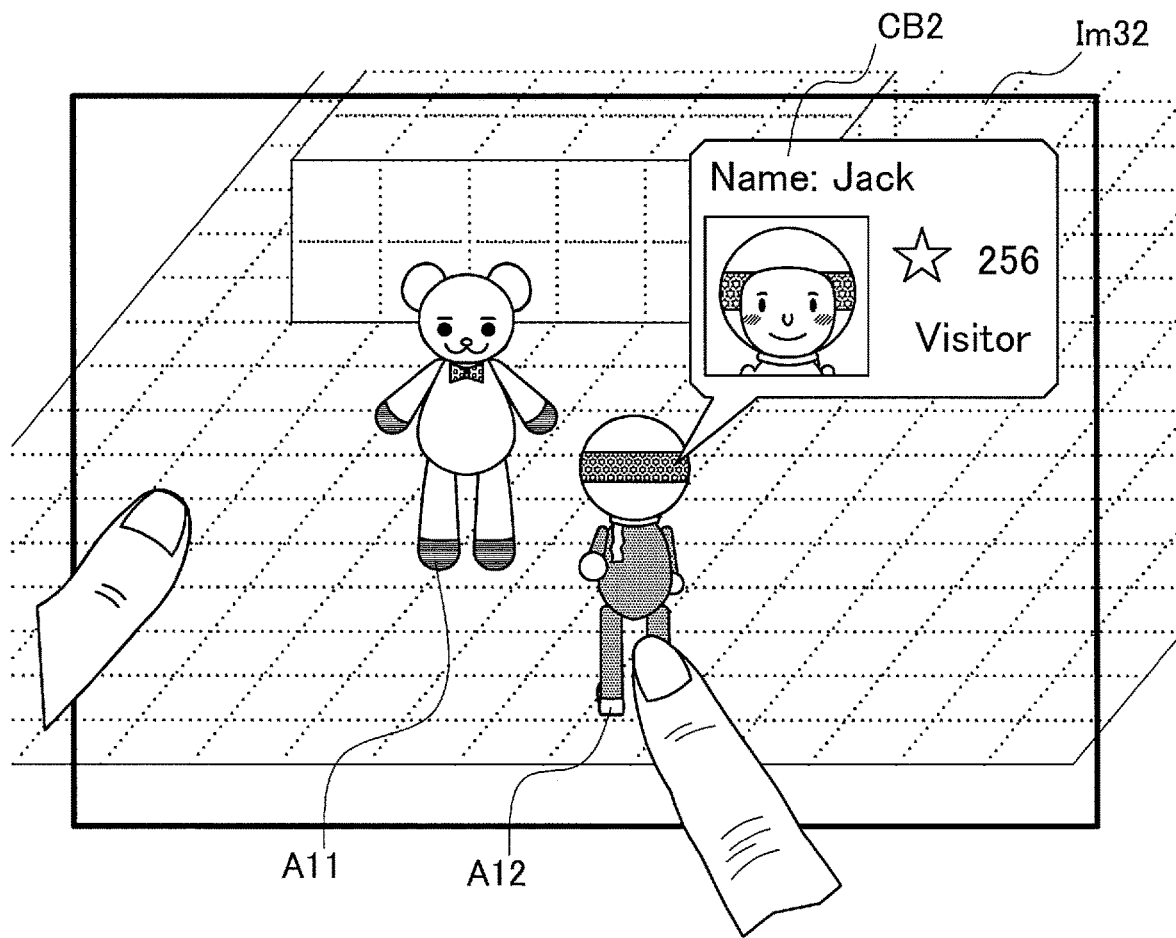
FIG. 29 is an explanatory diagram for describing an example of an operation for displaying avatar information.

In order to promote communication between users via avatars, it is also valuable for users to know information about the avatars of other users met within the AR space. FIG. 29 is an explanatory diagram for describing an example of an operation for displaying avatar information. In FIG. 29, an image Im32 is illustrated. In the image Im32, an avatar A11 and an avatar A12 are being displayed. For example, if a user taps the avatar A12 on the screen, a popup CB2 displaying avatar information for the avatar A12 is superimposed near the avatar A12. The popup CB2 displays the nickname and other attribute information of the avatar A12 (or the user of the avatar A12), for example.

[4-4. Operations on AR Space]

As described up to this point, in principle, an AR space is set in association with a real space depicted in an input image. Additionally, if the angle of view of the camera changes, the view of the AR space on-screen changes to track the change in the angle of view. However, it may be inconvenient if the user is required to continually move the camera or move the user himself or herself in order to see a location in the AR space that the user wants to see. Accordingly, as described hereinafter, it is valuable to provide a user interface that enables a user to control the position and orientation of the AR space itself.

FIG. 30 is an explanatory diagram for describing an example of an operation for changing the position of an AR space. In the upper part of FIG. 30, an image Im33a is illustrated. In the image Im33a, an avatar A12 is being displayed. However, the avatar A12 is positioned near the window boundary. Accordingly, the user drags both thumbs to the right (the D1 direction in the drawing) in a multi-touch gesture with the thumbs of both hands touching the screen, for example. The object control unit 146, in the case of detecting such user input, moves the relative position of the AR space with respect to the camera parallel to the drag direction. In the image Im33b illustrated in the lower part of FIG. 30, as a result of the AR space moving in parallel to the right (the D2 direction in the drawing), the display position of the avatar A12 is closer to the window center. By providing such a user interface, it becomes possible to more easily perceive on-screen a virtual object positioned at a location distance from the user, without the user himself or herself moving.

FIG. 31 is an explanatory diagram for describing an example of an operation for changing the orientation of an AR space. In the upper part of FIG. 31, an image Im34a is illustrated. In the image Im34a, avatars A11 and A12 are being displayed. However, the avatar A11 is hidden in the shadow of the avatar A12. Accordingly, the user respectively drags his or her left-hand thumb downwards (the D3 direction in the drawing) and drags his or her right-hand thumb upwards (the D4 direction in the drawing) in a multi-touch gesture with the thumbs of both hands touching the screen, for example. The object control unit 146, in the case of detecting such user input, rotates the relative orientation of the AR space with respect to the camera. In the image Im34b illustrated in the lower part of FIG. 31, as a result of the AR space rotating in the D5 direction of the drawing about the Z axis, the avatar A11 is no longer hidden by the avatar A12. By providing such a user interface, it becomes possible to more easily perceive on-screen a virtual object hidden in the shadow of another object, without the user himself or herself moving.

Note that the object control unit 146 may also modify the scale of the AR space, rather than the relative position or orientation of the AR space with respect to the camera, on the basis of designated user input (such as a pinch-in or pinch-out, for example).

[4-5. Other Operations]

Figure 32:
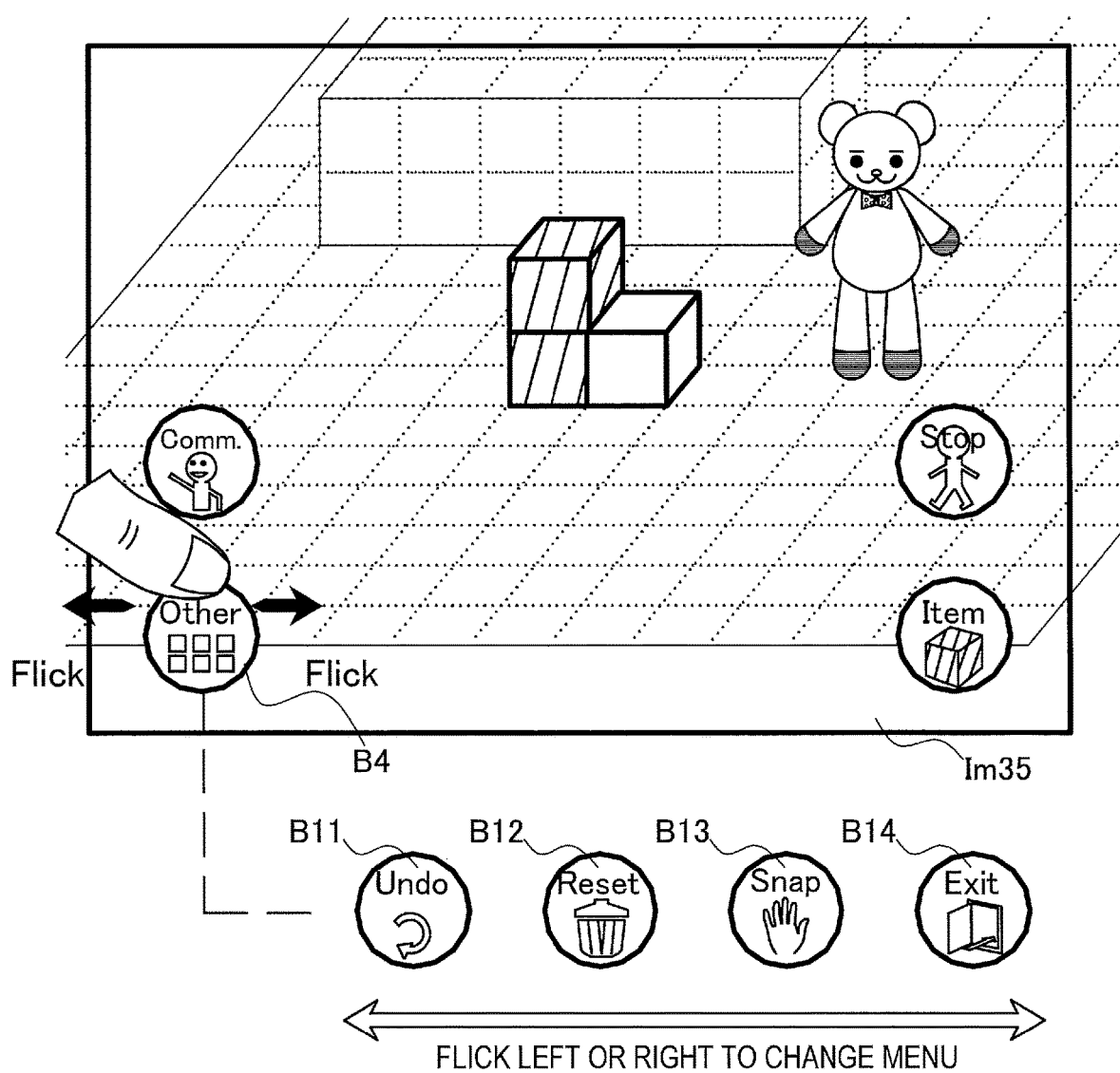
FIG. 32 is an explanatory diagram for describing an example of several menus that may be implemented in an AR application.

The configuration is not limited to the foregoing examples, and various operations may also be implemented in an AR application. For example, the button B4 of the operation window Im22 illustrated in FIG. 29 is a user interface for switching between displaying and hiding several additional menus which may be implemented in an AR application. FIG. 32 illustrates an example of an operation menu that may be displayed as a result of tapping the button B4. In the image Im35 illustrated in FIG. 32, if the user performs flick input on the button B4, the selectable operation menu switches among multiple menu candidates (menu candidates may be toggled). In FIG. 32, four types of menu candidates B11, B12, B13, and B14 are illustrated. For example, the menu candidate B11 is an operation menu for undoing an action executed by an avatar (reverting the AR space to a state before an action). The menu candidate B12 is an operation menu for resetting the state of the AR space (for example, removing all placed blocks). The menu candidate B13 is an operation menu for switching the operating mode of the AR application, which will be described later. The menu candidate B14 is an operation menu for the user to exit the AR space (check-out).

[4-6. Various Operating Modes]

In this section, several operating modes that may be supported by the information processing device 100 will be described.

(1) Real-time Mode/Snapshot Mode

The AR application described up to this point ordinarily displays on-screen virtual objects within an AR space that are superimposed onto an input image that is updated every frame (successively acquired by the image acquisition unit 120). Such an operating mode is designated real-time mode in this specification. However, when imagining several situations, operating in real-time mode may be undesirable sometimes.

For example, a user may become tired while holding up the information processing device 100 towards a real space. However, in the case in which the AR application is operating in real-time mode, if the user places the information processing device 100 on top of a table, for example, the most recent input image will depict only the surface of the table, and a suitable image of the AR space will not be displayed. Accordingly, as an example, the information processing device 100 also supports the snapshot mode described below.

In snapshot mode, the object control unit 146 causes virtual objects within the AR space to be superimposed onto an input image which is a single still image (snapshot image), rather than updating the input image. The snapshot image may be acquired by the image acquisition unit 120 when transitioning from real-time mode to snapshot mode, or may be acquired by the image acquisition unit 120 at some other timing. Note that instead of an input image at a specific time, another image (for example, an image specific to snapshot mode that is prepared in advance) may also be used as a background image in snapshot mode.

FIG. 33 is an explanatory diagram for describing real-time mode and snapshot mode. On the left side of FIG. 33, a user Ua is holding up an information processing device 100 towards a real space 11a. The image Im41 is an image that may be displayed in real-time mode. In the image Im41, a real object R11a and an avatar A11 are being displayed. Meanwhile, on the right side of FIG. 33, the information processing device 100 is placed on top of a table R10a, away from the hands of the user Ua. If the information processing device 100 were hypothetically operating in real-time mode, an input image would depict only the surface of the table (or the input image would be blacked out due to insufficient lighting). However, in the case in which the information processing device 100 operates in snapshot mode, a snapshot acquired before the information processing device 100 is placed on top of the table R10a is continuously used as the input image. The image Im42 is an image that may be displayed in snapshot mode. The image Im42 is displaying the real object R11a and the avatar A11, similarly to the image Im41.

By supporting such a snapshot mode, it becomes possible to continue presenting a suitable display of an AR application, even if a user temporarily stops holding up the information processing device 100. As a result, the physical stress on the user may be reduced. Note that in snapshot mode, a user interface based on the positional relationship between an object within the AR space and the optical axis of the camera as discussed earlier is disabled. As a substitute user interface, a user interface based on an on-screen touch position (for example, a touch position may be used as the target position for an action) may be provided in snapshot mode, for example. As a result, the user is still able to operate an avatar while in snapshot mode. An indicator for notifying the user whether the current operating mode is real-time mode or snapshot mode may also be displayed on-screen.

Figure 34:
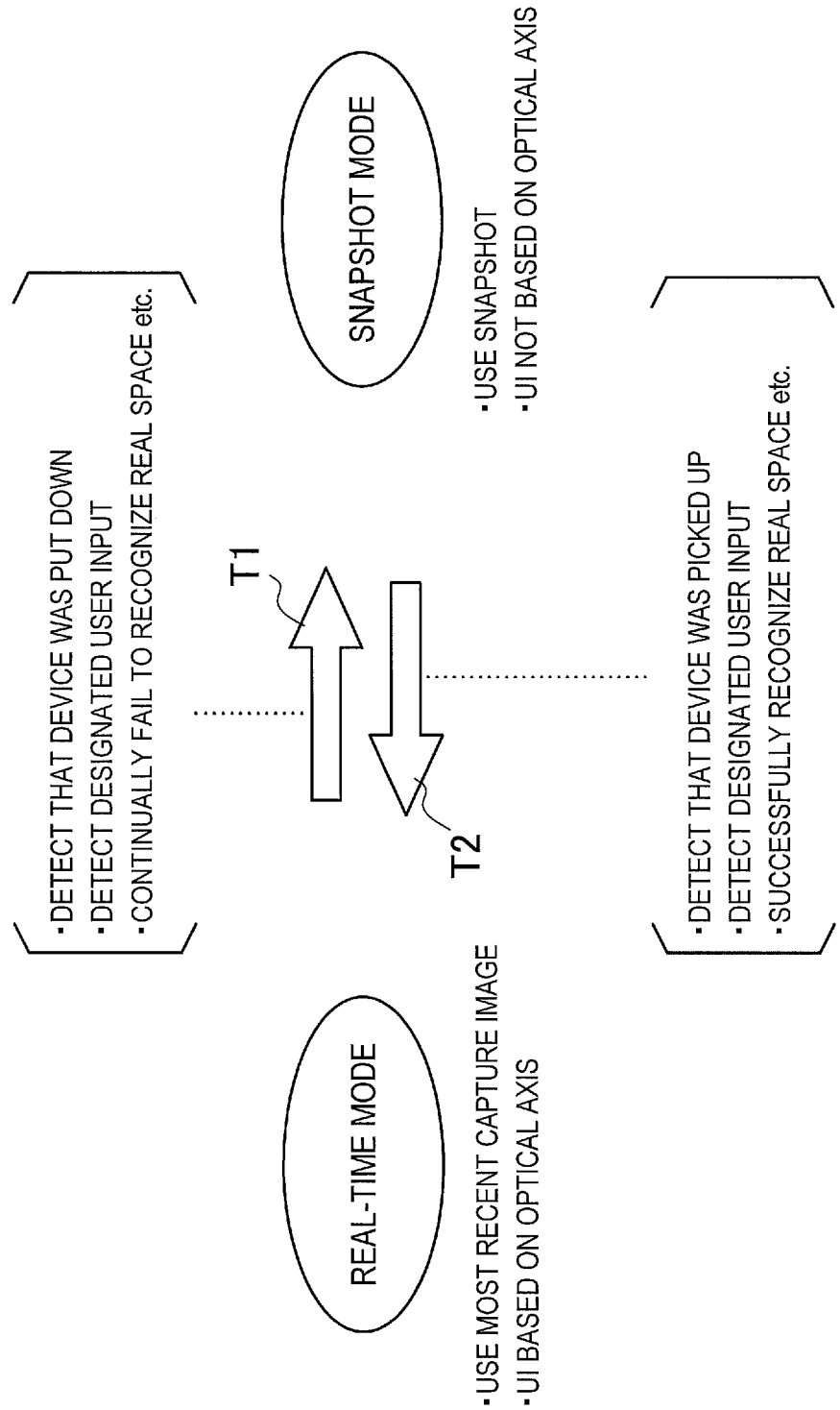
FIG. 34 is an explanatory diagram for describing the transition between the two types of operating modes illustrated in FIG. 33.

FIG. 34 is an explanatory diagram for describing the transition between the two types of operating modes illustrated in FIG. 33. In FIG. 34, the trigger T1 is a trigger for transitioning from real-time mode to snapshot mode. The trigger T1 may include detecting that the device has been put down, detecting designated user input, and failing to continuously recognize the real space. The trigger T2 is a trigger for transitioning from snapshot mode to real-time mode. The trigger T2 may include detecting that the device has been picked up, detecting designated user input, and successfully recognizing the real space.

For example, the object control unit 146 may automatically detect that a device has been put down (or picked up) on the basis of sensor data acquired by the data acquisition unit 130. In addition, the object control unit 146 may also detect user input for switching the operating mode via a user interface like the menu candidate B13 illustrated by example in FIG. 32.

In addition, the object control unit 146 may switch the operating mode to snapshot mode in the case in which a real object depicted in an input image in real-time mode continually fails to be recognized over a designated number of frames. For example, in the case of generating a real space map on the basis of the recognition unit 142 recognizing features within an input image, if the number of features depicted in the input image decreases extremely, a real object (as well as the position and orientation of the camera) may fail to be recognized. If such a recognition failure continues, it becomes difficult for the object control unit 146 to place a virtual object such as an avatar at a suitable position, and the display of the AR application becomes inconsistent. Accordingly, the object control unit 146, by automatically switching the operating mode to snapshot mode before the display becomes inconsistent, is able to prevent an inconsistent, unnatural image from being presented to the user. Note that the object control unit 146 may also display a warning message on-screen before switching the operating mode to snapshot mode. In addition, the object control unit 146 may change the display attributes of the user's avatar (such as blinking or semi-transparency, for example) in response to a failure to recognize a real object. As a result, the user may be informed of the cause of an avatar exhibiting inconsistent behavior.

(2) Blueprint Mode

Blueprint mode is one type of application mode. Blueprint mode may be utilized when a user customizes an AR space, or utilized in application usage similar to building blocks.

Figure 35:
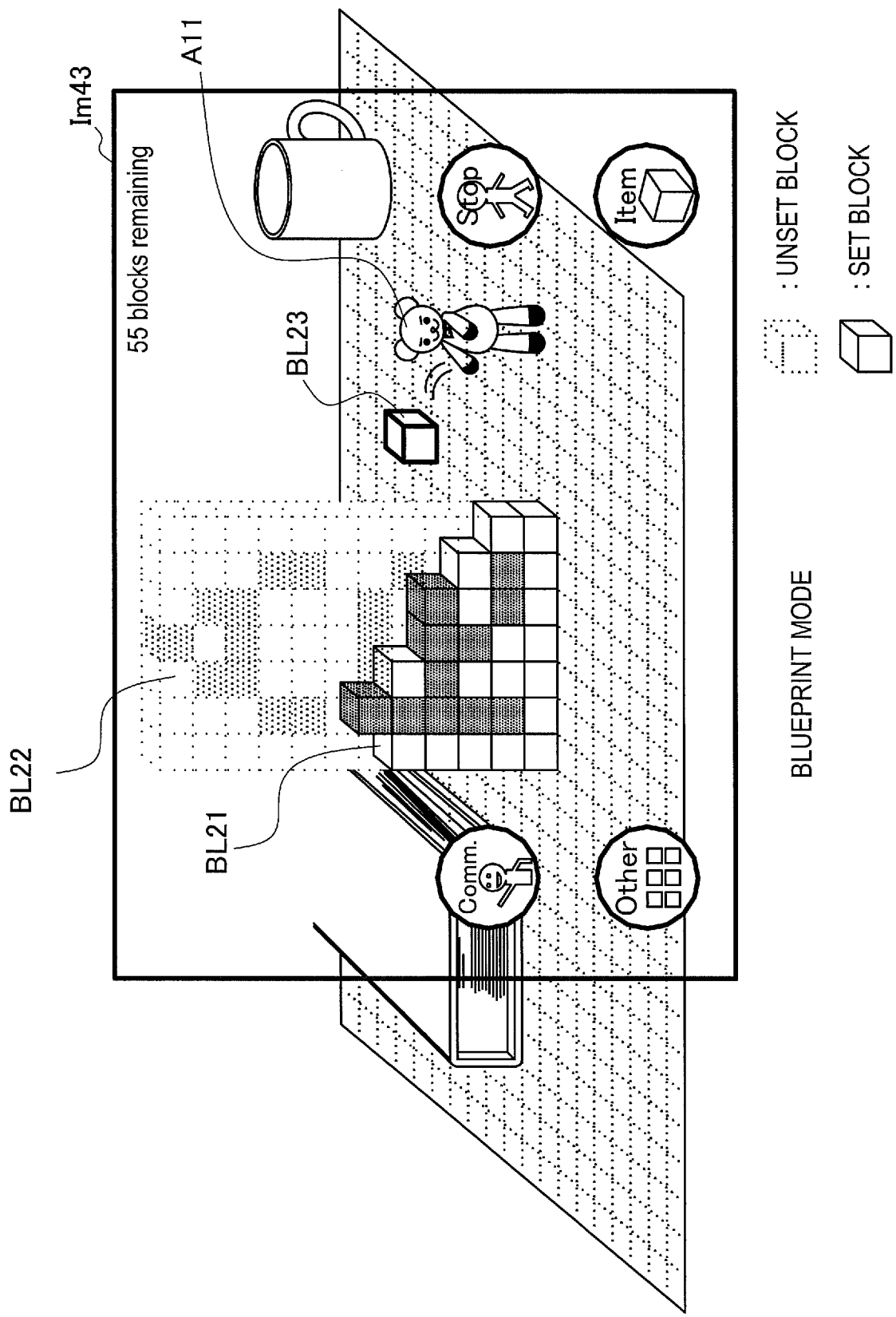
FIG. 35 is an explanatory diagram for describing a blueprint mode.

FIG. 35 is an explanatory diagram for describing blueprint mode. Referring to FIG. 35, there is illustrated an image Im43 of an AR space in which an avatar A11 is placed. In this AR space, there exists a block group including a block BL21 already set by the avatar A11. The image Im43 displays not only this group of already-set blocks, but also a semi-transparent group of unset blocks including a block BL22. The display of this group of unset blocks is referenced as a blueprint when a user forms some kind of virtual object by stacking up multiple blocks, for example. The block BL23 is a block that the avatar A11 is attempting to newly set. In the upper part of the image Im43, there is also displayed the number of remaining blocks until the virtual object is completed. Blueprint data may be stored by the data storage unit 160 in advance, or acquired from an external device such as an application server by the data acquisition unit 130.

(3) Avatar Perspective Mode

The object control unit 146 ordinarily generates an image of an AR space by taking the position and orientation of the camera 102 as a reference. Such a display mode is designated camera perspective mode in this specification. In contrast, in avatar perspective mode, the object control unit 146 generates an image of an AR space by taking the position and orientation of an avatar placed within the AR space as a reference.

FIG. 36 is an explanatory diagram for describing a camera perspective mode and an avatar perspective mode. In the upper part of FIG. 36, an image Im44a generated in camera perspective mode is illustrated. In the image Im44a, avatars A11 and A12 are being displayed. A popup CB3 is superimposed near the avatar A12. The popup CB3 is a virtual object that displays a chat message input by the user of the avatar A12. In the lower part of FIG. 36, an image Im44b generated in avatar perspective mode is illustrated. The image Im44b is an image generated on the basis of the position and orientation of the avatar A11. In the image Im44b, the avatar A12 is displayed larger as though in front of the user's eyes. Furthermore, the popup CB3 likewise may be superimposed at a large size onto the image Im44b. By introducing such an avatar perspective mode, the user's sense of immersion into the AR space is heightened.

Figure 37:
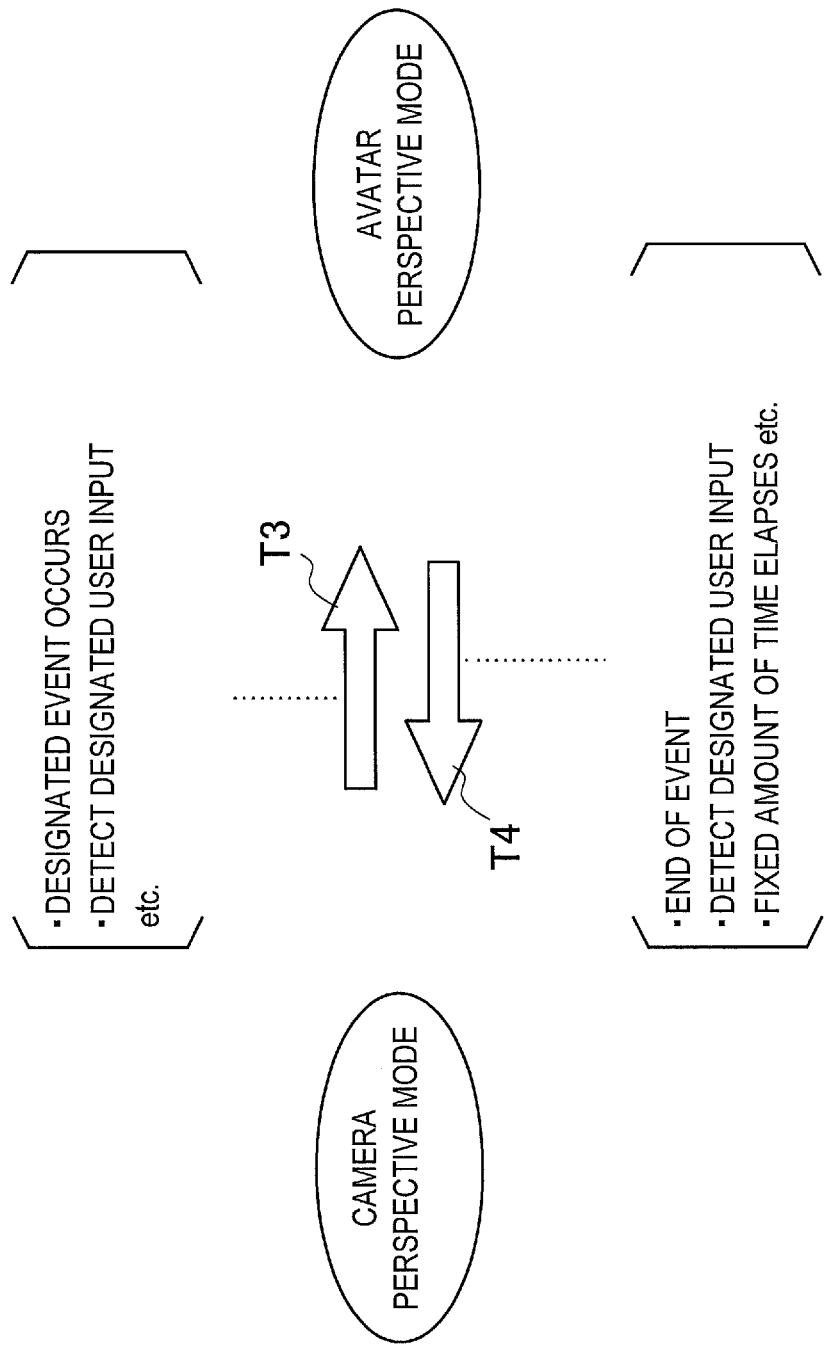
FIG. 37 is an explanatory diagram for describing the transition between the two types of display modes illustrated in FIG. 36.

FIG. 37 is an explanatory diagram for describing the transition between the two types of display modes illustrated in FIG. 36. In FIG. 37, the trigger T3 is a trigger for transitioning from camera perspective mode to avatar perspective mode. The trigger T3 may include the occurrence of a designated event and detecting designated user input. The trigger T4 is a trigger for transitioning from avatar perspective mode to camera perspective mode. The trigger T4 may include the end of an occurring event, detecting designated user input, and the elapse of a fixed amount of time. A designated event may include, for example, communication between avatars as described using FIGS. 27 and 28, collision between an avatar and another virtual object (for example, a block tossed by another avatar), as well as attacking and defending in a competitive multiplayer game. By transitioning between two types of display modes in this way, it becomes possible to provide a user with a greater variety of AR application images, rather than monotonous images from a perspective with little change.

<5. AR Community>

In this section, various working examples will be described under the presumption that multiple users utilize an AR community that uses the mechanism described up to this point as a platform.

Note that in the following description, a user participating in a specific AR space is designated "checking in" to the AR space. A user leaving an AR space is designated "checking out" of the AR space. If a user checks in to an AR space, the object control unit 146 places the user's avatar within that AR space, for example. Subsequently, in the case in which a placed avatar enters the angle of view of the camera 102, an image of that avatar is displayed on-screen.

[5-1. Forming an AR Community]

One important question related to multiple users participating in an AR community is which users are to coexist with which other users in a shared AR space set for those users. If an AR space shared by all users is set without any basis, a large number of avatars behave in a disorderly manner within the AR space, and a good user experience is not expected. Accordingly, as an example, the AR space setting unit 144 sets a different AR space in association with a real space depicted in an input image, according to related information that relates to the input image (hereinafter called image-related information). For example, the AR space setting unit 144 may set, for a user who captured an input image, an AR space selected according to image-related information from among multiple AR space candidates prepared in advance. Besides (or in addition to) the above, the AR space setting unit 144 may also set, for a user who captured an input image, an AR space formed by adjusting variable parameters of an AR space candidate according to image-related information.

(1) First Example of AR Space Selection

Figure 38:
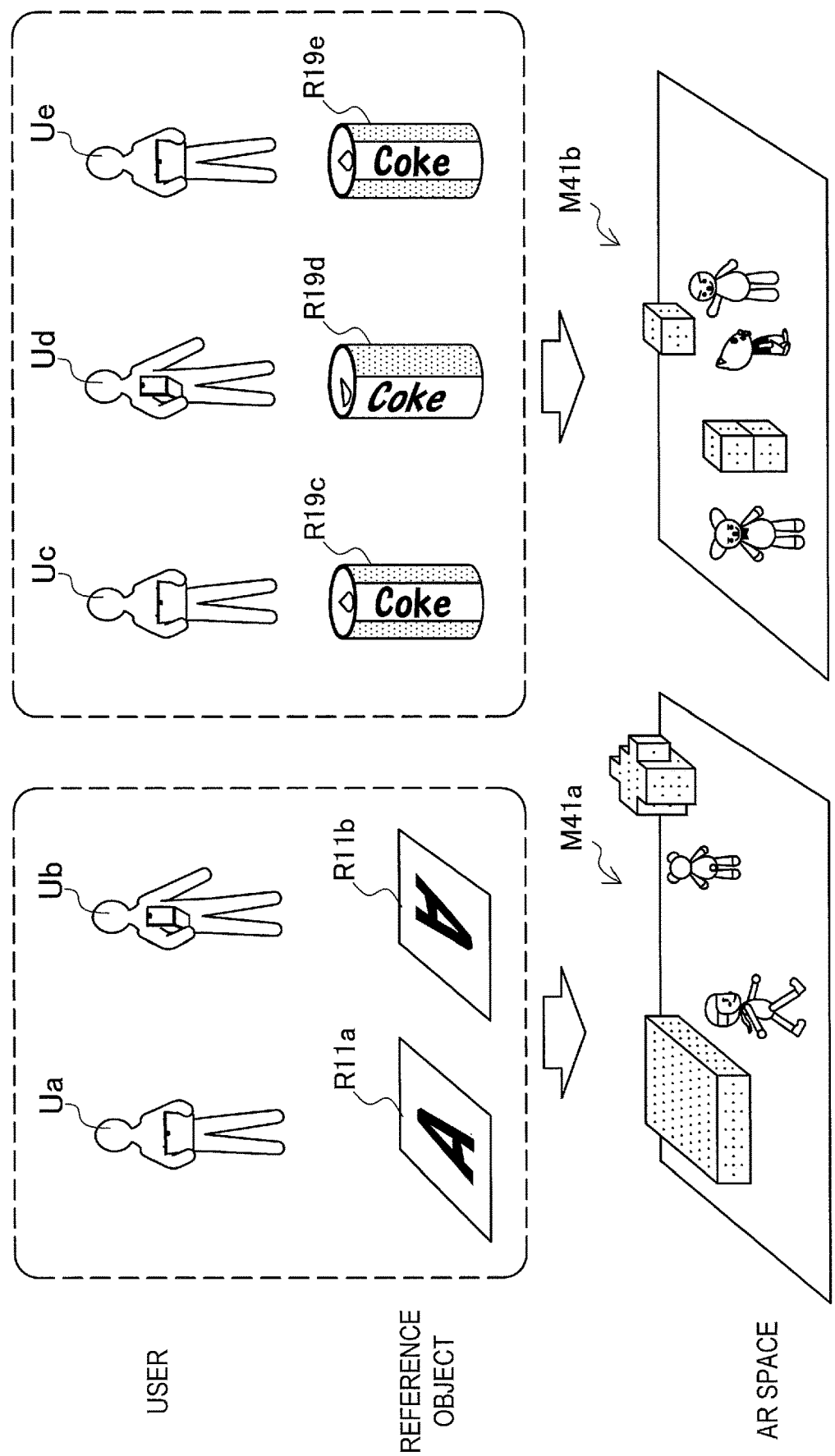
FIG. 38 is an explanatory diagram for describing for a first example of a technique for selecting an AR space.

FIG. 38 is an explanatory diagram for describing for a first example of a technique for selecting an AR space. In the first example, the image-related information includes the attributes of a reference object depicted in an input image. As an example, the attributes of a reference object include the type of the reference object. The AR space setting unit 144 sets a shared AR space for users capturing the same type of reference object. In the upper part of FIG. 38, five users Ua, Ub, Uc, Ud, and Ue are illustrated.

For example, the user Ua captures a real object R11a as a reference object. As a result, the AR space setting unit 144 of the device of the user Ua sets an AR space M41a for the user Ua. Also, the user Ub captures a real object R11b as a reference object. The real object R11b is the same type of object as the real object R11a (for example, a poster having the same texture). Accordingly, the AR space setting unit 144 of the device of the user Ub sets the AR space M41a shared with the user Ua for the user Ub.

Meanwhile, the user Uc captures a real object R19c as a reference object. The real object R19c is a different type of object from the real objects R11a and R11b. As a result, the AR space setting unit 144 of the device of the user Uc sets an AR space M41b, different from the AR space M41a, for the user Uc. Also, the user Ud captures a real object R19d as a reference object. The real object R19d is the same type of object as the real object R19c (for example, a beverage can for the same drink). Accordingly, the AR space setting unit 144 of the device of the user Ud sets the AR space M41b shared with the user Uc for the user Ud. Also, the user Ue captures a real object R19e as a reference object. The real object R19e is the same type of object as the real objects R19c and R11d. Accordingly, the AR space setting unit 144 of the device of the user Ue sets the AR space M41b shared with the users Uc and Ud for the user Ue.

In this way, by distributing users among different AR spaces according to the attributes of a reference object depicted in an input image, it becomes possible to form an AR community in which the avatars of users who have something in common with respect to a possessed object are gathered in a single AR space. For example, in product marketing applications, as a result of users who have acquired a specific product forming an AR community and communicating with each other, it is expected that the product will become a topic of conversation, creating an effect of increasing product awareness at an accelerated rate.

Note that the AR spaces M41a and M41b may be respectively constructed by the AR application provider in advance, or dynamically constructed at the time of user check-in according to any of the methods described using FIGS. 12 to 14.

(2) Second Example of AR Space Selection

Figure 39:
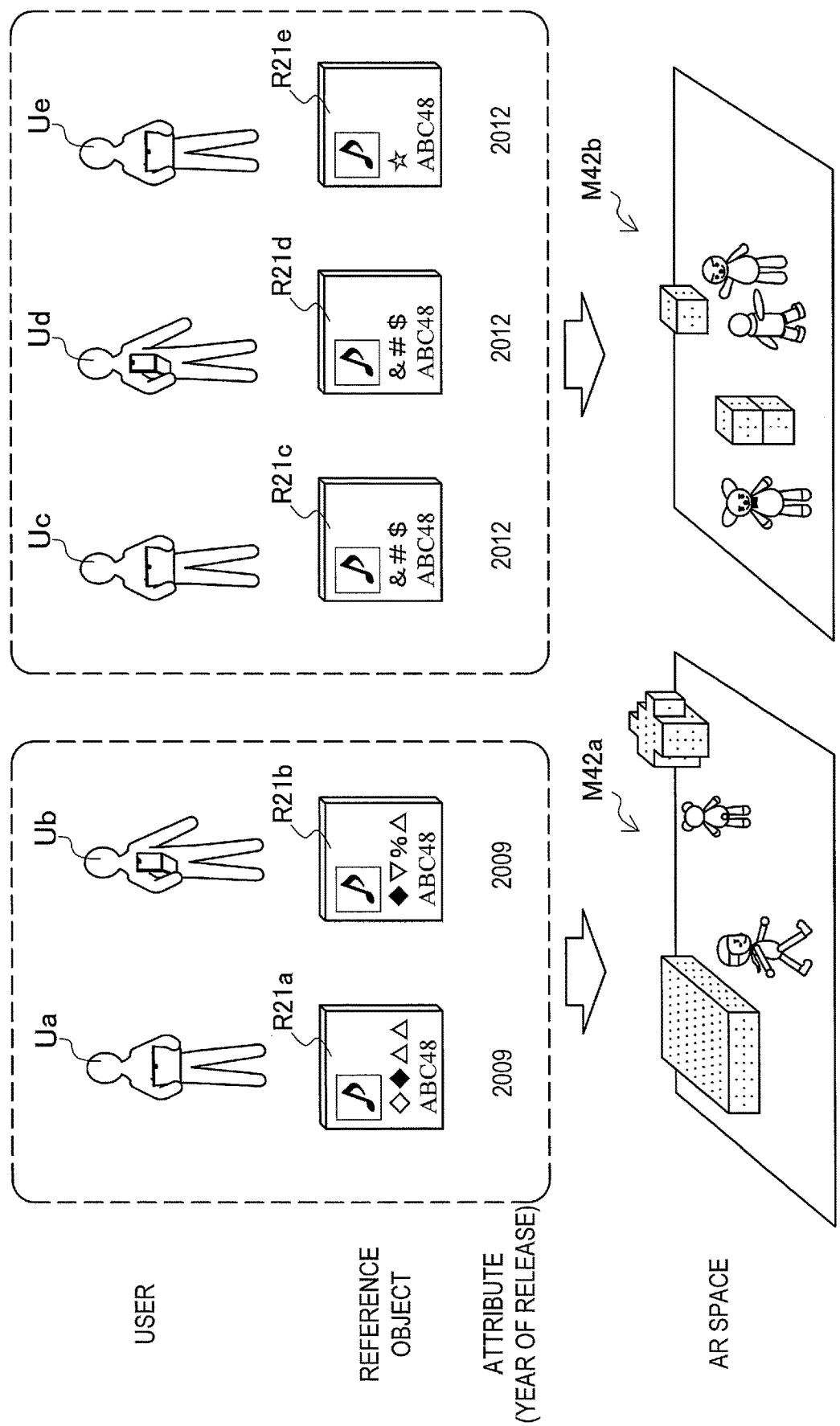
FIG. 39 is an explanatory diagram for describing for a second example of a technique for selecting an AR space.

FIG. 39 is an explanatory diagram for describing for a second example of a technique for selecting an AR space. In the second example, the image-related information includes the attributes of a reference object depicted in an input image, and the reference object is a music Compact Disc (CD) from a given artist. Herein, the year of release of the reference object, rather than the type of the reference object, is used as the reference object attribute for distributing users. The AR space setting unit 144 sets a shared AR space for users capturing a music CD released in the same year. In the upper part of FIG. 39, five users Ua, Ub, Uc, Ud, and Ue are illustrated.

For example, the user Ua captures a real object R21a as a reference object. The year of release of the real object R21a is 2009. As a result, the AR space setting unit 144 of the device of the user Ua sets an AR space M42a for the user Ua. Also, the user Ub captures a real object R21b as a reference object. The real object R21b is a music CD released in 2009, the same year as the real object R21a. Accordingly, the AR space setting unit 144 of the device of the user Ub sets the AR space M42a shared with the user Ua for the user Ub.

Meanwhile, the user Uc captures a real object R21c as a reference object. The real object R21c is a music CD released in 2012, unlike the real objects R21a and R21b. As a result, the AR space setting unit 144 of the device of the user Uc sets an AR space M42b, different from the AR space M42a, for the user Uc. Also, the user Ud captures a real object R21d as a reference object. The real object R21d is a music CD released in 2012, the same year as the real object R21c. Accordingly, the AR space setting unit 144 of the device of the user Ud sets the AR space M42b shared with the user Uc for the user Ud. Also, the user Ue captures a real object R21e as a reference object. The real object R21e is a music CD released in 2012, the same year as the real objects R21c and R21d. Accordingly, the AR space setting unit 144 of the device of the user Ue sets the AR space M42b shared with the users Uc and Ud for the user Ue.

Likewise in the second example, by distributing users among different AR spaces according to the attributes of a reference object depicted in an input image, it becomes possible to form an AR community in which the avatars of users who have something in common with respect to a possessed object are gathered in a single AR space.

Note that the reference object attribute used to distribute users is not limited to the above examples. For example, various attributes such as the reference object name, the selling company, the place of production, the number of sales, or degree of attention (for example, the number of related votes on an SNS) may also be used to distribute users among AR spaces.

In the first example and the second example, reference object attributes may be recognized by the recognition unit 142. Additionally, reference object data indicating recognized attributes may be transmitted to a device having a function for distributing users (such as an application server or the device of a parent user, for example), and an AR space model for a selected AR space may be acquired from that device by the data acquisition unit 130. Otherwise, reference object attributes may be recognized from an input image on a device having a function for distributing users.

Similarly to the first example, in the second example, the AR spaces M42a and M42b likewise may be respectively constructed by the AR application provider in advance, or dynamically constructed at the time of user check-in according to any of the methods described using FIGS. 12 to 14.

(3) Third Example of AR Space Selection

Figure 40:
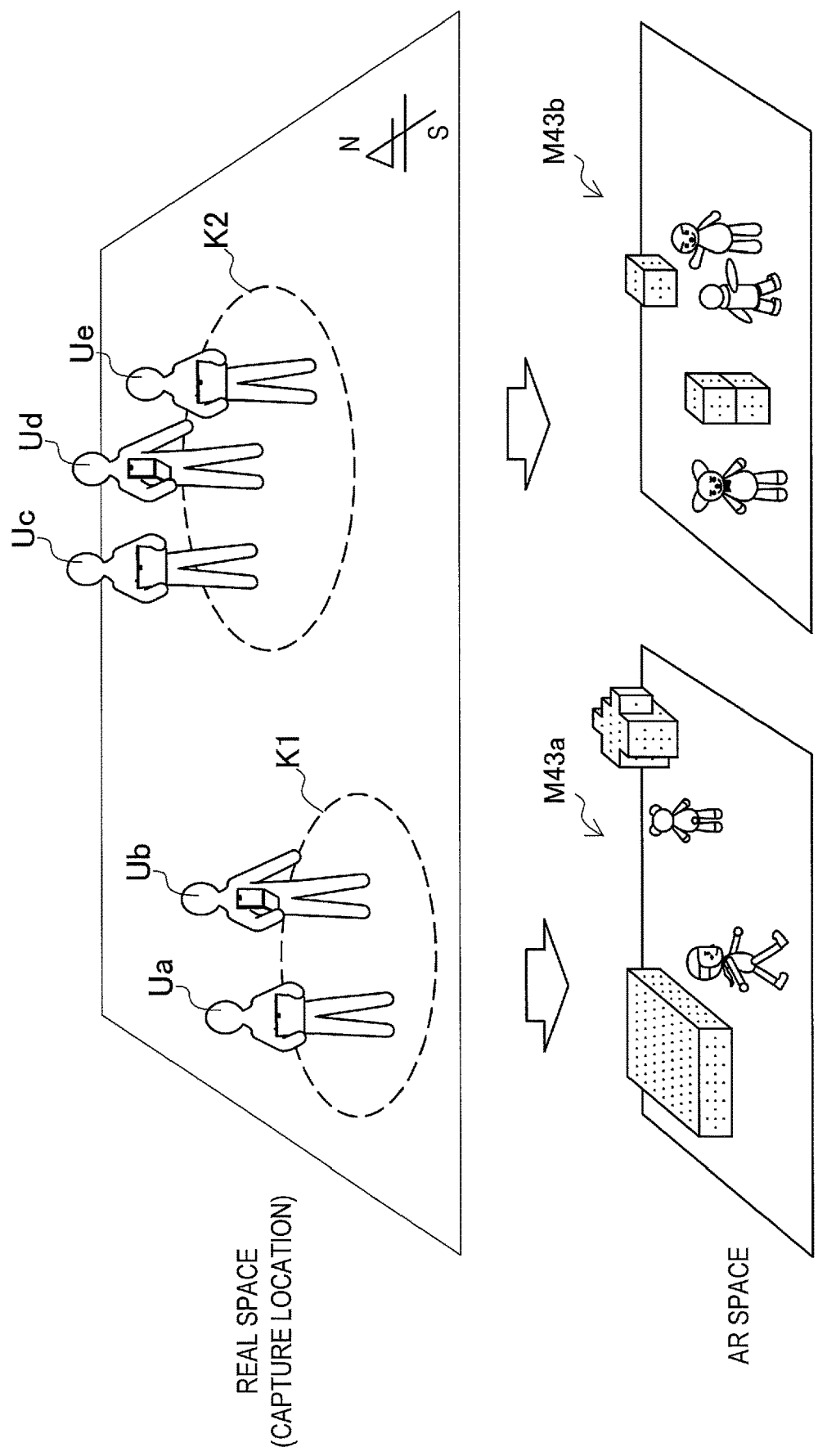
FIG. 40 is an explanatory diagram for describing for a third example of a technique for selecting an AR space.

FIG. 40 is an explanatory diagram for describing for a third example of a technique for selecting an AR space. In the third example, the image-related information includes the capture location of an input image. The AR space setting unit 144 sets a shared AR space for users capturing the same or different reference objects in the same place. In the upper part of FIG. 40, five users Ua, Ub, Uc, Ud, and Ue are illustrated.

For example, the users Ua and Ub are positioned in the same place K1 in a real space. Accordingly, the AR space setting unit 144 of the devices of the users Ua and Ub respectively sets a shared AR space M43a for the users Ua and Ub. The users Uc, Ud, and Ue are positioned in the same place K2 in a real space. Accordingly, the AR space setting unit 144 of the devices of the users Uc, Ud, and Ue respectively sets a shared AR space M43b for the users Uc, Ud, and Ue.

In this way, by distributing users among different AR spaces according to the capture location of an input image, it becomes possible to form an AR community in which the avatars of multiple users who have something in common with respect to a location are gathered in a single AR space. As a result, it is possible to invigorate communication among users in an AR community, compared to the case of multiple users' avatars checking into an AR space in a disorderly manner.

Note that the capture location of an input image may be measured by the sensor 104, for example. Additionally, sensor data may be transmitted to a device having a function for distributing users (such as an application server or the device of a parent user, for example), and an AR space model for a selected AR space may be acquired from that device by the data acquisition unit 130.

Similarly to the first and second examples, in the third example, the AR spaces M43a and M43b likewise may be respectively constructed by the AR application provider in advance, or dynamically constructed at the time of user check-in according to any of the methods described using FIGS. 12 to 14.

In the first and second examples, users are distributed among different AR spaces according to the attributes of a reference object depicted in an input image. Consequently, a technique of participating in an AR community, conceptually referred to as "checking in to an object", may be realized. On the other hand, in the example of FIG. 3, users are distributed among different AR spaces according to capture location. Consequently, a technique of participating in an AR community, conceptually referred to as "checking in to a location (or place)", may be realized. Note that the image-related information that may be used to distribute users among AR spaces is not limited to such examples. For example, the image-related information may also include the attributes of an image capture device that captured an input image. The attributes of an image capture device may be the image capture device's type, model name, or manufacturer name, for example. As a result, it becomes possible for the avatars of multiple users who have something in common with respect to an image capture device (for example, users capturing an input image with devices from the same manufacturer) to gather in a single AR space and form an AR community.

(4) Fourth Example of AR Space Selection

Figure 41:
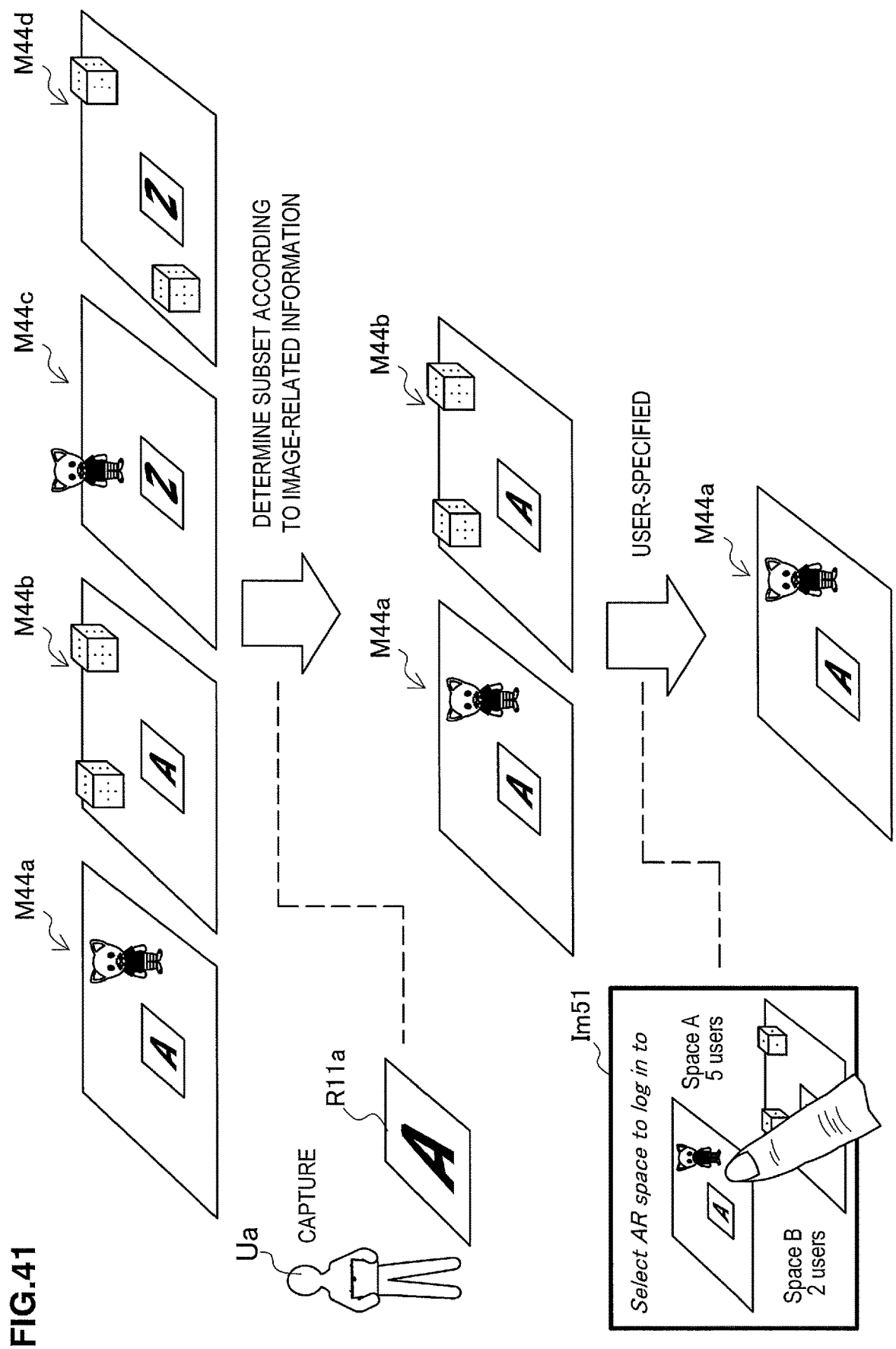
FIG. 41 is an explanatory diagram for describing for a fourth example of a technique for selecting an AR space.

FIG. 41 is an explanatory diagram for describing for a fourth example of a technique for selecting an AR space. In the fourth example, the AR space setting unit 144 selects an AR space specified by a user from among a subset determined according to image-related information from among multiple AR space candidates, and sets the selected AR space for that user. In the upper part of FIG. 41, four AR space candidates M44a, M44b, M44c, and M44d are illustrated.

For example, assume that a real object R11a, which is a reference object, is depicted in an input image captured by a user Ua. Then, the recognition unit 142 recognizes that the real object R11a is depicted in the input image. The AR space setting unit 144 acquires attributes of the real object R11a as image-related information, on the basis of a recognition result from the recognition unit 142. Subsequently, the AR space setting unit 144 determines a subset of AR space candidates according to the attributes of the real object R11a. In the example in FIG. 41, the AR space candidates M44a and M44b are included in the determined subset. Next, the AR space setting unit 144 displays a list of AR space candidates included in the subset in an image Im51, and prompts the user to specify the AR space candidate that the user Ua wants to check in to. In the example in FIG. 41, the AR space setting unit 144 sets the AR space M44a specified by the user Ua for the user Ua.

In this way, the distribution of users among AR spaces may also be conducted in stages. Particularly, by combining distribution according to image-related information, such as the attributes of a reference object or a location, with user specification in stages, user confusion over selecting an AR space from among many AR space candidates may be reduced, while still leaving room for the user to make a selection.

Note that in the case in which an AR space is not determined from image-related information, the AR space setting unit 144 may set a default AR space that does not depend on image-related information (also called an anonymous space) for a user. The case in which an AR space is not determined from image-related information may include, for example, the case in which a reference object is not depicted in an input image, the case in which position data is not acquired, or the case in which a user desires to select a predetermined AR space. A predetermined AR space may be a plain space in which there simply exists just a horizontal plane (ground) on which an avatar is active, or a richer space.

[5-2. Adjusting Variable Parameters]

As discussed earlier, the AR space setting unit 144 may also adjust, according to image-related information, variable parameters of an AR space to set for a user. Variable parameters of an AR space may include, for example, the size of the AR space, the number of NPCs, a polygon resolution, an upper limit on the number of users who may participate, the texture or color of a virtual object, types of actions that are executable within the AR space, or types of items that are usable within the AR space.

(1) First Example

FIG. 42 is an explanatory diagram for describing for a first example of adjusting variable parameters of an AR space. In the example in FIG. 42, the variable parameters of the AR space include the space size and the number of NPCs. These variable parameters are adjusted for each AR space according to the type of a reference object. In the upper part of FIG. 42, five users Ua, Ub, Uc, Ud, and Ue are illustrated.

For example, the user Ua captures a real object R11a as a reference object. The user Ub captures a real object R11b as a reference object. The real objects R11a and R11b are the same type of object. As a result, a shared AR space M45a is set in the devices of the users Ua and Ub. The AR space setting unit 144 sets the space size of the AR space M45a to small, and sets the number of NPCs to 1.

Meanwhile, the user Uc captures a real object R19c as a reference object. The user Ud captures a real object R19d as a reference object. The user Ue captures a real object R19e as a reference object. As a result, a shared AR space M45b is set in the devices of the users Uc, Ud, and Ue. The AR space setting unit 144 sets the space size of the AR space M45b to large, and sets the number of NPCs to 3.

In this way, by adjusting variable parameters of an AR space according to image-related information, it is possible to clearly demonstrate differences in the features of each AR space to users. As a result, it becomes possible to give users the motivation to try capturing various objects or capturing real spaces in various locations, and invigorate AR communities. Also, in the case of anticipating a situation in which many users check in to the same type of object in marketing applications or the like, crowding in an AR space may be prevented by setting a sufficiently large space size for the AR space related to the product.

(2) Second Example

Figure 43:
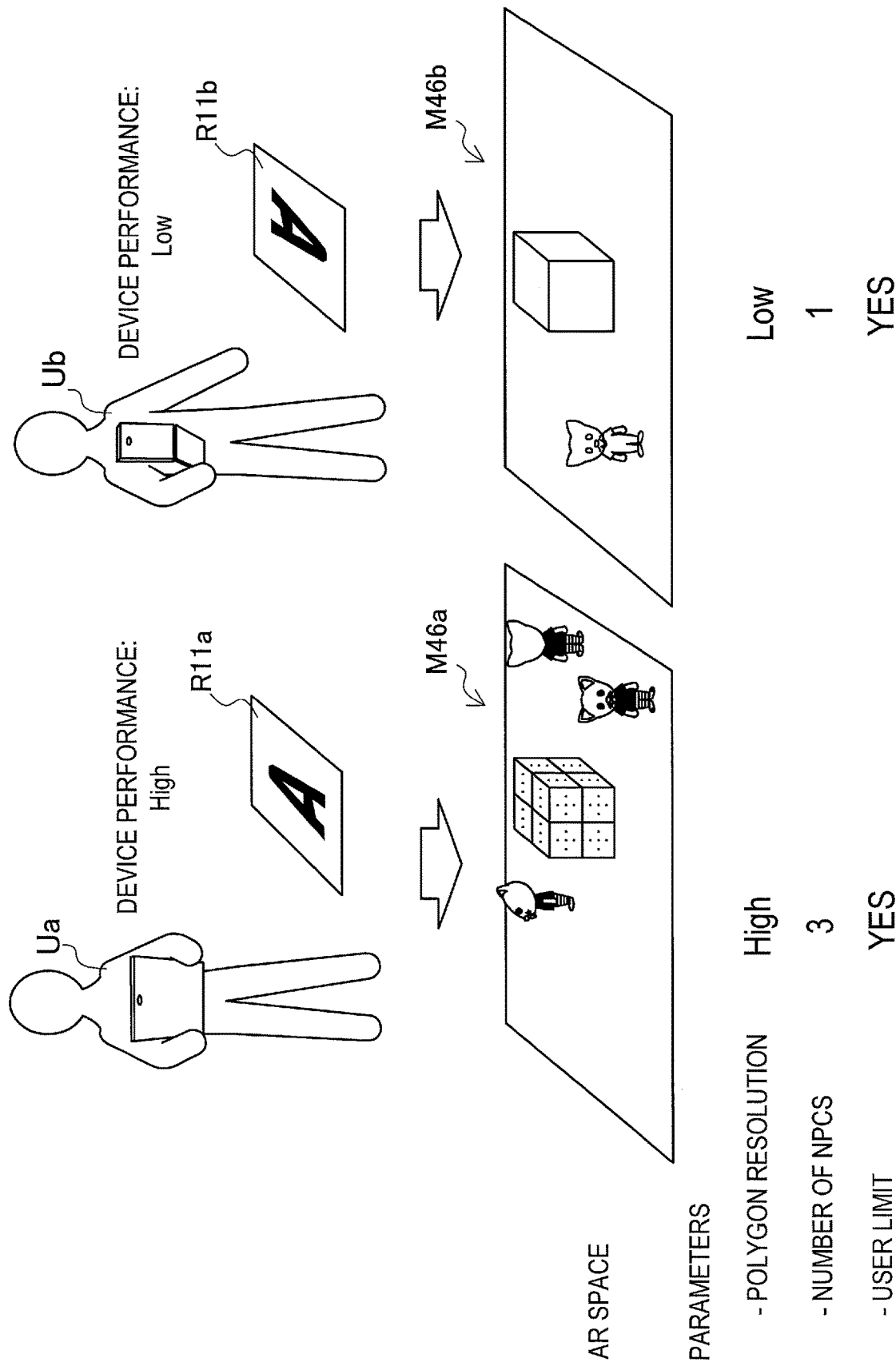
FIG. 43 is an explanatory diagram for describing for a second example of adjusting variable parameters of an AR space.

FIG. 43 is an explanatory diagram for describing for a second example of adjusting variable parameters of an AR space. In the example in FIG. 43, the variable parameters of the AR space include a polygon resolution, the number of NPCs, and a user upper limit. These variable parameters are adjusted for each user according to the performance of the device involved in displaying the AR space. In the upper part of FIG. 43, two users Ua and Ub are illustrated.

For example, the user Ua captures a real object R11a as a reference object. The user Ub captures a real object R11b as a reference object. The real objects R11a and R11b are the same type of object. As a result, a shared AR space is set in the devices of the users Ua and Ub. However, assume that the performance of the device of the user Ub is low compared to the performance of the device of the user Ua, and that it is difficult for the device of the user Ub to display an image of an AR space with the same image quality as the device of the user Ua.

Accordingly, the AR space setting unit 144 of the device of the user Ub adjusts variable parameters of the AR space to set. In the example in FIG. 43, the AR space setting unit 144 respectively sets the polygon resolution and the number of NPCs in an AR space M46b for the user Ub to "low" and "1", respectively, and imposes an upper limit on the number of users. On the other hand, the AR space setting unit 144 of the device of the user Ua respectively sets the polygon resolution and the number of NPCs in the AR space M46a for the user Ua to "high" and "3", respectively. Since the AR space M46a is a shared space with the AR space M46b, an upper limit may be imposed on the number of users in the AR space M46a.

In this way, by adjusting, for each user, variable parameters of an AR space according to the performance of a device involved in displaying the AR space, suitable display of the AR space may be ensured on a variety of devices, enabling more users to utilize an AR application. Note that the object control unit 146 may, for a predefined friend user, maintain a rich image representation of the avatar of that friend user (for example, a high polygon resolution or complete avatar image), and simplify only the image representation of other avatars (for example, a low polygon resolution, or by displaying only a facial image).

[5-3. Setting Initial Position]

The object control unit 146 may determine an initial position of a virtual object such as an avatar placed within an AR space, on the basis of various conditions. For example, the object control unit 146 may determine an initial position of an avatar on the basis of the image-related information discussed earlier, or on the basis of user attributes.

(1) First Example

Figure 44:
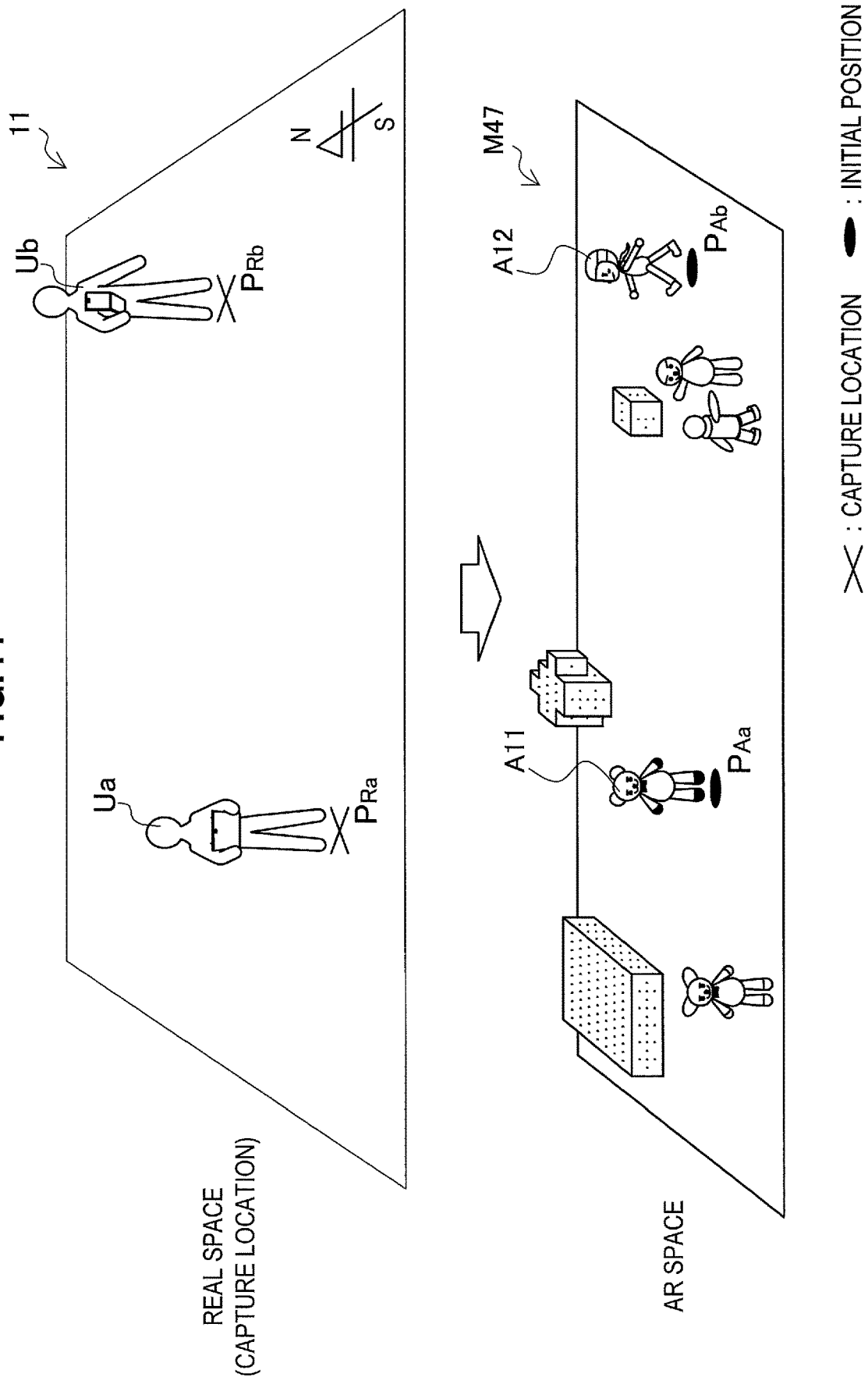
FIG. 44 is an explanatory diagram for describing a first example of a technique for setting an initial position of a virtual object in an AR space.

FIG. 44 is an explanatory diagram for describing a first example of a technique for setting an initial position of a virtual object in an AR space. In the example in FIG. 44, the initial position of a virtual object is determined on the basis of image-related information. The image-related information includes a capture position. In the upper part of FIG. 44, two users Ua and Ub are illustrated. The user Ua is positioned at a position PRa in a real space. The user Ub is positioned at a position PRb in a real space.

For example, as a result of the user Ua and the user Ub capturing the same type of reference object, a shared AR space M47 is set in the devices of the users Ua and Ub. The object control unit 146 places the avatar A11 of the user Ua at a position PAa within the AR space M47. The position PAa corresponds to the position PRa of the user Ua within the real space. Also, the object control unit 146 places the avatar A12 of the user Ub at a position PAb within the AR space M47. The position PAb corresponds to the position PRb of the user Ub within the real space.

In this way, in the case in which an AR space is shared by multiple users, by determining the initial positions of virtual objects on the basis of image-related information, users having more topics of conversation in common may be placed closer to each other, thereby encouraging communication among users.

(2) Second Example

Figure 45:
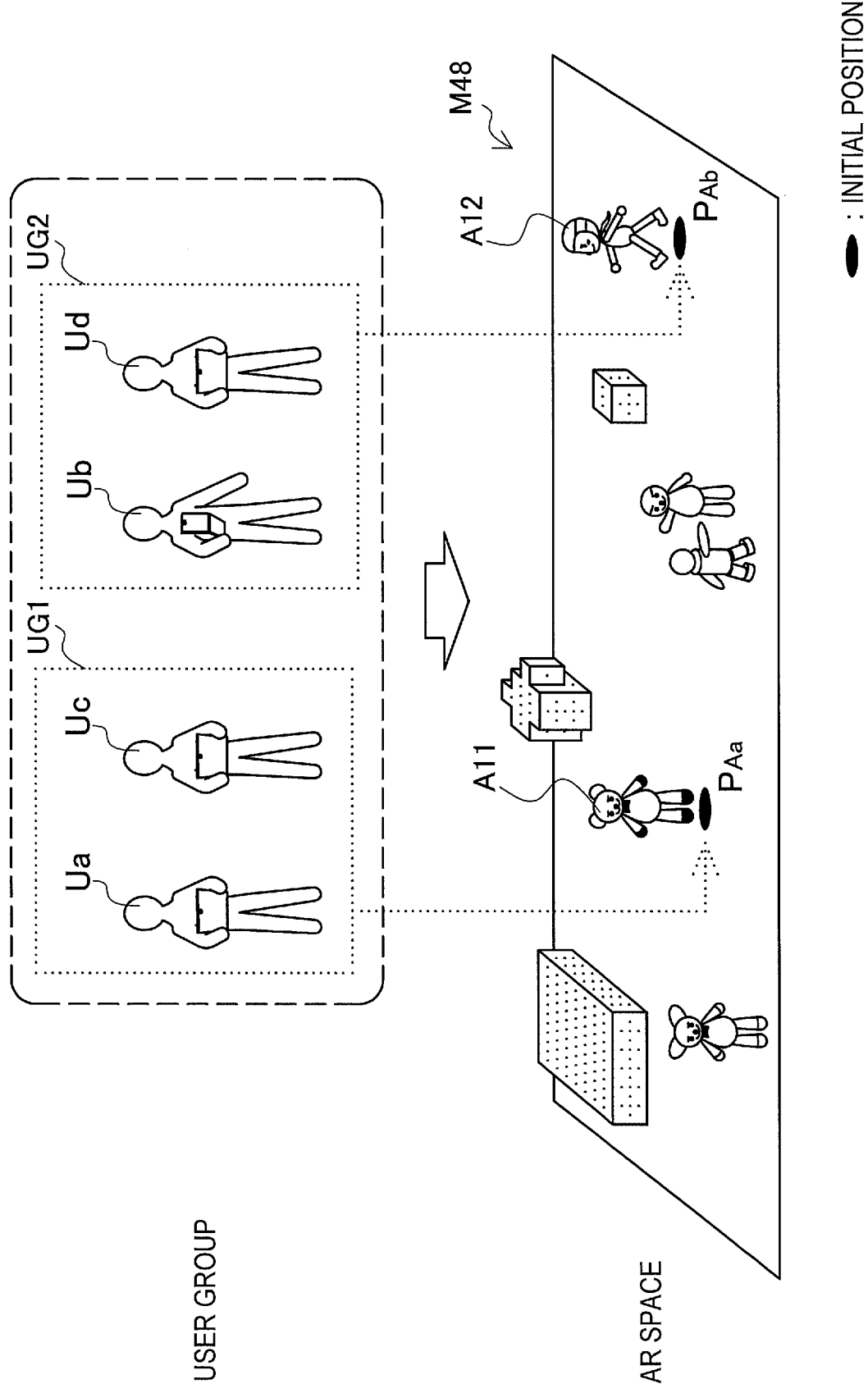
FIG. 45 is an explanatory diagram for describing a second example of a technique for setting an initial position of a virtual object in an AR space.

FIG. 45 is an explanatory diagram for describing a second example of a technique for setting an initial position of a virtual object in an AR space. In the example in FIG. 45, the initial position of a virtual object is determined on the basis of user attributes. Herein, the user attributes may be a user's age, gender, occupation, place of work, preferences, or a predefined group, for example. In the upper part of FIG. 44, four users Ua, Ub, Uc, and Ud are illustrated. The users Ua and Uc belong to a user group UG1. The users Ub and Ud belong to a user group UG2.

For example, a shared AR space M48 is set in the devices of the users Ua, Ub, Uc, and Ud. The object control unit 146 places the avatar A11 of the user Ua at a position PAa within the AR space M48. The position PAa may be determined in advance as an initial position for the user group UG1. Also, the object control unit 146 places the avatar A12 of the user Ub at a position PAb within the AR space M48. The position PAb may be determined in advance as an initial position for the user group UG2.

In this way, in the case in which an AR space is shared by multiple users, by determining an initial position for each user by grouping users on the basis of their attributes, users having mutually similar attributes may be placed closer together, thereby encouraging communication among users. Also, in the case in which a user actively wants to communicate with other users having different attributes from himself or herself, the user may move his or her own avatar to an area distanced from the initial position, and attempt to communicate with other users in that area.

[5-4. Various Access Modes]

(1) Normal Mode

In a normal access mode, the object control unit 146 places one or more user avatars (or some other virtual objects) accessing the same AR space in real-time within that AR space. Subsequently, the object control unit 146 exchanges action data, which states an action of an avatar operated by a user, with the devices of other users (for example, via an application server, or directly) in real-time. Also, the object control unit 146 shares an action scenario of an NPC (a non-user character) placed within the AR space with the devices of other users. Herein, an action scenario is data in which the future actions of each NPC are stated along a time axis. As a result, it becomes possible for multiple users to simultaneously experience the world of a shared AR application in which avatars and NPCs act in the same ways. The action scenario may be broadcast at a fixed time interval, or delivered to each user's device when each user checks in, for example.

FIG. 46 is an explanatory diagram for describing change in the number of avatars in an AR space in normal mode. Referring to FIG. 46, there are illustrated a time axis proceeding from the top to the bottom of the drawing, and five users Ua, Uf, Ug, Uh, and Ui on the left side of the time axis. The user Uf checks in to the AR space at time t11, and checks out from the AR space at time t13. The user Ug checks in to the AR space at time t12, and checks out from the AR space at time t18. The user Uh checks in to the AR space at time t15. The user Ui checks in to the AR space at time t16. Meanwhile, the user Ua checks in to the AR space at time t14.

When the user Ua checks in to the AR space M51 at time t14, other than the avatar A11 of the user Ua, the avatar of one user (the user Ug) and an NPC exist in the AR space M51. After that, at time t17, the users have increased, and other than the avatar A11 of the user Ua, the avatars of three users (the users Ug, Uh, and Ui) and the NPC exist in the AR space M51.

In this way, in the case in which many users share a single AR space, a sufficient number of users playing simultaneously is ensured, even if only the avatar of a user accessing the AR application in real-time is placed in an AR space. However, in the case in which there are few users sharing an AR space, in a completely real-time access mode, a situation in which only one user is accessing the AR application at the same time is also anticipated. In such a situation, it is valuable to use the replay mode described next instead of the above normal mode.

(2) Replay Mode

In replay mode, the object control unit 146 also places the avatar of a user who previously accessed the same AR space within that AR space.

Figure 47:
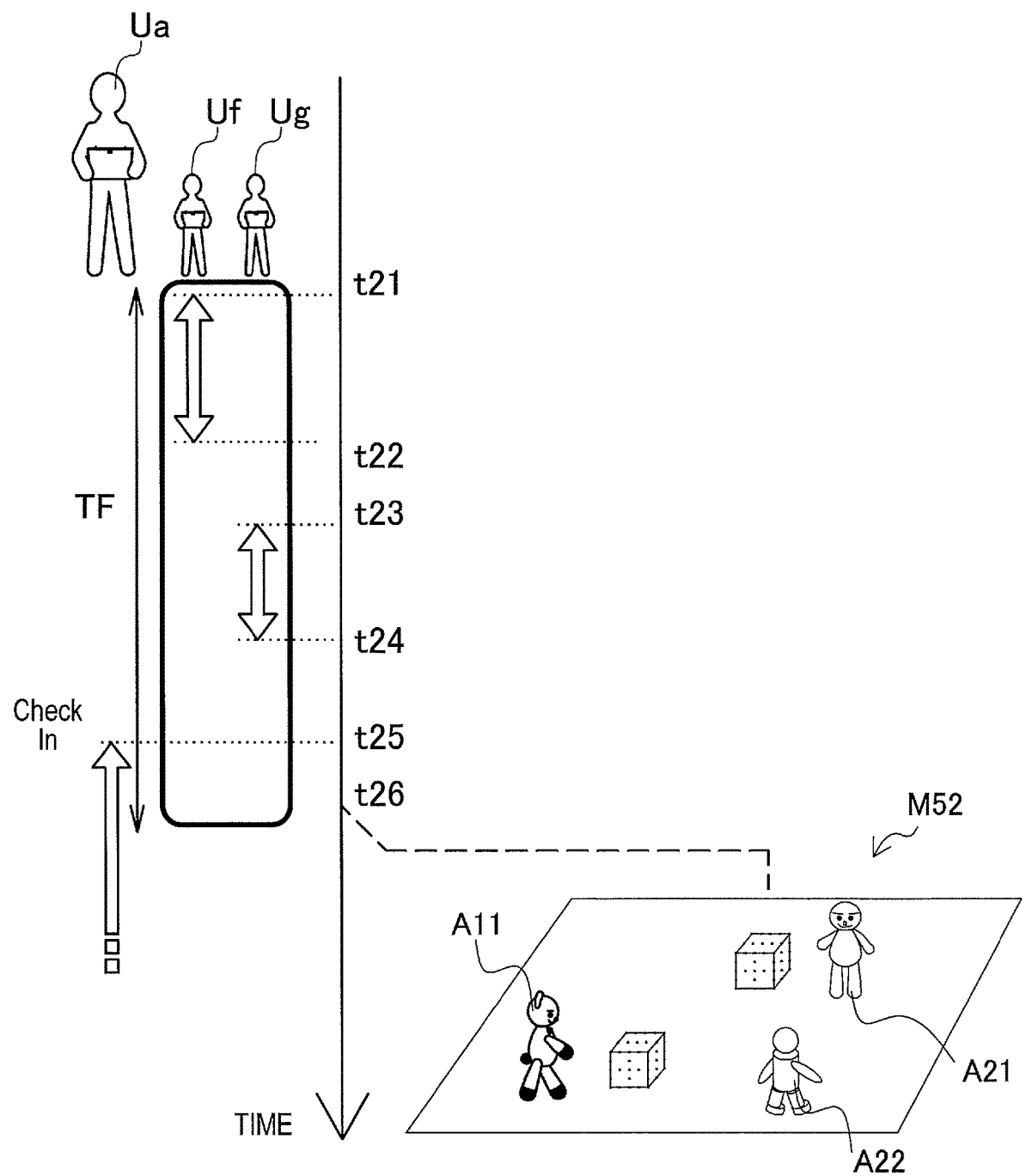
FIG. 47 is an explanatory diagram for describing change in the number of avatars in an AR space in a replay mode.

FIG. 47 is an explanatory diagram for describing change in the number of avatars in an AR space in replay mode. Referring to FIG. 47, there are illustrated a time axis proceeding from the top to the bottom of the drawing, and three users Ua, Uf, and Ug on the left side of the time axis. The user Uf checks in to the AR space at time t21, and checks out from the AR space at time t22. The user Ug checks in to the AR space at time t23, and checks out from the AR space at time t24. Meanwhile, the user Ua checks in to the AR space at time t25.

The user Ua is the only user who is actually accessing the AR space M52 at the time when the user Ua checks in to the AR space M52 at time t25. In this case, if an avatar is placed within the AR space M52 according to normal mode discussed earlier, the user Ua cannot know of the existence of the other users. However, in replay mode, the object control unit 146 also places the avatars of the users Uf and Ug who previously accessed the AR space M52 within the AR space M52. In the example in FIG. 47, a time frame TF extending into the past from time t26 includes the times t21, t22, t23, and t24. Accordingly, the object control unit 146 places not only the avatar A11 of the user Ua, but also the avatar A21 of the user Uf and the avatar A22 of the user Ug, within the AR space M52. The user Ua is then able to know the kind of users to which the avatars A21 and A22 belong, via a user interface such as the one described using FIG. 29.

By providing such a replay mode, it is possible to prevent an AR space from appearing deserted, and maintain user interest in the AR space, even in the case in which there are few users sharing the AR space. Also, it becomes possible for a user who captures a rare item as a reference object to know what kinds of other users show an interest in the same item. Note that the length of the time frame TF may be statically defined in advance, or dynamically set according a parameter such as the number of users.

(3) Trail Mode

The object control unit 146 may also support the trail mode described next instead of replay mode. In trail mode, the object control unit 146 expresses a trail of the avatar of a user who previously accessed the same AR space in that AR space.

Figure 48:
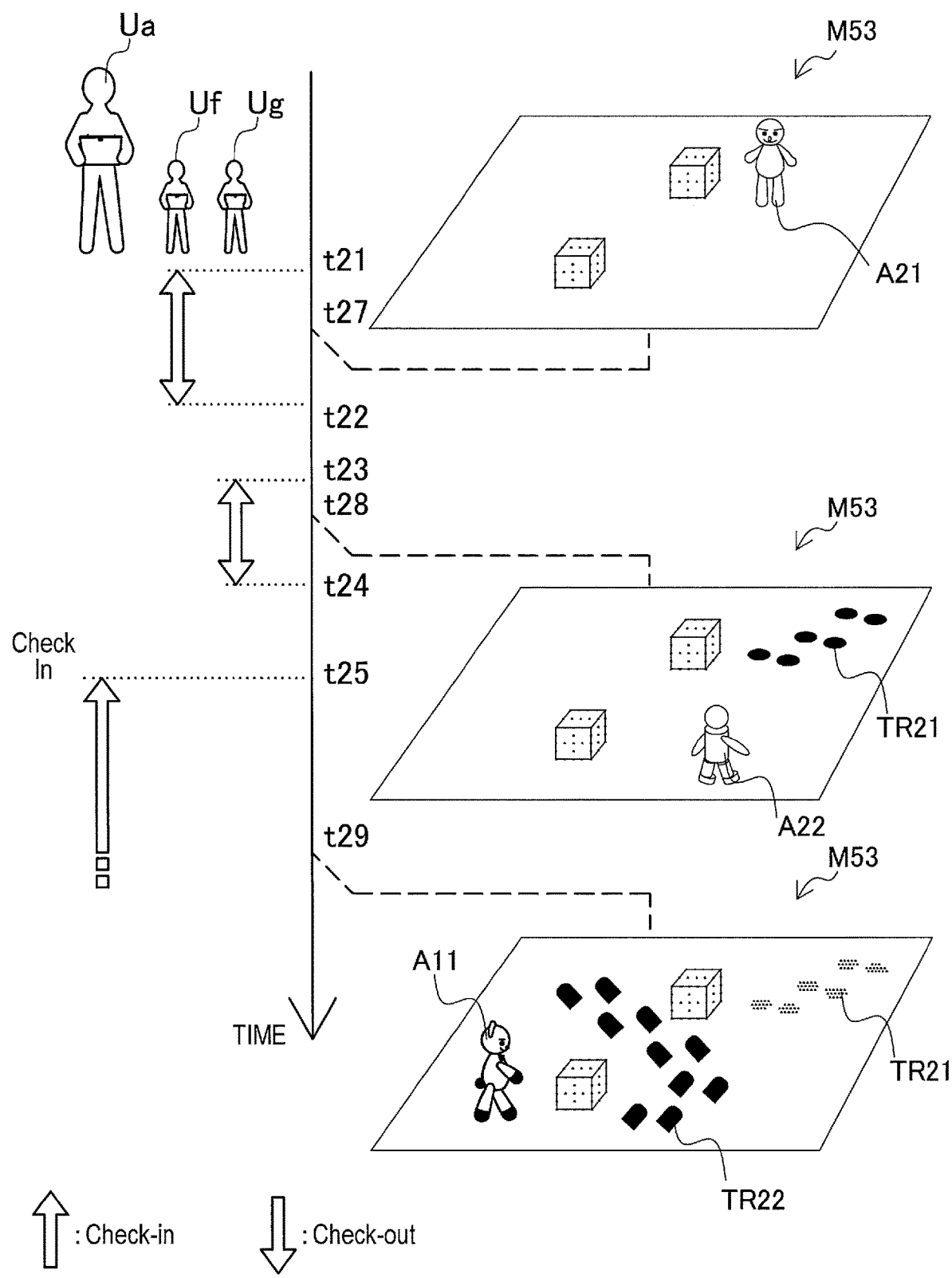
FIG. 48 is an explanatory diagram for describing a trail mode.

FIG. 48 is an explanatory diagram for describing trail mode. Referring to FIG. 48, there are illustrated a time axis proceeding from the top to the bottom of the drawing, and three users Ua, Uf, and Ug on the left side of the time axis. The timings of the users Ua, Uf, and Ug checking in to and checking out of an AR space are similar to the example in FIG. 47.

At a time t27 between time t21 and time t22, the avatar A21 of the user Uf is placed in the AR space M53. Next, at a time t28 between time t23 and time t24, the avatar A22 of the user Ug is placed in the AR space M53. Although the avatar A21 of the user Uf has already exited the AR space M53, a trail TR21 expressing that the avatar A21 was present remains in the AR space M53. Next, at a time t29 later than time t25, the avatar A11 of the user Ua is placed in the AR space M53. Although the avatar A21 of the user Uf and the avatar A22 of the user Ug have already exited the AR space M53, trails TR21 and TR22 expressing that the avatars A21 and A22 were present remain in the AR space M53. Note that these trails may also visually fade out over time (see the trail TR21).

By providing such a trail mode, a user is able to know from the trails how many user avatars were previously present in an AR space, and what kinds of activity those avatars conducted.

(4) Moving Between AR Spaces

In the case in which a user's interest shifts to another AR space after checking in to a given AR space, it is inconvenient if the user is required to first check out from the current AR space and then check in again to the other AR space. Accordingly, the AR space setting unit 144 may also place, within an AR space set for a user, a path enabling an avatar to move to another AR space.

Figure 49:
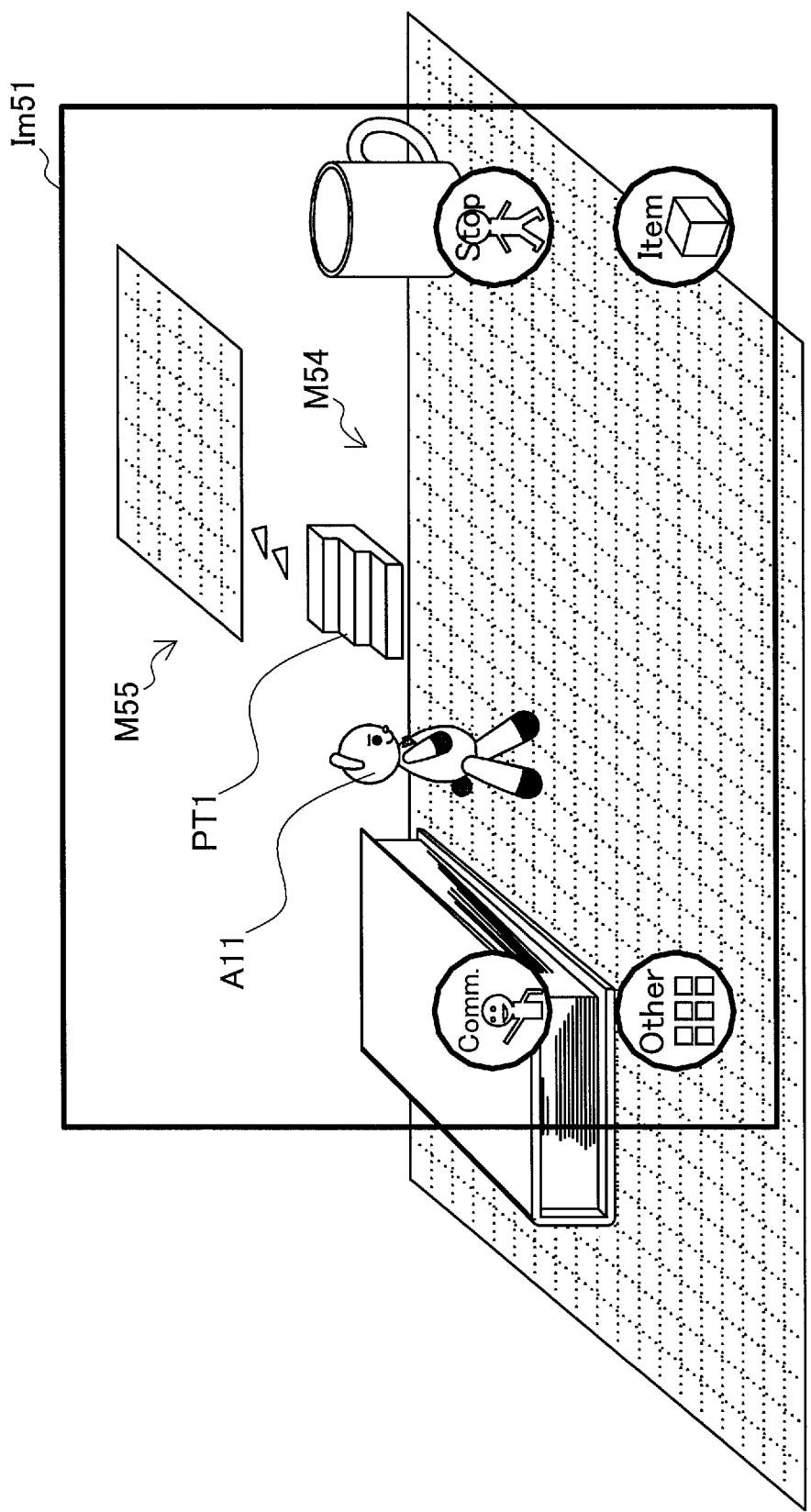
FIG. 49 is an explanatory diagram for describing an example of a path for moving between AR spaces.

FIG. 49 is an explanatory diagram for describing an example of a path for moving between AR spaces. Referring to FIG. 49, an AR space M54 is depicted in an image Im51. An avatar A11 is placed in the AR space M54. Also, a path PT11 in the shape of stairs is placed within the AR space M54. The path PT11 is connected to another AR space M55. For example, if a user causes the avatar A11 to move over the path PT11 via a user interface like the one described using FIG. 20, the AR space setting unit 144 newly sets the AR space M55 for the user.

By providing such a path for moving between AR spaces, it becomes easy for an avatar to walk across various AR communities. Also, making not only the current AR space but also other enterable AR spaces visible on-screen entices user curiosity, and may encourage user participation in various AR communities.

<6. Process Flow Examples>

[6-1. Screen Transitions at Check-in]

Figure 50B:
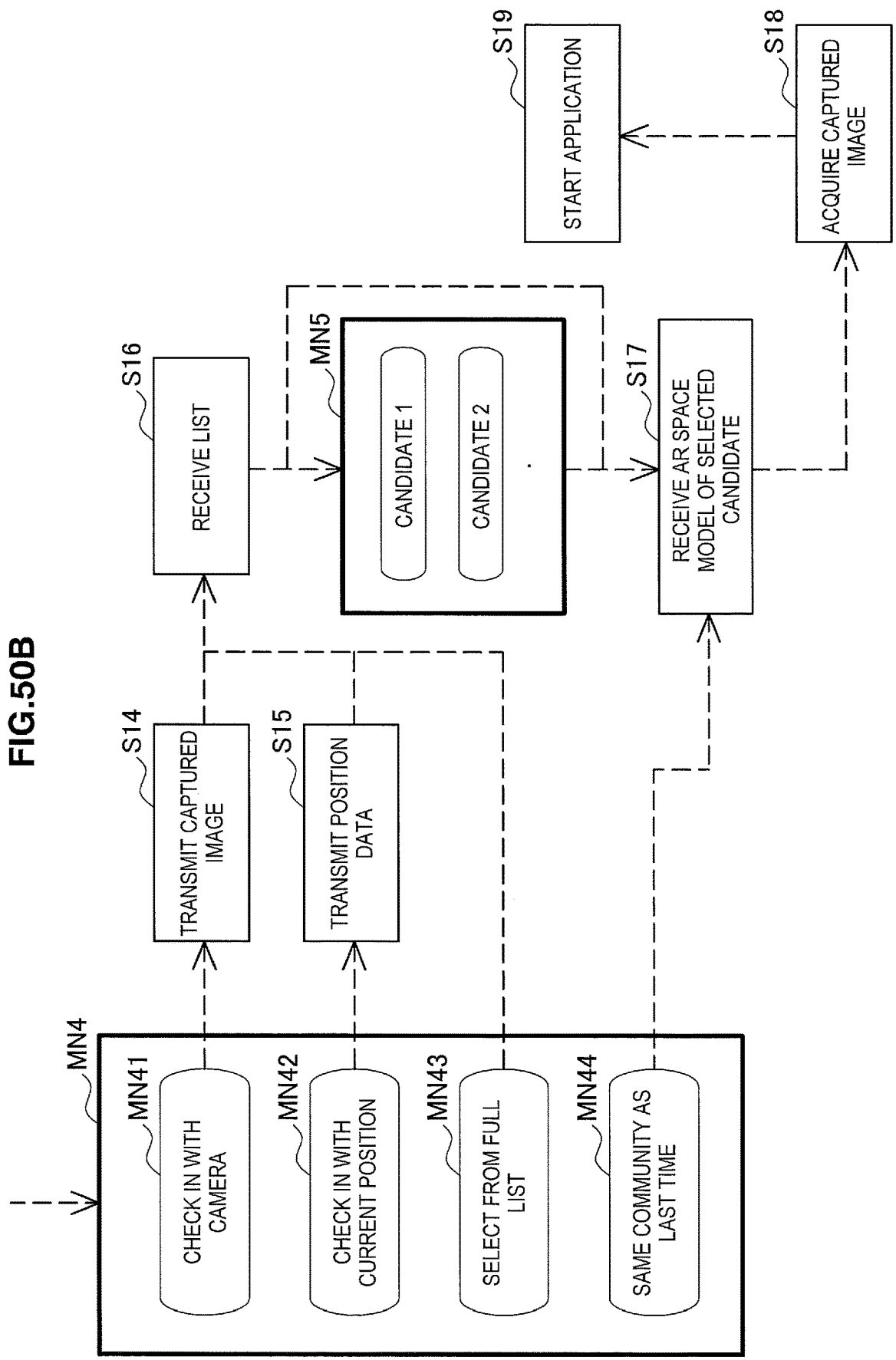
FIG. 50B is the second part of a transition diagram for describing an example of screen transitions for checking into an AR space.

FIGS. 50A and 50B are transition diagrams for describing an example of screen transitions when a user checks in to an AR space.

Referring to FIG. 50A, first, the AR space setting unit 144 causes a menu MN1 to be displayed on-screen. The menu MN1 includes a menu item MN11 ("Play alone"), a menu item MN12 ("Play with everyone (become a parent)"), and a menu item MN13 ("Play with everyone"). In the case in which the user selects the menu item MN11, the AR space setting unit 144 causes a menu MN2 to be displayed on-screen. The menu MN2 includes a menu item MN21 ("Construct new space") and a menu item MN22 ("Load data").

In the case in which the user selects the menu item MN21 on the menu MN2, the image acquisition unit 120 acquires a captured image as an input image in order to newly construct an AR space (step S12).

On the other hand, in the case in which the user selects the menu item MN22 on the menu MN2, the AR space setting unit 144 causes another menu MN3 to be displayed on-screen. The menu MN3 includes a list of stored AR space models. Subsequently, if the user selects one of the AR space models, the AR space setting unit 144 loads the selected AR space model from the data storage unit 160 (step S11). The image acquisition unit 120 acquires a captured image as an input image in order to associate the loaded AR space with a real space (step S12).

Subsequently, the AR space setting unit 144 sets an AR space in association with the real space depicted on the input image on the basis of a recognition result by the recognition unit 142 for the input image, or by using the loaded AR space model. As a result, an AR application is started (step S13).

In the case in which the menu item MN12 or MN13 on the menu MN1 is selected, the AR space setting unit 144 causes a menu MN4 to be displayed on-screen. Referring to FIG. 50B, the menu MN4 includes a menu item MN41 ("Check in with camera"), a menu item MN42 ("Check in with current position"), a menu item MN43 ("Select from full list"), and a menu item MN44 ("Same community as last time").

In the case in which the user selects the menu item MN41 on the menu MN4, the AR space setting unit 144 transmits a captured image acquired by the image acquisition unit 120 to a device having a function for distributing users (step S14). Herein, as an example, assume that an application server has a function for distributing users. Also, in the case in which the user selects the menu item MN42 on the menu MN4, the AR space setting unit 144 transmits position data acquired by the data acquisition unit 130 to the application server (step S15). Also, in the case in which the user selects the menu item MN43 on the menu MN4, the AR space setting unit 144 transmits a request requesting the delivery of an AR space candidate list to the application server. In all cases, the AR space setting unit 144 receives an AR space candidate list from the application server (step S16).

The AR space setting unit 144 causes a menu MN5 to be displayed on-screen in the case in which the AR space candidate list received from the application server includes multiple AR space candidates. The display of the menu MN5 may be omitted in the case in which the AR space candidate list includes only one AR space candidate. Subsequently, the AR space setting unit 144 receives, from the application server, an AR space specified by the user on the menu MN5, or the AR space model of the single AR space included in the AR space candidate list (step S17).

On the other hand, in the case in which the user selects the menu item MN44 on the menu MN4, the AR space setting unit 144 acquires the identifier of the AR space from which the user last checked out from the data storage unit 160, and receives an AR space model of the AR space identified by that identifier from the application server (step S17).

Subsequently, the image acquisition unit 120 acquires a captured image as an input image (step S18). The AR space setting unit 144 uses the AR space model received from the application server to set an AR space in association with a real space depicted in the input image (step S18). Subsequently, an AR application is started (step S19).

[6-2. Executing AR Application]

Figure 51:
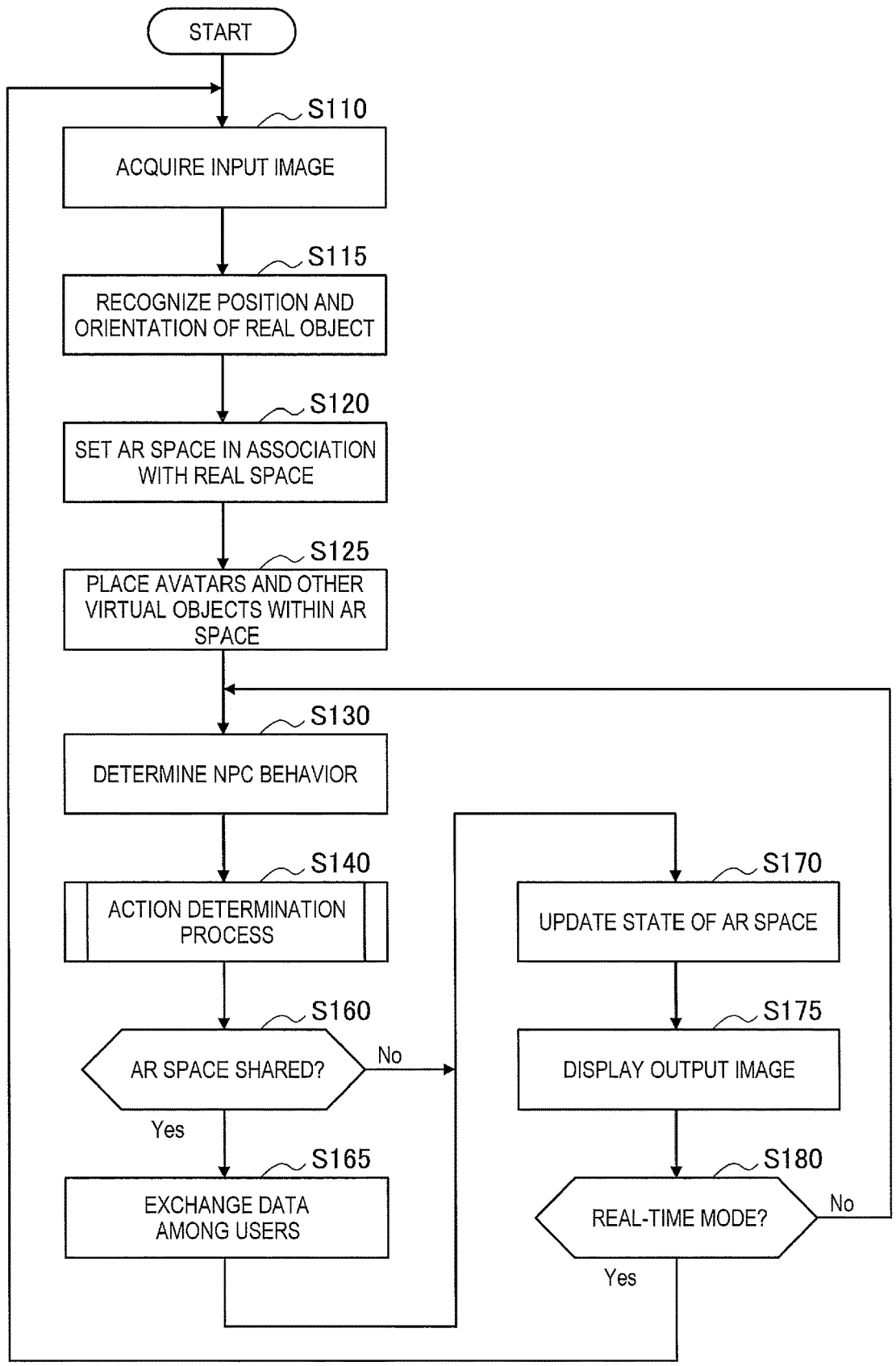
FIG. 51 is a flowchart illustrating an example of a flow of information processing for executing an AR application.

FIG. 51 is a flowchart illustrating an example of a flow of information processing for executing an AR application.

Referring to FIG. 51, first, the image acquisition unit 120 acquires a captured image depicting a real space from the camera 102 as an input image (step S110). Subsequently, the image acquisition unit 120 outputs the acquired input image to the AR processing unit 140.

Next, the recognition unit 142 recognizes the position and orientation of a real object depicted in an input image input from the image acquisition unit 120 (step S115). In addition, the recognition unit 142 may also recognize the position and orientation of the information processing device 100. Subsequently, the recognition unit 142 generates or updates a real space map 164 on the basis of the recognition results, and causes the real space map 164 to be stored in the data storage unit 160.

Next, the AR space setting unit 144 sets an AR space in association with the real space expressed by the real space map 164 (step S120). The AR space set at this point may be a space constructed by discretizing real objects within the real space depicted in the input image in units of voxels, or a space expressed by an AR space model received from another device.

Next, the AR space setting unit 144 places one or more avatars and other virtual objects within the set AR space (step S125). The avatars placed at this point may include the main user's avatar, as well as the avatars of other users sharing the AR space. Also, the virtual objects placed at this point may include NPCs (non-user characters).

Next, the object control unit 146 determines the behavior of NPCs placed within the AR space, according to an action scenario that may be acquired in advance (step S130).

Also, the object control unit 146 executes an action determination process, and determines an action for the avatar of the main user (step S140). Subsequently, in the case in which the AR space is being shared with another user (step S160), the object control unit 146 exchanges action data with the device of that other user (step S165).

Next, the object control unit 146 updates the state of the AR space (such as the position and orientation of one or more virtual objects, including avatars, for example) (step S170). Subsequently, the object control unit 146 causes an output image with virtual object images superimposed (and may include animations of avatar actions) to be displayed on the screen of the display 110 (step S175).

After that, in the case in which the operating mode at that point is a real-time mode, the process returns to step S110, and the above process is repeated, taking the next frame as the input image. On the other hand, in the case in which the operating mode is a snapshot mode, a new input image is not acquired, and the above processing in step S130 and thereafter is repeated (step S180).

[6-3. Action Determination Process]

Figure 52:
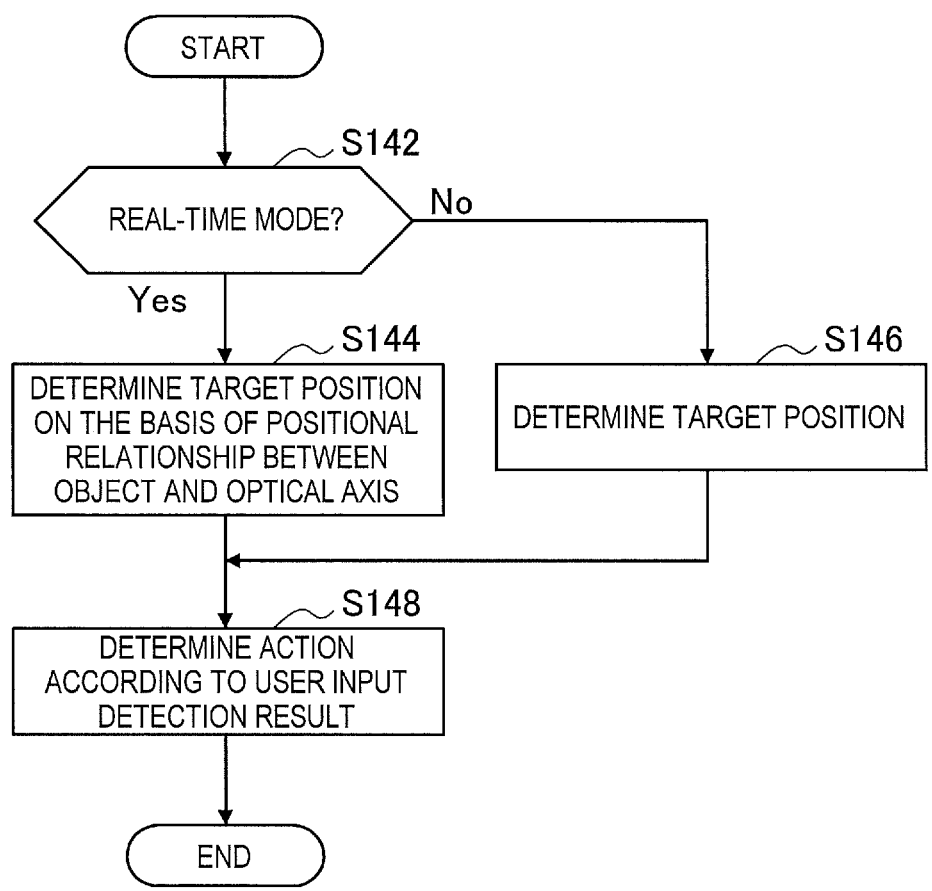
FIG. 52 is a flowchart illustrating an example of a detailed flow of the action determination process illustrated in FIG. 51.

FIG. 52 is a flowchart illustrating an example of a detailed flow of the action determination process illustrated in FIG. 51. Referring to FIG. 52, the action determination process branches depending on whether the operating mode at the time is real-time mode or snapshot mode (step S142).

In the case in which the operating mode is real-time mode, the object control unit 146 determines a target position for an action, on the basis of the positional relationship between an object within the AR space and the optical axis of the camera (step S144). On the other hand, in the case in which the operating mode is snapshot mode, the object control unit 146 determines a target position for an action, but not on the basis of the positional relationship between an object and the optical axis of the camera (step S146).

Next, the object control unit 146 determines an action to be executed by the avatar of the main user, according to a user input detection result (step S148).

<7. Exemplary Modifications>

[7-1. Client/Server Linkage]

The block diagram illustrated in FIG. 4 illustrates an example in which a user client (that is, the information processing device 100) includes major functions such as real space recognition, AR space setting, and object control. However, the technology according to the present disclosure is also applicable to an example in which at least part of these functions are implemented in an external device (such as an application server or another nearby client, for example). Accordingly, in this section, one such exemplary modification will be described.

Figure 53:
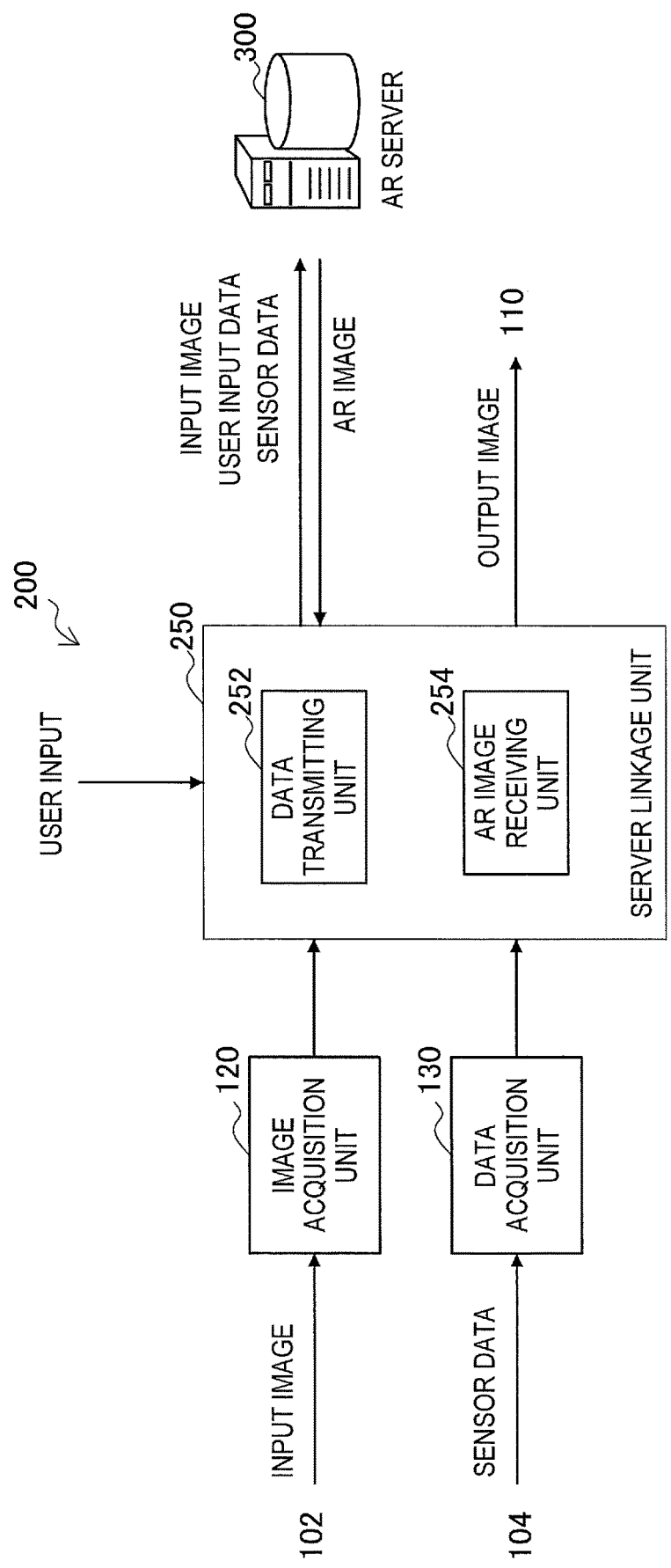
FIG. 53 is a block diagram illustrating an example of a configuration of logical functions of an information processing device according to an exemplary modification.

FIG. 53 is a block diagram illustrating an example of a configuration of logical functions of an information processing device 200 according to an exemplary modification. The hardware configuration of the information processing device 200 may be similar to the hardware configuration of the information processing device 100 illustrated in FIG. 3. Referring to FIG. 53, the information processing device 200 is equipped with an image acquisition unit 120, a data acquisition unit 130, and a server linkage unit 250. The server linkage unit 250 includes a data transmitting unit 252 and an AR image receiving unit 254.

The data transmitting unit 252 transmits an input image, via a communication interface, to a server device 300 that includes the same functions as the AR space setting unit 144 and the object control unit 146 of the information processing device 100. The data transmitting unit 252 may also transmit user input data to the server device 300 in the case in which user input is detected. Also, the data transmitting unit 252 may transmit, to the server device 300, sensor data that may include position data indicating the current position of the information processing device 200.

The AR image receiving unit 254 receives an AR image from the server device 300. An AR image received by the AR image receiving unit 254 is, for example, an image expressing an action executed within an AR space. An AR space may be set in association with an input image by discretizing real objects depicted in the input image in units of voxels. In addition, an AR space may be set according to image-related information that is related to an input image. A target position for an action may also be determined on the basis of the positional relationship between an object within the AR space and the optical axis of the camera. Subsequently, the AR image receiving unit 254 outputs an output image to the display 110, and causes an AR application image to be displayed on-screen.

[7-2. Simple Real Space Recognition]

The foregoing embodiment primarily describes an example in which an AR space model that indicates virtual object placement is generated by the recognition unit 142 first generating a real space map expressing position and orientation within a real space, and then the AR space setting unit 144 discretizing the real space map. However, virtual object placement may also be determined with a simpler technique.

FIG. 54 is an explanatory diagram for describing an exemplary modification of a technique for determining virtual object placement. Referring to FIG. 54, there is illustrated a marker object MK1 as an example of a real object, as well as a virtual object VM1 and a drawing model DM1 associated with the marker object MK1 in a content dictionary. In the example in FIG. 54, the drawing model DM1 is image data expressing the exterior of a ship. The drawing model DM1 may also be a type of virtual object. The content dictionary additionally defines a reference point RP1 that acts as a reference for the relative placement of the virtual object VM1 and the drawing model DM1 for the marker object MK1. The recognition unit 142 uses established image recognition technology to recognize the marker object MK1 depicted in an input image. The AR space setting unit 144 determines the position of the reference point RP1 within the input image, on the basis of the position of the recognized marker object MK1 and the definition in the content dictionary. Subsequently, the AR space setting unit 144 (or the object control unit 146) places the virtual object VM1, taking the determined position of the reference point RP1 as a reference (step S21 in the drawing). The virtual object VM1 may be a transparent object occupying one or more voxels. Additionally, the object control unit 146 superimposes the drawing model DM1 onto the marker object MK1 on-screen, taking the position of the reference point RP1 as a reference (step S22 in the drawing). An avatar, under control by the object control unit 146, moves as through to avoid the virtual object VM1 or get on board the virtual object VM1, for example. An avatar may also stack blocks onto the virtual object VM1 according to operations by a user. As a result, it is possible to display an output image on-screen as though the avatar were interacting with a ship expressed by the drawing model DM1. Note that the marker object may be an arbitrary object having some kind of texture (such as a poster or product packaging, for example). The content dictionary may also define data for any number of marker objects.

<8. Conclusion>

The foregoing thus describes various embodiments of technology according to the present disclosure using FIGS. 1 to 54. According to the foregoing embodiments, the appeal of augmented reality experienced by a user is improved via various perspectives, such as strengthened association between real objects and virtual objects, improved operability specifically for AR applications, and invigorated communication in AR communities.

For example, in the case in which an AR space is set by discretizing real objects within a real space depicted in a captured image in units of voxels, it is possible to easily prevent an avatar or some other virtual object active within the AR space from interfering with a real object. Such a technique enables reduced computational load and a simplified determination algorithm compared to a technique that directly determines interference from information stating the positions and orientations of real objects (such as the real space map discussed earlier, or the environment map described in JP 2011-159162A, for example). As a result, it also becomes easy to ensure real-time performance in an AR application in which multiple devices are linked to each other, for example.

Also, in the case in which a target position for an action executed within an AR space is determined on the basis of the positional relationship between an object within the AR space and the optical axis of an image capture device, for example, a it is possible to determine a target position without user input such as touch input or a button press. As a result, there is reduced shaking in device orientation when the user controls the action of a virtual object, thereby realizing consistent operation and improved operability of the AR application.

Also, in the case in which different AR spaces are set according image-related information that is related to a captured image, for example, rather than many users gathering in an AR space in a disorderly manner, it becomes possible to form an AR community in which the avatars of users having something in common gather in a shared AR space. When utilizing an AR application, ordinarily the user captures an image. Consequently, according to the present technique it is possible to form an effective AR community for communication among users, without imposing additional work on the user in order to acquire image-related information. Also, in the case in which the image-related information is an attribute of a reference object, a user is able to easily invite other users to a shared AR community by publishing an image of the reference object to other users via social medium such as a social networking service (SNS).

Note that the series of processes carried out by the various apparatuses described as embodiments of the present disclosure are typically realized using software. As one example, programs composed of software that realizes such series of processes are stored in advance on a storage medium (non-transitory medium) provided internally in or externally to such apparatuses. As one example, during execution, such programs are then written into RAM (Random Access Memory) and executed by a processor such as a CPU.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

Additionally, the present technology may also be configured as below.

(1)

An information processing device including:

an image acquisition unit that acquires a captured image of a real space from an image capture device;

a setting unit that sets, in association with the real space, an augmented reality space that virtually augments the real space depicted in the captured image; and a control unit that determines a target position for an action executed within the augmented reality space, on a basis of a positional relationship between an object within the augmented reality space and an optical axis of the image capture device.

(2) The information processing device according to (1),
wherein the control unit places a user avatar within the augmented reality space, and determines the target position of the action executed by the avatar on a basis of the positional relationship.

(3) The information processing device according to (2),
wherein the control unit determines the target position as a destination of movement by the avatar.

(4) The information processing device according to (2),
wherein the control unit determines the target position as a point of application of an item used by the avatar.

(5) The information processing device according to any one of (2) to (4),
wherein the control unit controls an orientation of the avatar on a basis of rotation about the optical axis of the image capture device.

(6) The information processing device according to any one of (1) to (5),
wherein the control unit changes a relative position, orientation, or scale of the augmented reality space with respect to the image capture device, on a basis of designated user input.

(7) The information processing device according to any one of (1) to (6),
wherein the control unit superimposes a user interface for causing a user to select a type of the action onto at least one of a right-edge region and a left-edge region of a window that displays an object within the augmented reality space, and
wherein the right-edge region and the left-edge region are regions reached by thumbs of a user gripping a display.

(8) The information processing device according to any one of (1) to (7), further including:
a recognition unit that recognizes a position and orientation within the real space of a real object depicted in the captured image, and
wherein the control unit uses a recognition result of the real object by the recognition unit to control the action that relates to that real object.

(9) The information processing device according to any one of (1) to (8),
wherein placement within the augmented reality space of a real object depicted in the captured image is determined by discretizing the real object in units of voxels.

(10) The information processing device according to (9),
wherein the control unit determines the target position of the action in the units of voxels.

(11) The information processing device according to any one of (1) to (11),
wherein, in a first operating mode, the control unit superimposes an object within the augmented reality space onto the captured image updated every frame for display on a screen, and in a second operating mode, the control unit displays, on a screen, an object within the augmented reality space without updating the captured image.

(12) The information processing device according to (11),
wherein the control unit switches between the first operating mode and the second operating mode according to designated user input.

(13) The information processing device according to (11),
wherein the control unit switches from the first operating mode to the second operating mode in a case in which a failure to recognize a real object depicted in the captured image continues for a designated number of frames.

(14) The information processing device according to any one of (11) to (13),
wherein, in the second operating mode, the control unit determines the target position for the action executed within the augmented reality space, but not on a basis of a positional relationship between an object within the augmented reality space and an optical axis of the image capture device.

(15) The information processing device according to any one of (1) to (10),
wherein, in a camera perspective mode, the control unit generates an image of the augmented reality space taking a position and orientation of the image capture device as a reference, and in an avatar perspective mode, the control unit generates an image of the augmented reality space taking a position and orientation of an avatar placed within the augmented reality space as a reference.

(16) The information processing device according to (15),
wherein the control unit switches from the camera perspective mode to the avatar perspective mode according to designated user input or occurrence of a designated event within the augmented reality space.

(17) The information processing device according to any one of (1) to (16),
wherein, in a case in which the action is executed, when a real object within the real space corresponding to the target position is capable of performing a reaction, the control unit instructs that real object to perform a reaction.

(18) A client device including:
an image capture unit that generates a captured image by capturing a real space;
a communication unit that communicates with a server device that sets, in association with the real space depicted in the captured image, an augmented reality space that virtually augments the real space, and determines a target position for an action executed within the augmented reality space, on a basis of a positional relationship between an object within the set augmented reality space and an optical axis of the image capture unit; and
a control unit that causes an image expressing the action executed within the augmented reality space at the target position determined by the server device to be displayed on a screen.

(19) An information processing method executed by a client device provided with an image capture unit and a communication unit that communicates with a server device,
wherein the server device sets, in association with a real space depicted in a captured image, an augmented reality space that virtually augments the real space, and determines a target position for an action executed within the augmented reality space, on a basis of a positional relationship between an object within the set augmented reality space and an optical axis of the image capture unit, the information processing method including:
generating the captured image by using the image capture unit to capture a real space; and
causing an image expressing the action executed within the augmented reality space at the target position determined by the server device to be displayed on a screen.

(20)
A program for causing a computer that controls a client device to function as:
an image acquisition unit that acquires a captured image of a real space from an image capture device; and
a control unit that causes an image expressing an action executed within an augmented reality space at a target position to be displayed on a screen, the target position being determined by a server device that sets, in association with the real space depicted in the captured image, the augmented reality space that virtually augments the real space, and determines a target position for the action executed within the augmented reality space, on a basis of a positional relationship between an object within the set augmented reality space and an optical axis of the image capture device.

In addition, configurations like the following also belong to the technical scope of the present disclosure.
(1) An information processing device including:
an image acquisition unit that acquires a captured image of a real space from an image capture device;
a setting unit that sets, in association with the real space, an augmented reality space that virtually augments the real space by discretizing, in units of voxels, a real object within the real space depicted in the captured image; and
a control unit that controls an action of a virtual object placed within the augmented reality space.
(2) The information processing device according to (1), wherein
the virtual object includes a user avatar.
(3) The information processing device according to (1) or (2), wherein
the virtual object includes an object corresponding to the real object, and
the setting unit sets a texture or color of the virtual object corresponding to the real object, on the basis of a texture or color of the real object.
(4) The information processing device according to (1) or (2), wherein
the virtual object includes an object corresponding to the real object, and
the setting unit sets a texture or color of the virtual object corresponding to the real object, on the basis of a texture or color of a reference object depicted in the captured image.
(5) The information processing device according to (1) or (2), wherein
the virtual object includes an object corresponding to the real object, and
the setting unit sets a display attribute of the virtual object corresponding to the real object, on the basis of a topographical parameter of the real object.
(6) The information processing device according to any one of (1) to (5), wherein
the information processing device additionally includes a recognition unit that generates a real space map by recognizing a position and orientation within the real space of the real object depicted in the captured image, and the setting unit constructs the augmented reality space by discretizing, in units of voxels, the real space map generated by the recognition unit.
(7) The information processing device according to any one of (1) to (6), wherein
in the case in which the augmented reality space is shared by multiple users, the setting unit applies, to each of the multiple users, the augmented reality space set on the basis of the captured image of a parent user from among the multiple users.
(8) The information processing device according to any one of (1) to (6), wherein
in the case in which the augmented reality space is shared by multiple users, the setting unit forms the augmented reality space by merging multiple, user-specific augmented reality spaces respectively constructed on the basis of the captured image of the multiple users.
(9) The information processing device according to (8), wherein
the setting unit merges the multiple, user-specific augmented reality spaces by calculating a sum of the multiple, user-specific augmented reality spaces in units of voxels.
(10) The information processing device according to (8), wherein
the augmented reality space is divided into multiple territories respectively assigned to users, and
the setting unit merges the multiple, user-specific augmented reality spaces by selecting, for each territory, the user-specific augmented reality space of a user to which that territory is assigned.
(11) The information processing device according to any one of (7) to (10), wherein
the control unit changes a display attribute of the virtual object superimposed onto the captured image according to which user's captured image depicts a real object corresponding to that virtual object.
(12) The information processing device according to any one of (7) to (11), wherein
the setting unit sets a display scale of the augmented reality space shared by the multiple users, on the basis of a size of a reference object depicted in the captured image.
(13) The information processing device according to any one of (1) to (12), wherein
the setting unit uses voxels having a user-specified granularity in order to discretize the real object.
(14) The information processing device according to any one of (1) to (12), wherein
the setting unit uses voxels having a granularity determined on the basis of a user privacy setting in order to discretize the real object.
(15) The information processing device according to any one of (1) to (14), wherein
the setting unit sets the augmented reality space by discretizing the real object specified by a user or the real object that was not excluded by a user.
(16) A client device including:
an image capture unit that generates a captured image by capturing a real space;
a communication unit that communicates with a server device that sets, in association with the real space, an augmented reality space that virtually augments the real space by discretizing, in units of voxels, a real object within the real space depicted in the captured image; and
a control unit that causes an image of a virtual object placed within the augmented reality space set by the server device to be displayed on a screen.

(17) An information processing method executed by a client device provided with an image capture unit and a communication unit that communicates with a server device,
wherein the server device sets, in association with a real space, an augmented reality space that virtually augments the real space by discretizing, in units of voxels, a real object within the real space depicted in a captured image
the information processing method including:
generating the captured image by using the image capture unit to capture a real space; and
causing an image of a virtual object placed within the augmented reality space set by the server device to be displayed on a screen.

(18) A program causing a computer that controls a client device to function as:
an image acquisition unit that acquires a captured image of a real space from an image capture device; and
a control unit that causes an image of a virtual object placed within an augmented reality space to be displayed on a screen, the augmented reality space being set by a server device that sets, in association with the real space, an augmented reality space that virtually augments the real space by discretizing, in units of voxels, a real object within the real space depicted in the captured image.

Additionally, the present technology may also be configured as below.

(1)
An information processing device including:
an image acquisition unit that acquires a captured image of a real space from an image capture device;
a setting unit that sets, in association with the real space, an augmented reality space that virtually augments the real space depicted in the captured image, the augmented reality space differing according to related information that relates to the captured image; and
a control unit that causes an image of a virtual object placed for each user within the augmented reality space to be displayed on a screen.

(2)
The information processing device according to (1),
wherein the virtual object includes an avatar for each user.

(3)
The information processing device according to (1) or (2),
wherein the related information includes an attribute of a reference object depicted in the captured image.

(4)
The information processing device according to (1) or (2),
wherein the related information includes a capture location of the captured image.

(5)
The information processing device according to (1) or (2),
wherein the related information includes an attribute of the image capture device.

(6)
The information processing device according to any one of (3) to (5),
wherein the setting unit sets the augmented reality space selected according to the related information from among multiple augmented reality space candidates prepared in advance.

(7)
The information processing device according to (6),
wherein the setting unit selects the augmented reality space specified by a user from among a subset determined according to the related information from among the multiple augmented reality space candidates.

(8)
The information processing device according to any one of (3) to (6),
wherein the setting unit adjusts, according to the related information, a variable parameter of the augmented reality space to set.

(9)
The information processing device according to any one of (1) to (8),
wherein the setting unit adjusts a variable parameter of the augmented reality space to set, on a basis of performance of a device involved in displaying the augmented reality space.

(10)
The information processing device according to any one of (1) to (9),
wherein the control unit determines, on a basis of the related information, an initial position of the virtual object placed within the augmented reality space.

(11)
The information processing device according to any one of (1) to (9),
wherein the control unit determines, on a basis of an attribute of the user, an initial position of the virtual object placed within the augmented reality space.

(12)
The information processing device according to any one of (1) to (11),
wherein, in the case in which the augmented reality space to set is not determined from the related information, the setting unit sets a default augmented reality space candidate that does not depend on the related information as the augmented reality space.

(13)
The information processing device according to any one of (1) to (12),
wherein the virtual object includes an avatar for each user, and
wherein the control unit places an avatar of one or more users accessing the same augmented reality space in real-time within the augmented reality space.

(14)
The information processing device according to any one of (13),
wherein the control unit additionally places an avatar of a user who previously accessed the same augmented reality space within the augmented reality space.

(15)
The information processing device according to (13),
wherein the control unit expresses a trail of an avatar of a user who previously accessed the same augmented reality space within the augmented reality space.

(16)
The information processing device according to any one of (13) to (15),
wherein the control unit shares an action scenario of a non-user character placed within the augmented reality space among devices of the one or more users.

(17)
The information processing device according to any one of (1) to (16),
wherein the virtual object includes an avatar for each user, and
wherein the setting unit places, within the set augmented reality space, a path enabling the avatar to move to another augmented reality space.

(18)
A client device including:
an image capture unit that generates a captured image by capturing a real space;
a communication unit that communicates with a server device that sets, in association with the real space, an augmented reality space that virtually augments the real space depicted in the captured image, the augmented reality space differing according to related information that relates to the captured image; and
a control unit that causes an image of a virtual object placed for each user within the augmented reality space set by the server device to be displayed on a screen.

(19)
An information processing method executed by a client device provided with an image capture unit and a communication unit that communicates with a server device,
wherein the server devices sets, in association with a real space, an augmented reality space that virtually augments the real space depicted in a captured image, the augmented reality space differing according to related information that relates to the captured image,
the information processing method including:
generating the captured image by using the image capture unit to capture a real space; and
causing an image of a virtual object placed for each user within the augmented reality space set by the server device to be displayed on a screen.

(20)
A program for causing a computer that controls a client device to function as:
an image acquisition unit that acquires a captured image of a real space from an image capture device; and
a control unit that causes an image of a virtual object placed for each user within an augmented reality space to be displayed on a screen, the augmented reality space being set by a server device that sets, in association with the real space, the augmented reality space that virtually augments the real space depicted in the captured image, the augmented reality space differing according to related information that relates to the captured image.

REFERENCE SIGNS LIST 100 information processing device
102 camera (image capture unit)
110 display (display unit)
112 communication interface (communication unit)
118 processor (control unit)
120 image acquisition unit
130 data acquisition unit
142 recognition unit
144 AR space setting unit
146 object control unit
200 client device

The invention claimed is:

1. An information processing device comprising:
an image acquisition unit configured to acquire a captured image of a real space from an image capture device;
a setting unit configured to set an augmented reality space that virtually augments the real space depicted in the captured image by dynamically constructing the augmented reality space as a map of the real space; and
a control unit configured to
determine an initial position that a user avatar is placed before movement of the user avatar within the augmented reality space based on one or more user attributes of a user corresponding to the user avatar,
determine a target position for an action executed by the user avatar within the augmented reality space, on a basis of an intersecting positional relationship between an object within the augmented reality space and an optical axis of the image capture device indicated by a symbol overlaid on the augmented reality space, and
determine a direction that the user avatar faces within the augmented reality space on a basis of a movement of the information processing device,
wherein the control unit is further configured to determine initial positions of a plurality of user avatars within the augmented reality space,
wherein a distance between the determined initial positions of two different user avatars of the plurality of user avatars is based on a similarity of the one or more user attributes between different users corresponding to the two different user avatars,
wherein the one or more user attributes used to determine the initial position of each user avatar include at least one of an age, a gender, an occupation, a place of work, preferences, or a predetermined group of the user corresponding to the user avatar, and
wherein the image acquisition unit, the setting unit, and the control unit are each implemented via at least one processor.

2. The information processing device according to claim 1,
wherein the control unit is further configured to
place the user avatar within the augmented reality space, and
determine the target position of the action executed by the user avatar on a basis of the intersecting positional relationship between the object within the augmented reality space and the optical axis of the image capture device.

3. The information processing device according to claim 2,
wherein the control unit is further configured to determine the target position as a destination of movement by the user avatar.

4. The information processing device according to claim 2,
wherein the control unit is further configured to determine the target position as a point of application of an item used by the user avatar.

5. The information processing device according to claim 2,
wherein the movement of the information processing device comprises a rotation about the optical axis of the image capture device.

6. The information processing device according to claim 1,
wherein the control unit is further configured to change a relative position, orientation, or scale of the augmented reality space with respect to the image capture device, on a basis of designated user input.

7. The information processing device according to claim 1,
wherein the control unit is further configured to superimpose a user interface for causing the user to select the type of the action onto at least one of a right-edge region and a left-edge region of a window that displays the object within the augmented reality space, and wherein the right-edge region and the left-edge region are regions reached by thumbs of the user gripping a display on which the augmented reality space is displayed.

8. The information processing device according to claim 1, further comprising:
a recognition unit configured to recognize a position and orientation within the real space of a real object depicted in the captured image, and
wherein the control unit is further configured to use a recognition result of the real object by the recognition unit to control the action executed by the user avatar that relates to that real object, and
wherein the recognition unit is implemented via at least one processor.

9. The information processing device according to claim 1,
wherein placement within the augmented reality space of a real object depicted in the captured image is determined by discretizing the real object in units of voxels.

10. The information processing device according to claim 9,
wherein the control unit is further configured to determine the target position of the action in the units of voxels according to the user selection.

11. The information processing device according to claim 1,
wherein, in a first operating mode, the control unit is further configured to superimpose the object within the augmented reality space onto the captured image updated every frame for display on a screen, and in a second operating mode, the control unit is further configured to display, on the screen, the object within the augmented reality space without updating the captured image.

12. The information processing device according to claim 11,
wherein the control unit is further configured to switch between the first operating mode and the second operating mode according to designated user input.

13. The information processing device according to claim 11,
wherein the control unit is further configured to switch from the first operating mode to the second operating mode in a case in which a failure to recognize the real object depicted in the captured image continues for a designated number of frames.

14. The information processing device according to claim 1,
wherein, in a camera perspective mode, the control unit is further configured to generate an image of the augmented reality space taking a position and orientation of the image capture device as a reference, and in an avatar perspective mode, the control unit is further configured to generate the image of the augmented reality space taking a position and orientation of the user avatar placed within the augmented reality space as the reference.

15. The information processing device according to claim 14,
wherein the control unit is further configured to switch from the camera perspective mode to the avatar perspective mode according to designated user input or occurrence of a designated event within the augmented reality space.

16. The information processing device according to claim 1,
wherein, in a case in which the action is executed, when a real object within the real space corresponding to the target position is capable of performing a reaction, the control unit is further configured to instruct that real object to perform the reaction.

17. The information processing device according to claim 1,
wherein when the predetermined group of the user is used to determine the initial position of the corresponding user avatar, the initial position of the user avatar is determined as a predetermined position corresponding to the predetermined group.

18. A client device comprising:
an image capture unit configured to generate a captured image by capturing a real space;
a communication unit configured to communicate with a server device configured to
set an augmented reality space that virtually augments the real space by dynamically constructing the augmented reality space as a map of the real space,
determine an initial position that a user avatar is placed before movement of the user avatar within the augmented reality space based on one or more user attributes of a user corresponding to the user avatar, and
determine a target position for an action executed by the user avatar within the augmented reality space, on a basis of an intersecting positional relationship between an object within the set augmented reality and an optical axis of the image capture device indicated by a symbol overlaid on the augmented reality space; and
a control unit configured to
cause an image expressing the action executed by the user avatar within the augmented reality space at the target position determined by the server device to be displayed on a screen, and
determine a direction that the user avatar faces within the augmented reality space on a basis of a movement of the information processing device,
wherein the server device is further configured to determine initial positions of a plurality of user avatars within the augmented reality space,
wherein a distance between the determined initial positions of two different user avatars of the plurality of user avatars is based on a similarity of the one or more user attributes between different users corresponding to the two different user avatars,
wherein the one or more user attributes used to determine the initial position of each user avatar include at least one of an age, a gender, an occupation, a place of work, preferences, or a predetermined group of the user corresponding to the user avatar, and
wherein the image capture unit, the communication unit, and the control unit are each implemented via at least one processor.

19. An information processing method executed by a client device provided with an image capture unit and a communication unit that communicates with a server device,
wherein the server device is configured to
set, in association with a real space depicted in a captured image, an augmented reality space that virtually augments the real space by dynamically constructing the augmented reality space as a map of the real space,
determine an initial position that a user avatar is placed before movement of the user avatar within the augmented reality space based on one or more user attributes of a user corresponding to the user avatar, and determine a target position for an action executed by the user avatar within the augmented reality space, on a basis of an intersecting positional relationship between an object within the set augmented reality space and an optical axis of the image capture device indicated by a symbol overlaid on the augmented reality space, the information processing method comprising:

generating the captured image by using the image capture unit to capture a real space; and causing an image expressing the action executed by the user avatar within the augmented reality space at the target position determined by the server device to be displayed on a screen, wherein the image expressing the action executed by the user avatar displays a direction that the user avatar faces within the augmented reality space on a basis of a movement of the image capture unit, wherein server device is further configured to determine initial positions of a plurality of user avatars within the augmented reality space, wherein a distance between the determined initial positions of two different user avatars of the plurality of user avatars is based on a similarity of the one or more user attributes between different users corresponding to the two different user avatars, wherein the one or more user attributes used to determine the initial position of each user avatar include at least one of an age, a gender, an occupation, a place of work, preferences, or a predetermined group of the user corresponding to the user avatar, and wherein the client device, the image capture unit, the communication unit, and the server device are each implemented via at least one processor.

20. A non-transitory computer-readable medium having embodied thereon a program, which when executed by a computer, controls a client device to:

acquire a captured image of a real space from an image capture device; and cause an image expressing an action executed by a user avatar within an augmented reality space at a target position to be displayed on a screen, the target position being determined by a server device that sets, in association with the real space depicted in the captured image, the augmented reality space that virtually augments the real space by dynamically constructing the augmented reality space as a map of the real space, determines an initial position that a user avatar is placed before movement of the user avatar within the augmented reality space based on one or more user attributes of a user corresponding to the user avatar, and determines the target position for the action executed by the user avatar within the augmented reality space, on a basis of an intersecting positional relationship between an object within the set augmented reality space and an optical axis of the image capture device indicated by a symbol overlaid on the augmented reality space, wherein the image expressing the action executed by the user avatar displays a direction that the user avatar faces within the augmented reality space on a basis of a movement of the image capture device, wherein the server device determines initial positions of a plurality of user avatars within the augmented reality space, wherein a distance between the determined initial positions of two different user avatars of the plurality of user avatars is based on a similarity of the one or more user attributes between different users corresponding to the two different user avatars, and wherein the one or more user attributes used to determine the initial position of each user avatar include at least one of an age, a gender, an occupation, a place of work, preferences, or a predetermined group of the user corresponding to the user avatar.

* * * * *